(12) United States Patent
Buck et al.

(10) Patent No.: US 8,770,146 B2
(45) Date of Patent: Jul. 8, 2014

(54) METHODS AND APPARATUS FOR APPLYING TEAT DIP TO A DAIRY ANIMAL

(71) Applicant: GEA Farm Technologies, Inc., Naperville, IL (US)

(72) Inventors: Robert L. Buck, Holmen, WI (US); Kevin L. Torgerson, Holmen, WI (US); Matthew J. Stuessel, Alma Center, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 0 days.

(21) Appl. No.: 13/843,071

(22) Filed: Mar. 15, 2013

(65) Prior Publication Data
US 2013/0263788 A1    Oct. 10, 2013

Related U.S. Application Data

(63) Continuation-in-part of application No. 12/584,475, filed on Sep. 4, 2009, now Pat. No. 8,033,247, and a continuation-in-part of application No. 12/584,479, filed on Sep. 4, 2009, now Pat. No. 8,025,029, and a continuation-in-part of application No. 12/584,480, filed on Sep. 4, 2009, now Pat. No. 8,342,125, and a continuation-in-part of application No. 13/269,835, filed on Oct. 10, 2011, and a continuation-in-part of application No. 13/246,398, filed on Sep. 27, 2011, now Pat. No. 8,528,500, and a continuation-in-part of application No. 13/729,240, filed on Dec. 28, 2012, now Pat. No. 8,590,486.

(51) Int. Cl.
*A01J 7/02* (2006.01)

(52) U.S. Cl.
USPC ............... 119/14.47; 119/14.18; 119/670

(58) Field of Classification Search
USPC .......... 119/14.47, 14.05, 14.07, 14.08, 14.38, 119/14.4, 14.41, 14.44, 14.49, 670, 14.18
See application file for complete search history.

(56) References Cited

U.S. PATENT DOCUMENTS

| | | | |
|---|---|---|---|
| 1,365,665 | A | 1/1921 | Davies |
| 2,532,088 | A | 11/1950 | Cordis |
| 2,747,544 | A | 5/1956 | Thomas |
| 3,014,455 | A | 12/1961 | Olander |
| 3,099,246 | A | 7/1963 | Beskow |
| 3,461,845 | A | 8/1969 | Peterson |

(Continued)

FOREIGN PATENT DOCUMENTS

| | | |
|---|---|---|
| AU | 641229 | 9/1993 |
| DE | 1582939 | 7/1970 |

(Continued)

OTHER PUBLICATIONS

3-A® Accepted Practices for Permanently Installed Product and Solution Pipelines and Cleaning Systems Used in Milk . . . , No. 605-04, (Section N), 3pp.

(Continued)

*Primary Examiner* — Yvonne Abbott
(74) *Attorney, Agent, or Firm* — Smith Law Office

(57) ABSTRACT

Methods and apparatus are used at the end of a dairy animal milking process to stop milking pulsation in an off position and then applying a teat dip into a milker unit teat cup liner to improve dip coverage on the teat.

7 Claims, 51 Drawing Sheets

(56) References Cited

U.S. PATENT DOCUMENTS

| | | | |
|---|---|---|---|
| 3,474,760 A | 10/1969 | Hoffman et al. |
| 3,482,547 A | 12/1969 | Maier |
| 3,630,081 A | 12/1971 | Nelson |
| 3,648,696 A | 3/1972 | Keith |
| 3,696,790 A | 10/1972 | Albright |
| 3,713,423 A | 1/1973 | Sparr, Sr. |
| 3,726,253 A | 4/1973 | Duncan |
| 3,762,371 A | 10/1973 | Quayle et al. |
| 3,789,798 A | 2/1974 | Reisgies et al. |
| 3,861,335 A | 1/1975 | Przewalski |
| 3,861,355 A | 1/1975 | Johnson et al. |
| 3,973,520 A | 8/1976 | Flocchini |
| 4,034,714 A | 7/1977 | Umbaugh et al. |
| 4,149,489 A | 4/1979 | Umbaugh et al. |
| 4,168,677 A | 9/1979 | Brown |
| 4,175,514 A | 11/1979 | Souza et al. |
| 4,222,346 A | 9/1980 | Reisgies |
| 4,305,346 A | 12/1981 | Sparr, Sr. |
| 4,332,215 A | 6/1982 | Larson |
| 4,333,421 A | 6/1982 | Schluckbier |
| 4,372,345 A | 2/1983 | Mehus |
| 4,378,757 A | 4/1983 | Hamann |
| 4,393,811 A | 7/1983 | Bodmin |
| 4,395,971 A | 8/1983 | Happel et al. |
| 4,459,938 A * | 7/1984 | Noorlander ............... 119/14.49 |
| 4,462,425 A | 7/1984 | Mehus |
| 4,498,419 A | 2/1985 | Flocchini |
| 4,516,530 A | 5/1985 | Reisgies et al. |
| 4,572,105 A | 2/1986 | Chowdhury et al. |
| 4,586,462 A | 5/1986 | Icking |
| 4,593,649 A | 6/1986 | Britten |
| 4,903,639 A | 2/1990 | Kessel |
| 4,907,535 A | 3/1990 | Matsuzawa et al. |
| 4,924,809 A | 5/1990 | Verbrugge |
| 4,936,254 A | 6/1990 | Marshall |
| 5,052,341 A | 10/1991 | Woolford et al. |
| 5,101,770 A | 4/1992 | Stevenson |
| 5,134,967 A | 8/1992 | Marshall |
| 5,161,482 A | 11/1992 | Griffin |
| 5,167,201 A | 12/1992 | Peles |
| 5,178,095 A | 1/1993 | Mein |
| 5,218,924 A | 6/1993 | Thompson et al. |
| 5,386,799 A | 2/1995 | Dietrich |
| 5,390,627 A | 2/1995 | van der Berg et al. |
| 5,403,005 A | 4/1995 | Avila-Valdez |
| 5,493,995 A | 2/1996 | Chowdhury |
| 5,572,947 A | 11/1996 | Larson et al. |
| 5,673,650 A | 10/1997 | Mottram et al. |
| 5,722,343 A | 3/1998 | Aurik |
| 5,778,820 A | 7/1998 | van der Lely |
| 5,850,845 A | 12/1998 | Pereira et al. |
| 5,881,669 A | 3/1999 | van den Berg et al. |
| 5,896,828 A | 4/1999 | Kronschnabel |
| 5,909,716 A | 6/1999 | van der Lely |
| 5,934,220 A | 8/1999 | Hall et al. |
| 5,960,736 A | 10/1999 | Ludington |
| 5,992,347 A | 11/1999 | Innings et al. |
| 6,009,833 A | 1/2000 | van der Lely |
| 6,089,242 A | 7/2000 | Buck |
| 6,098,570 A | 8/2000 | Aurik et al. |
| 6,202,593 B1 * | 3/2001 | Maier et al. ............... 119/14.47 |
| 6,234,110 B1 | 5/2001 | Xavier |
| 6,244,215 B1 | 6/2001 | Oosterling |
| 6,267,077 B1 | 7/2001 | van den Berg et al. |
| 6,276,297 B1 | 8/2001 | van den Berg et al. |
| 6,308,655 B1 | 10/2001 | Oosterling |
| 6,318,299 B1 | 11/2001 | Birk |
| 6,321,682 B1 | 11/2001 | Eriksson et al. |
| 6,367,416 B1 | 4/2002 | van der Lely |
| 6,371,046 B1 | 4/2002 | Petterson |
| 6,435,132 B1 | 8/2002 | Milbrath et al. |
| 6,546,893 B1 | 4/2003 | Happel et al. |
| 6,550,420 B1 | 4/2003 | Bjork |
| 6,561,126 B2 | 5/2003 | Forsen et al. |
| 6,584,930 B2 | 7/2003 | Buecker |
| 6,591,784 B1 | 7/2003 | Eriksson |
| 6,598,560 B1 | 7/2003 | van den Berg |
| 6,619,227 B1 | 9/2003 | Berger et al. |
| 6,626,130 B1 | 9/2003 | Eriksson |
| 6,644,240 B1 | 11/2003 | Dietrich |
| 6,752,102 B2 | 6/2004 | Dahl et al. |
| 6,755,153 B1 | 6/2004 | Chowdhury |
| 6,935,270 B2 | 8/2005 | Wipperfurth et al. |
| 6,997,136 B1 | 2/2006 | Coates |
| 7,128,020 B2 | 10/2006 | Björk et al. |
| 7,174,848 B2 | 2/2007 | Brown et al. |
| 7,178,480 B2 | 2/2007 | Dahl et al. |
| 7,263,948 B2 | 9/2007 | Ericsson et al. |
| 7,281,493 B2 | 10/2007 | Dietrich |
| 7,290,497 B2 | 11/2007 | Rottier et al. |
| 7,350,478 B2 | 4/2008 | Fernandez |
| 7,377,232 B2 | 5/2008 | Holmgren et al. |
| 7,401,573 B2 | 7/2008 | Torgerson |
| 7,412,943 B2 | 8/2008 | Ericsson et al. |
| 7,536,975 B2 | 5/2009 | Denes et al. |
| 7,578,260 B2 | 8/2009 | Shin |
| 7,707,966 B2 | 5/2010 | Torgerson et al. |
| 7,765,951 B2 * | 8/2010 | Dietrich .................... 119/14.18 |
| 7,793,614 B2 | 9/2010 | Ericsson et al. |
| 7,926,449 B2 | 4/2011 | Stellnert et al. |
| 7,963,249 B2 | 6/2011 | Duke |
| 8,025,029 B2 | 9/2011 | Torgerson et al. |
| 8,033,247 B2 * | 10/2011 | Torgerson et al. ......... 119/14.47 |
| 8,117,989 B2 * | 2/2012 | Torgerson et al. ......... 119/14.47 |
| 8,210,123 B2 | 7/2012 | Duke |
| 8,240,272 B2 | 8/2012 | Duke |
| 8,342,125 B2 | 1/2013 | Torgerson et al. |
| 8,590,486 B2 * | 11/2013 | Torgerson et al. ......... 119/14.47 |
| 2002/0185071 A1 | 12/2002 | Guo |
| 2004/0089242 A1 | 5/2004 | Verstege |
| 2005/0274327 A1 | 12/2005 | Johnsson et al. |
| 2007/0070803 A1 | 3/2007 | Urquart |
| 2007/0186860 A1 | 8/2007 | Dietrich |
| 2007/0277737 A1 | 12/2007 | Maier et al. |
| 2008/0022932 A1 | 1/2008 | Rottier et al. |
| 2008/0202433 A1 | 8/2008 | Duke |
| 2008/0276871 A1 | 11/2008 | Auburger et al. |
| 2009/0050061 A1 * | 2/2009 | Duke ........................ 119/14.02 |
| 2009/0050062 A1 | 2/2009 | Auburger et al. |
| 2009/0064937 A1 | 3/2009 | Rottier et al. |
| 2009/0151641 A1 | 6/2009 | Schulze Wartenhorst et al. |
| 2009/0165724 A1 | 7/2009 | Mader et al. |
| 2010/0154900 A1 * | 6/2010 | Torgerson et al. ............ 137/511 |
| 2010/0236487 A1 | 9/2010 | Stellnert et al. |
| 2010/0326360 A1 | 12/2010 | Duke et al. |
| 2011/0220028 A1 * | 9/2011 | Duke ........................ 119/14.02 |
| 2011/0220160 A1 | 9/2011 | Bosma |
| 2011/0232575 A1 | 9/2011 | Duke |
| 2012/0111275 A1 | 5/2012 | Torgerson et al. |
| 2012/0118237 A1 * | 5/2012 | Torgerson et al. ......... 119/14.18 |
| 2012/0118238 A1 | 5/2012 | Torgerson et al. |
| 2012/0272911 A1 | 11/2012 | Duke |
| 2013/0199449 A1 * | 8/2013 | Daniel ....................... 119/14.02 |

FOREIGN PATENT DOCUMENTS

| | | |
|---|---|---|
| DE | 2622794 | 12/1977 |
| DE | 3540058 | 5/1987 |
| DE | 261300 | 10/1988 |
| DE | 4006785 | 9/1990 |
| DE | 10160161 | 6/2003 |
| EP | 0277396 | 8/1988 |
| EP | 0313109 | 4/1989 |
| EP | 0319523 | 6/1989 |
| EP | 0459817 | 12/1991 |
| EP | 0479397 | 4/1992 |
| EP | 0332235 | 12/1992 |
| EP | 0527509 | 2/1993 |
| EP | 0630557 | 12/1994 |
| EP | 0728412 | 8/1996 |
| EP | 0801893 | 10/1997 |
| EP | 0543463 | 3/2001 |
| EP | 1219167 | 7/2002 |
| EP | 1089615 | 3/2003 |

(56) References Cited

FOREIGN PATENT DOCUMENTS

| | | |
|---|---|---|
| EP | 0945057 | 7/2003 |
| EP | 1328148 | 3/2005 |
| EP | 1520469 | 4/2005 |
| EP | 1543720 | 6/2005 |
| EP | 1737291 | 11/2005 |
| EP | 1790217 | 5/2007 |
| EP | 1795069 | 6/2007 |
| EP | 1679956 | 12/2008 |
| EP | 2113169 | 11/2009 |
| EP | 1933616 | 1/2011 |
| EP | 2277373 | 1/2011 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002354958 | 12/2002 |
| NL | 1016237 | 3/2002 |
| NL | 1021950 C | 5/2004 |
| SU | 1676538 | 9/1991 |
| WO | WO93/13651 | 7/1993 |
| WO | WO98/28969 | 7/1998 |
| WO | WO99/46978 | 9/1999 |
| WO | WO99/66767 | 12/1999 |
| WO | WO99/66787 | 12/1999 |
| WO | WO01/17337 | 3/2001 |
| WO | WO01/17338 | 3/2001 |
| WO | WO02/07506 | 1/2002 |
| WO | WO02/23976 | 3/2002 |
| WO | WO03/030630 | 4/2003 |
| WO | WO03/077645 | 9/2003 |
| WO | WO03/098998 | 12/2003 |
| WO | WO2004/032608 | 4/2004 |
| WO | WO2005/022986 | 3/2005 |
| WO | WO2005/043986 | 5/2005 |
| WO | WO2005/072516 | 8/2005 |
| WO | WO2005/102035 | 11/2005 |
| WO | WO2006/029797 | 3/2006 |
| WO | WO2006/117019 | 11/2006 |
| WO | WO2006/135917 | 12/2006 |
| WO | WO2007/31783 | 3/2007 |
| WO | WO2007/129884 | 11/2007 |
| WO | WO2007/129888 | 11/2007 |
| WO | WO2008/102567 | 8/2008 |
| WO | WO2008/138862 | 11/2008 |
| WO | WO2009/077607 | 6/2009 |
| WO | WO2009/158000 | 12/2009 |
| WO | WO2011/028292 | 3/2011 |
| WO | WO2011/028293 | 3/2011 |
| WO | WO2011/028294 | 3/2011 |

OTHER PUBLICATIONS

Akam, D.N., The Development of Equipment for the Mechanization of Manual Operations . . . 17th Annual Mtg. Nat'l Mastitis Counsel, Inc., pp. 417-426, Feb. 21-23, 1978.

Grindal et al., Automatic application of teat disinfectant through the milking machine cluster, Journal of Dairy Research, 56:579-585 (1989), 7pp.

International Search Report and Written Opinion from PCT/US2011/00322, dated Dec. 20, 2011.

Letter to Alex Ferguson from Jeffry W. Smith dated Dec. 22, 2006, 2pp.

Neijenhuis et al. Health of dairy cows milked by an automatic milking system, Oct. 2003, 23 pages.

Office Action for U.S. Appl. No. 10/576,744 dated Jun. 3, 2010, 8pp.

Office Action for U.S. Appl. No. 11/652,372 dated Feb. 11, 2008, 14pp.

Office Action for U.S. Appl. No. 11/662,454 dated Aug. 16, 2010, 20pp.

Office Action for U.S. Appl. No. 11/904,769 dated Feb. 20, 2008, 9pp.

PCT/GB04/004343—Written Opinion of ISA & IPRP rec'd Feb. 3, 2005, 5pp.

PCT/US06/023075—ISR & Written Opinion rec'd Oct. 16, 2006.

PCT/US09/006026—IPRP, Written Opinion of ISA & ISR rec'd Mar. 6, 2010, 9pp.

PCT/US09/03770—IPRP and Written Opinion rec'd Jan. 13, 2011, and ISR rec'd Oct. 7, 2009.

Preliminary Amendment for U.S. Appl. No. 10/576,744 filed Apr. 21, 2006, 16pp.

Preliminary Amendment for U.S. Appl. No. 10/576,744 filed Aug. 7, 2008, 10pp.

Shearn et al., "Reduction of bacterial contamination of teatcup liners by an entrained wash system," Institute for Animal Health, Veterinary Record (1994),134,450, 1p.

Thompson, et al. The End-Of-Milking Sequence and its Mechanization, 1976 Winter Mtg., Dec. 14-17, 1976, Animal Physiology and Genetics Inst., Beltsville, MD, 15pp.

U.S. Appl. No. 60/578,997, filed Jun. 12, 2004, Kevin L. Torgerson.

Office Action for U.S. Appl. No. 12/712,787 dated Jun. 27, 2011.

U.S. Appl. No. 60/566,313, filed Apr. 29, 2004, J.R.J. Duke.

U.S. Appl. No. 60/566,314, filed Apr. 29, 2004, J.R.J. Duke.

* cited by examiner

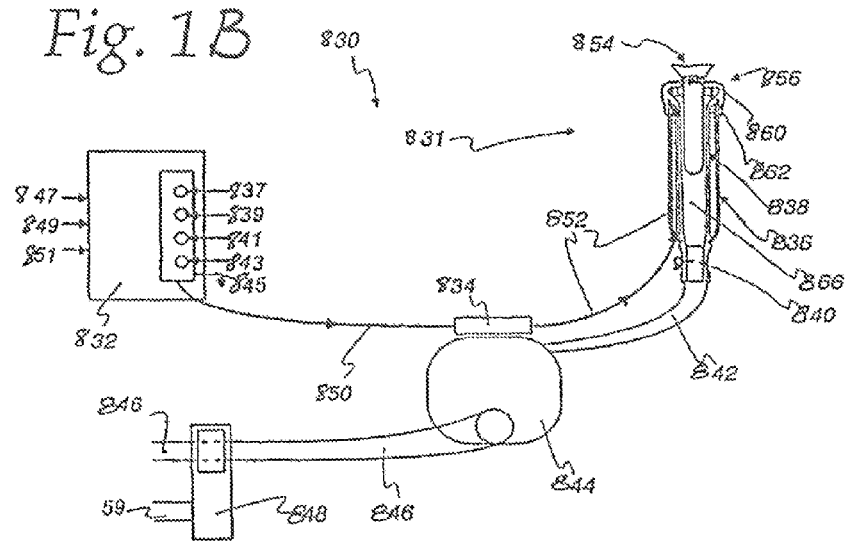

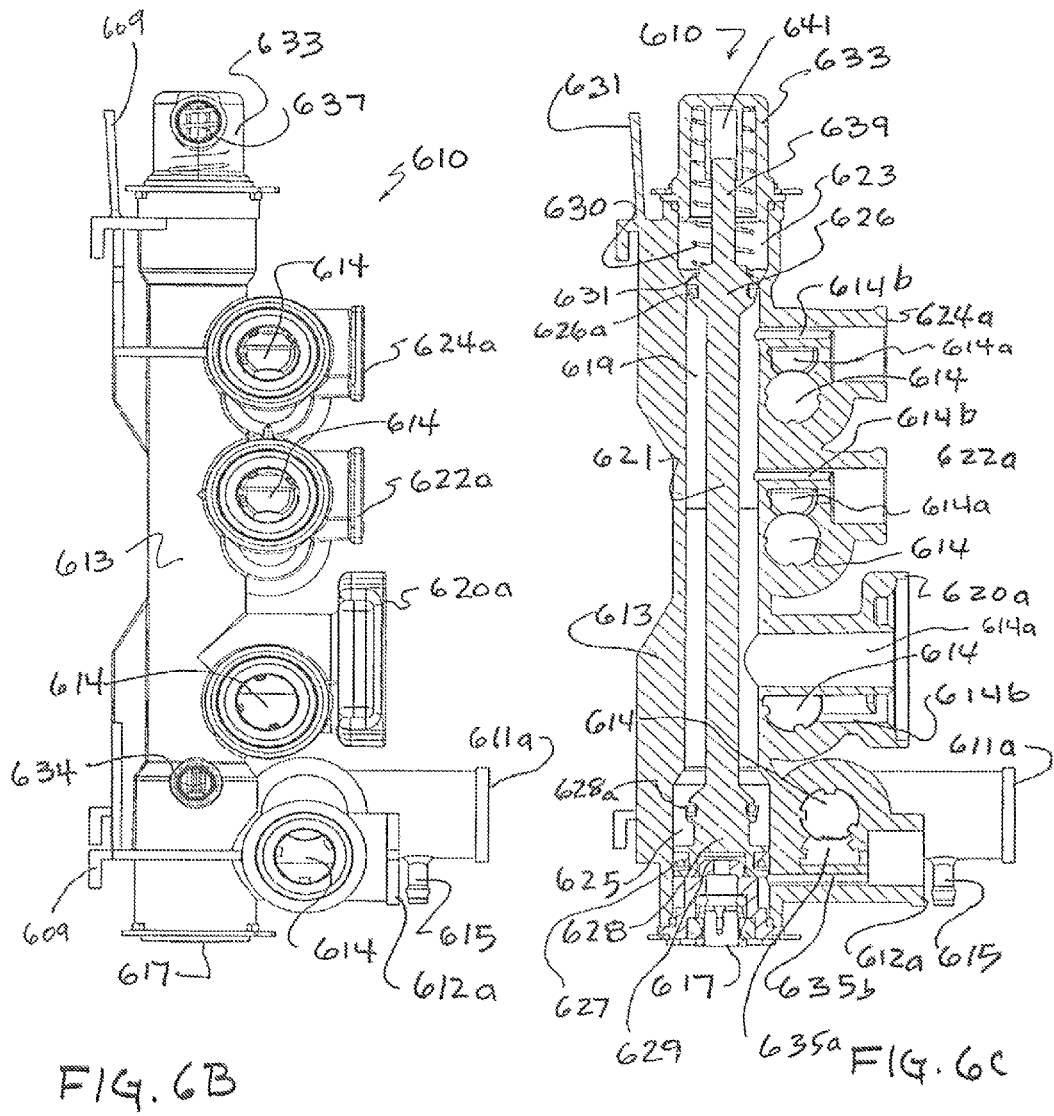

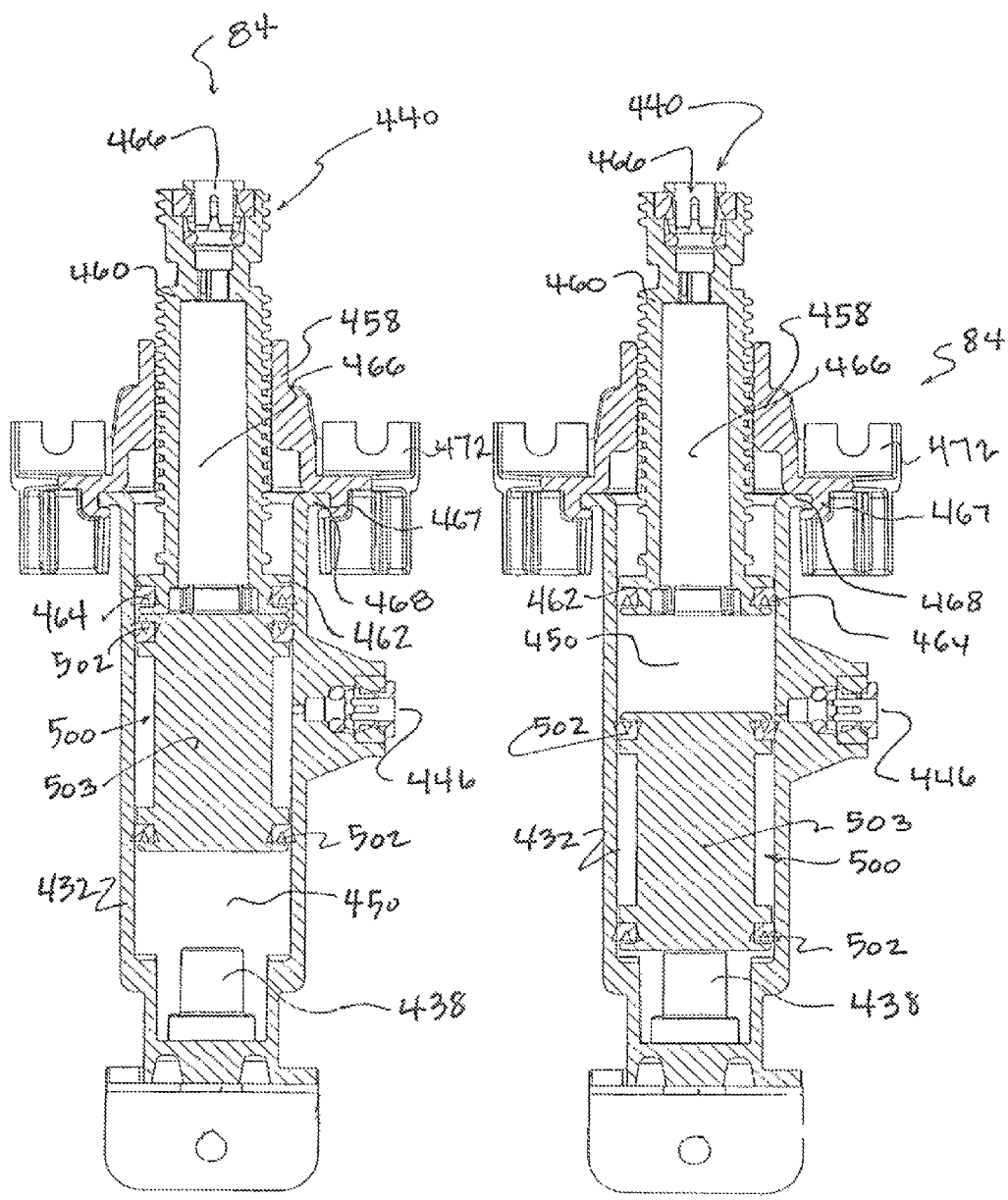

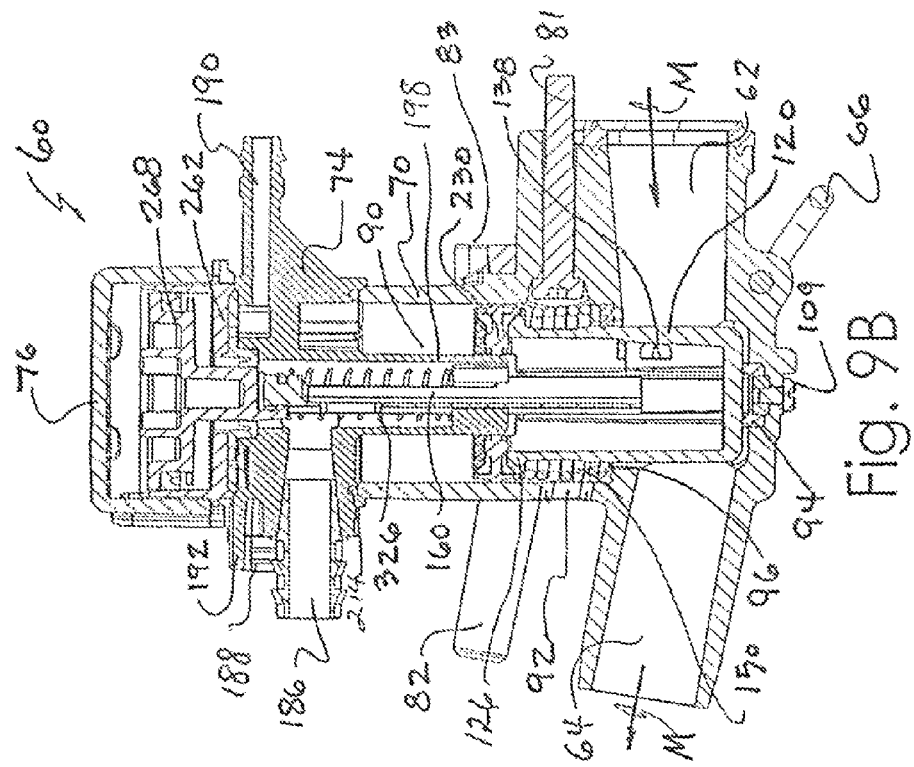
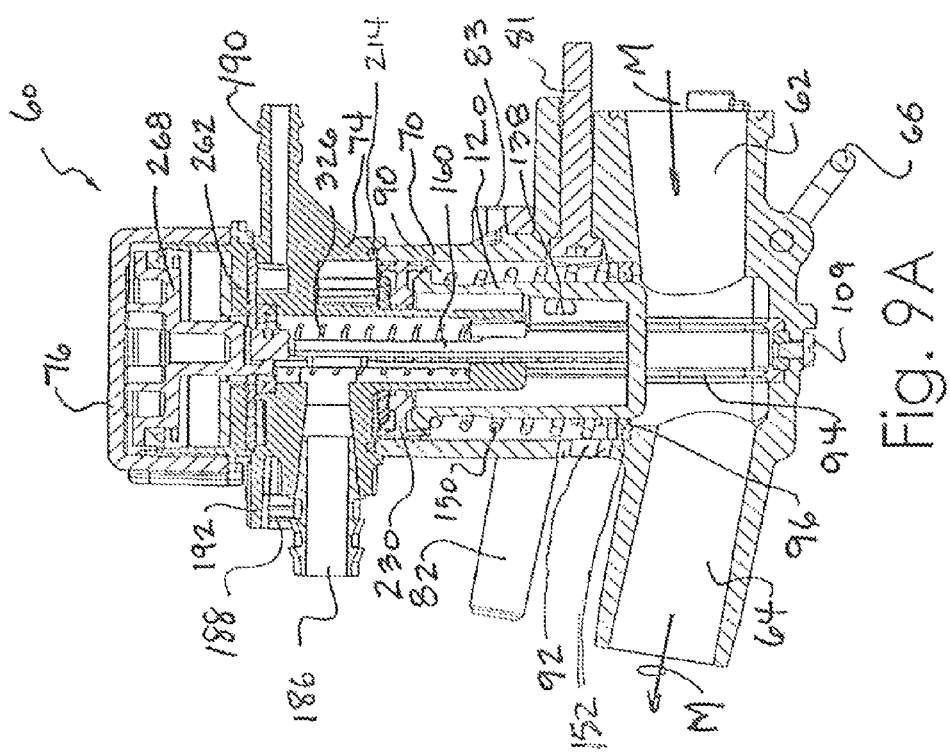
Fig. 9A
Fig. 9B

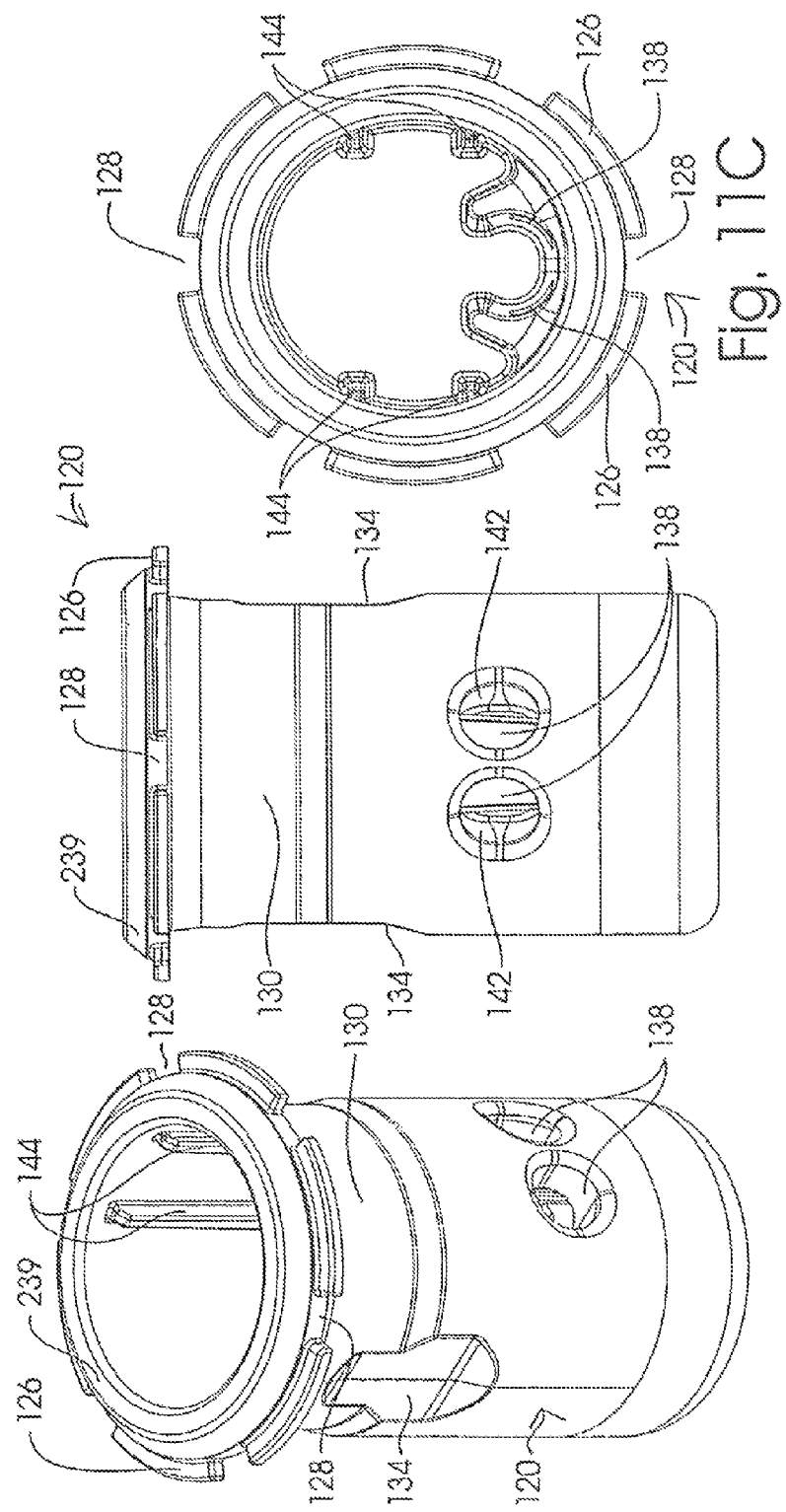

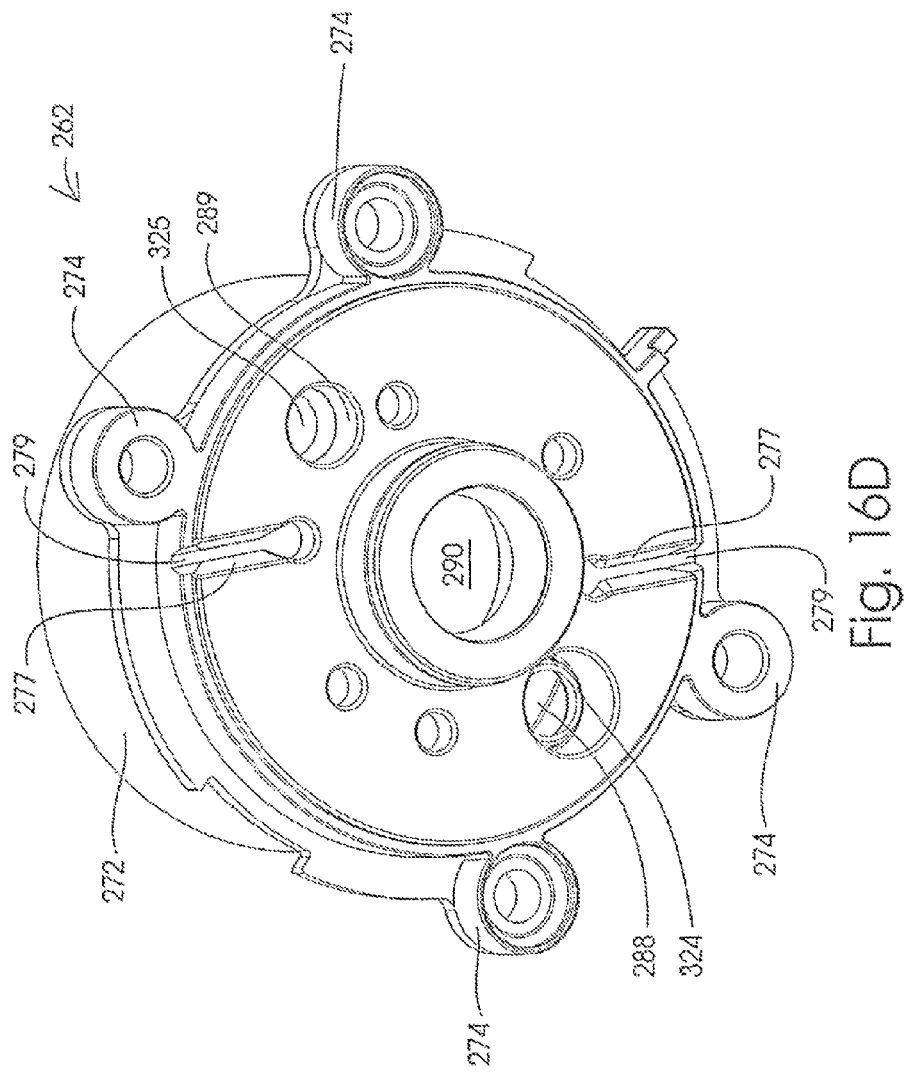

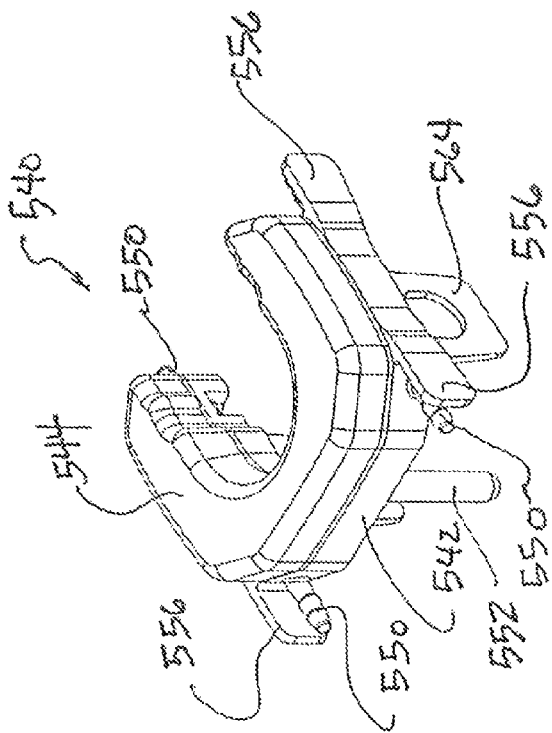
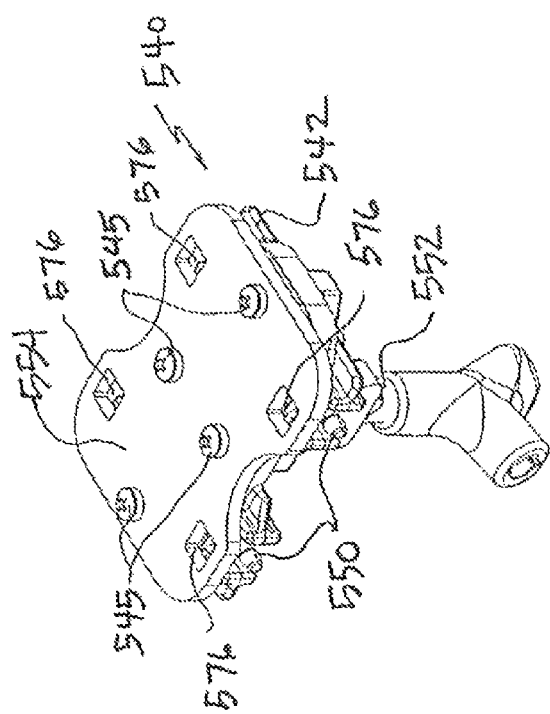
Fig. 19A
Fig. 19B

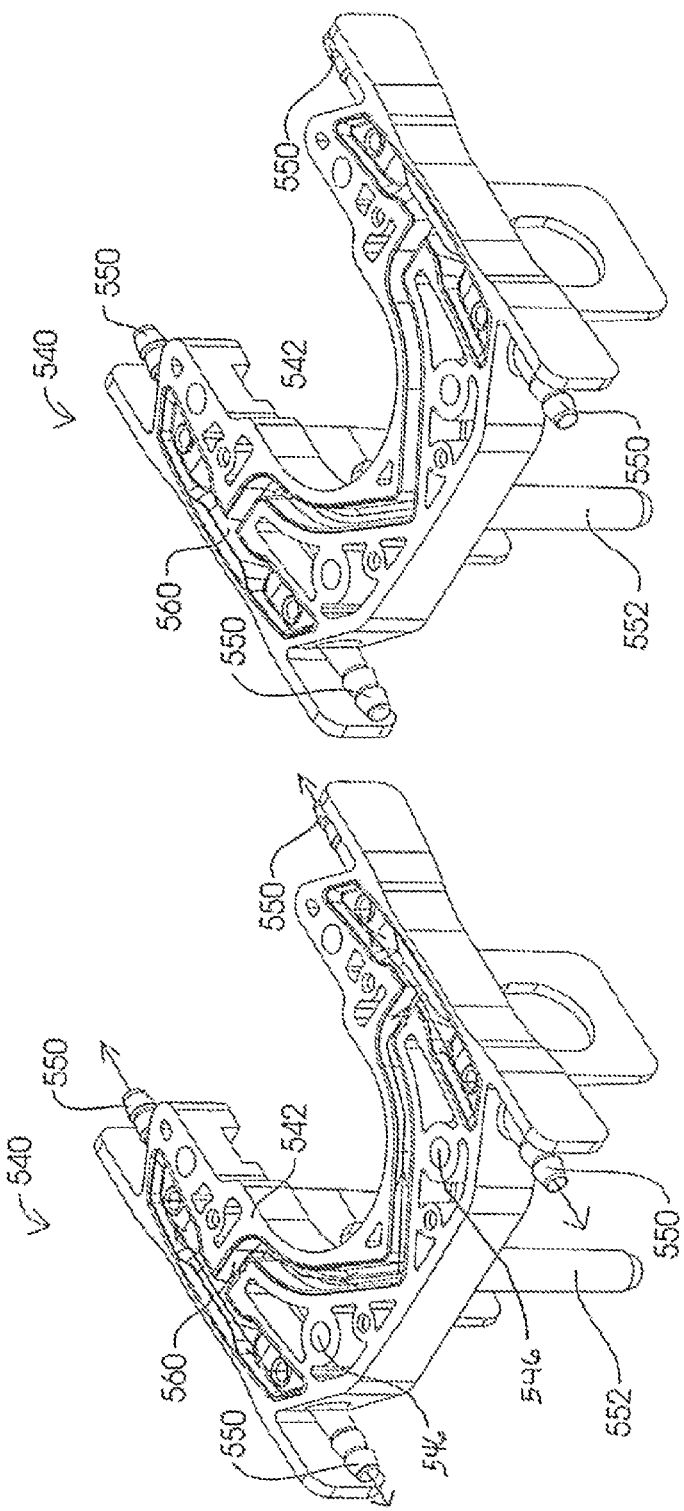

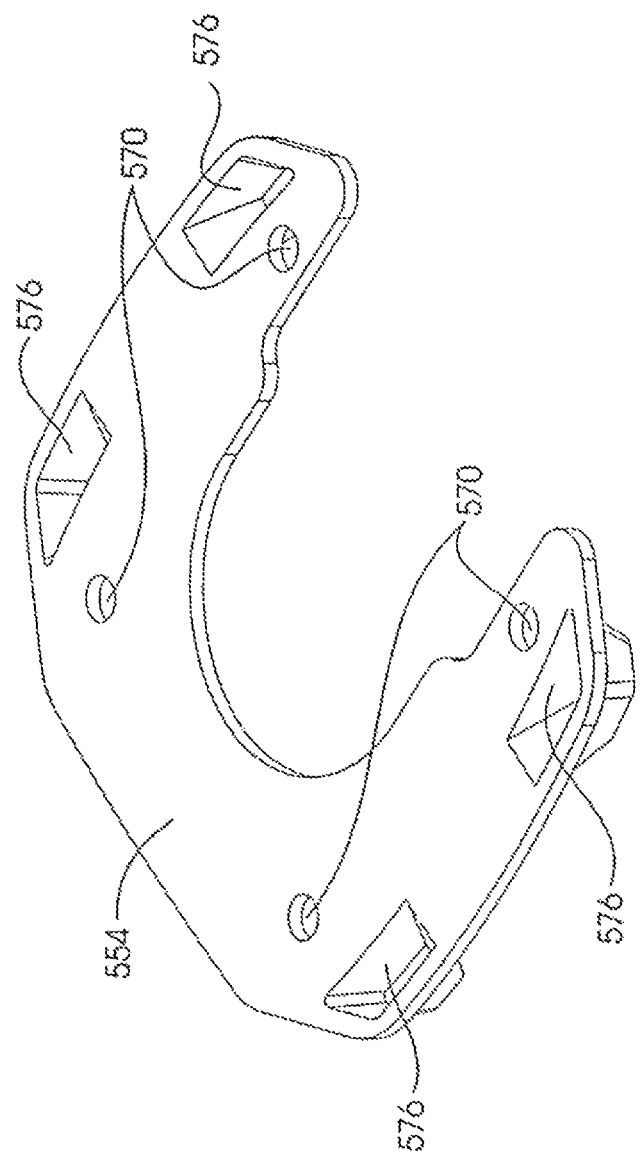

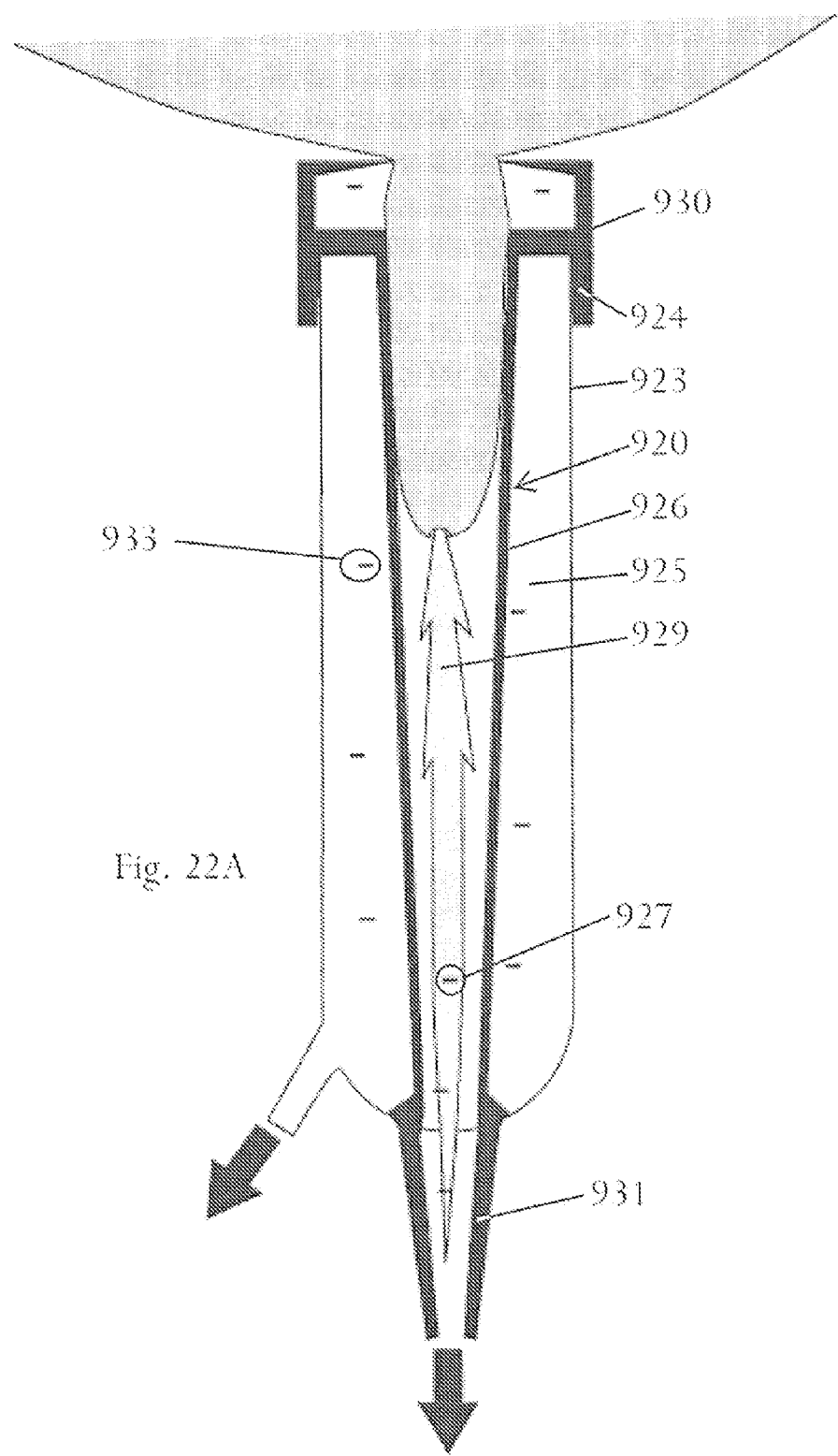

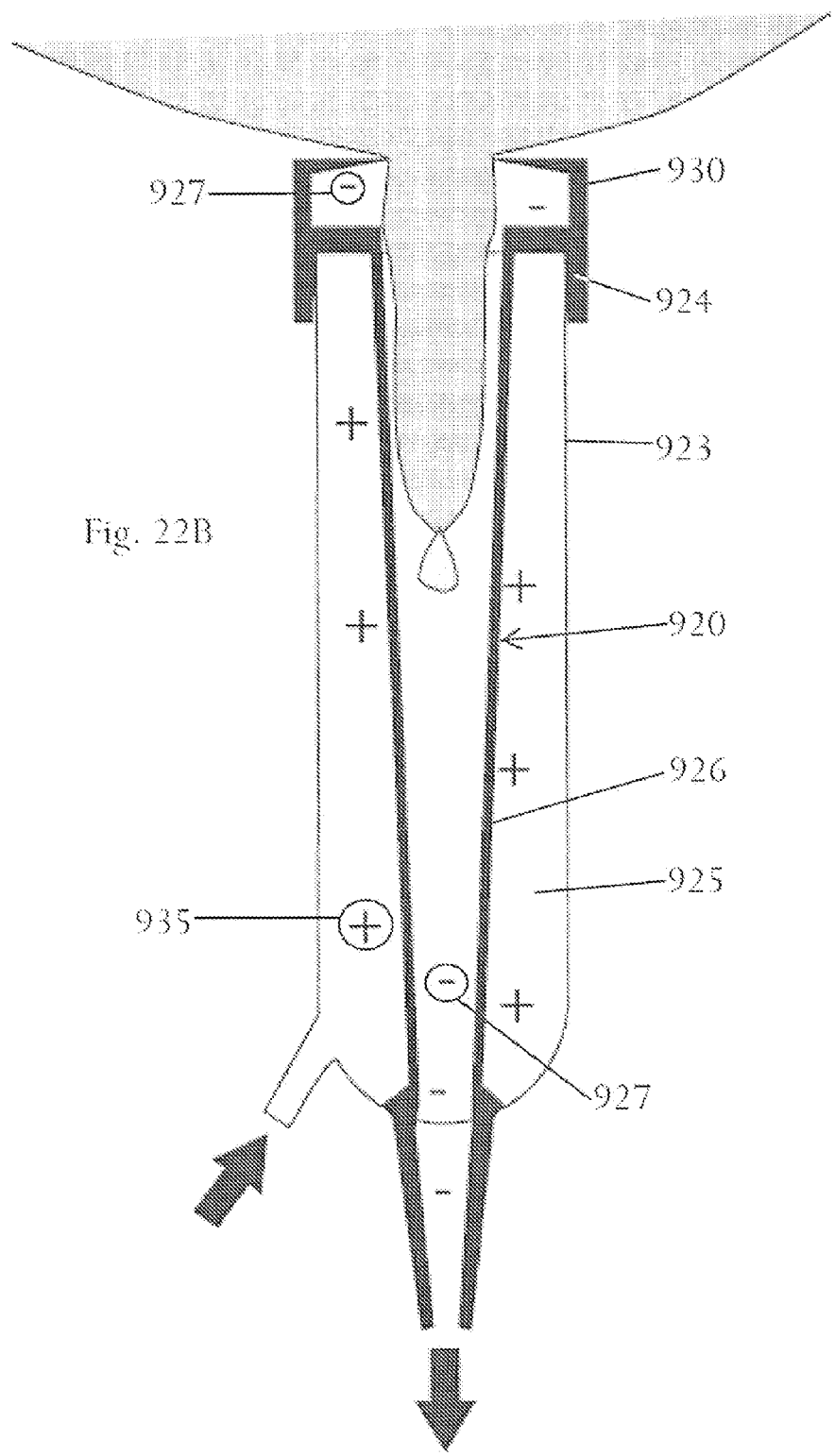

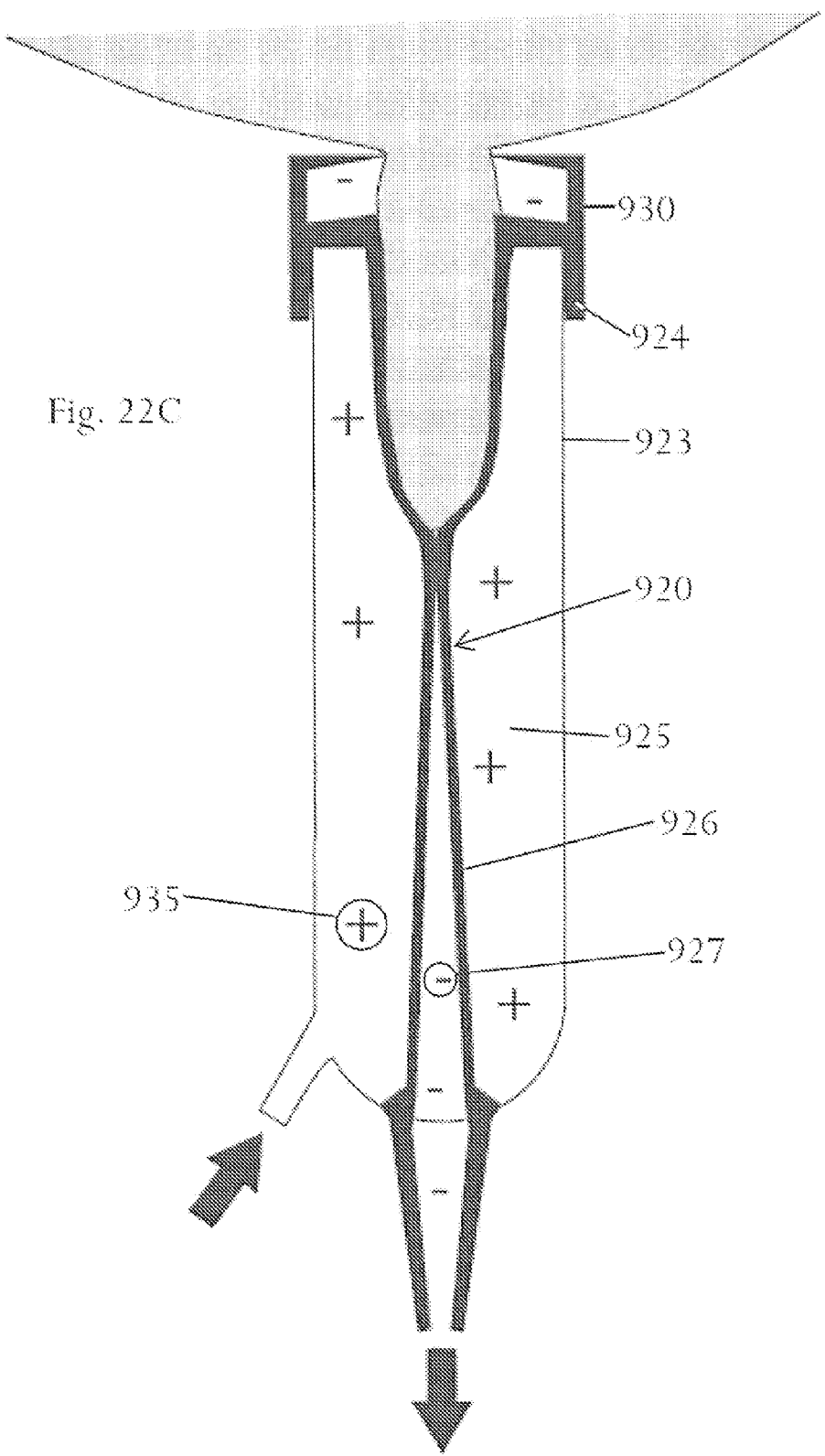

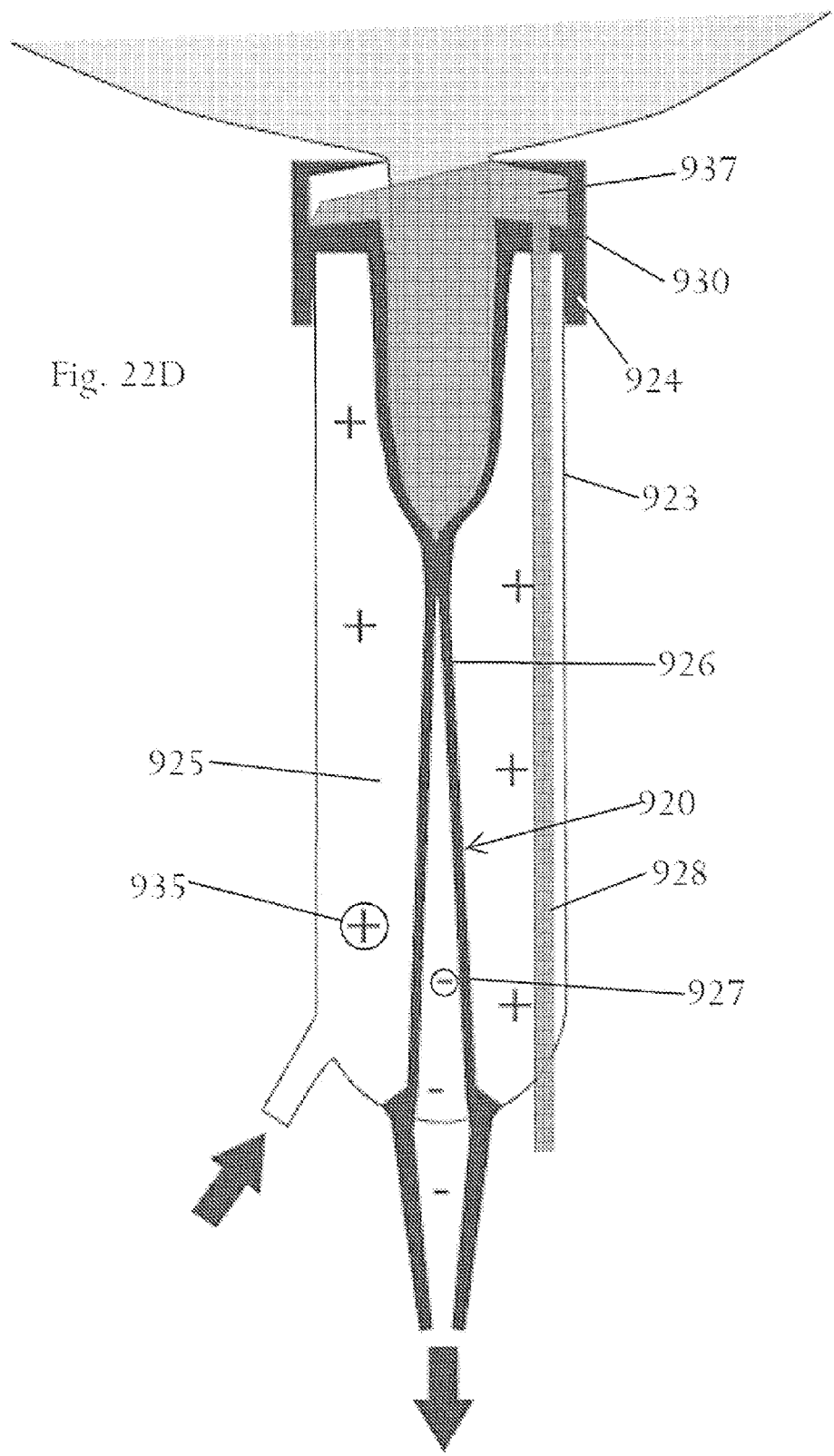

METHODS AND APPARATUS FOR APPLYING TEAT DIP TO A DAIRY ANIMAL

This application is a continuation-in-part of U.S. patent application Ser. No. 12/584,475, filed Sep. 4, 2009, issued as U.S. Pat. No. 8,033,247 on Oct. 11, 2011, and is a continuation-in-part of U.S. patent application Ser. No. 12/584,479, filed Sep. 4, 2009, issued as U.S. Pat. No. 8,025,029 on Sep. 27, 2011, and is a continuation-in-part of U.S. patent application Ser. No. 12/584,480, filed Sep. 4, 2009, issued as U.S. Pat. No. 8,342,125 on Jan. 1, 2013, and is a continuation-in-part of U.S. patent application Ser. No. 13/269,835, filed Oct. 10, 2011, and is a continuation-in-part of U.S. patent application Ser. No. 13/246,398, filed Sep. 27, 2011, and is a continuation-in-part of U.S. patent application Ser. No. 13/729,240, filed Dec. 28, 2012, each of which is incorporated by reference in their entireties.

FIELD AND BACKGROUND OF THE INVENTION

This invention relates to automated teat dipping systems for dairy animals and more particularly to apparatus and methods for applying dip to a teat by injecting dip into the liner dome at the end of milking, and stopping a milking pulsation in a closed position prior to applying the dip to improve teat coverage before detaching the milker unit.

Dairy milking systems as they relate to the present invention include a cluster of teat cups. Each teat cup receives a flexible liner to define a pulsation chamber between the cup and the liner. A dairy animal teat is disposed inside the liner during milking. Milk flows from the cow through each flexible liner and then through a milk tube to a milker unit collecting device, which collects milk from all of the animal's teats. This combination of elements is known as a milker unit and can be used to milk cows, sheep, goats and other dairy animals. Each milker unit is used to milk multiple animals so it must be sanitized, at least periodically, to prevent transmission of dirt and germs into the milk, and to help prevent transmission of diseases from animal to animal.

To attach the teat cup and liner assembly to a dairy animal teat, vacuum is applied through the milk tube. This vacuum also draws milk from the liner into the milk tube and milk collecting device. Milk is drawn from each teat by applying a pulsation of vacuum and atmospheric pressure to the pulsation chamber defined between the teat cup and the flexible liner. When pulsation is in the "on" position, vacuum is applied to the pulsation chamber and the liner exerts little or no pressure on the teat because it is offset by vacuum inside the liner. In the "off" position, the pulsation chamber is exposed to atmospheric pressure, so vacuum inside the liner causes the liner into massaging contact with the teat. Vacuum inside the liner draws milk from a teat and keeps the teat cup and liner attached to the dairy animal teat and draws milk downstream into collection lines. Pulsating between "on" and "off" alternates between milking and massaging of the teat and assures that the bodily fluids inside the teat do not collect at the end of the teat, hindering the milking process. When milking is done, pulsation ceases and vacuum inside the liner is cut off (at least partially) and the teat cup and liner are detached from the teat.

In a representative system, milk from individual animals flows from each collecting device into a milk line and/or piping system that receives milk from all of the milker units in the dairy. The milk is then chilled and stored in a milk tank. The milk lines and storage systems must not be contaminated with dirt, debris, chemicals, pathogens, or contaminated milk.

After milking, dairy animal teats have broadened milk ducts that make them susceptible to new infection from mastitis pathogens. To combat these pathogens, the teats can be treated with a disinfectant solution that adheres well to the teats and which usually also contains a skin-care component. The application of this disinfectant solution is called dipping and can be done with a hand-held dipping cup into which the individual teats are introduced. Dip can also be applied using manual spray devices and foam applicators. Dipping with a cup is especially labor-intensive, but generally has a better success rate and a lower consumption of dipping solution than manual spraying methods.

Some spraying methods are automated to spray dip from a dipping arm or dipping bar toward teats and udders. Automated sprayers are not precise and tend to consume much more dipping solution than manual dipping methods. Other automatic teat dipping applicator systems applied dip upward from the short milk tube toward the bottom of a teat at the end of milking, but before detachment from the milker unit. This arrangement provided some protection, but it did not coat the entire teat uniformly. See U.S. Pat. No. 7,290,497. Others have suggested automated systems that apply dip to an upper teat portion, but most of these failed to provide: uniform dip coverage on teats; consistent volumes of dip application over time; and protection of downstream milk system components from being contaminated by dip and other chemicals.

Much improved automated dipping systems are disclosed in U.S. Pat. Nos. 8,033,247, 8,117,989, 7,707,966, and 7,401,573, for example. Such systems automate the dipping process by injecting teat dip into the liner and onto the teat before the cluster is removed from the cow. Nonetheless, in most milking and teat dipping systems, the timing of the dipping process and the timing of turning pulsation on and off are not coordinated. So, if the milker unit is removed in a normal pulsation sequence, teat dip coverage might not be adequate because dipping could take place too close to the milker unit removal.

As stated above, a pulsation system alternates between 'open' (also called milking position) or 'closed' (also called massaging position). Typically, the coverage of teat dip is not as uniform when the liner is in the open position because the teat at the end of milking is relatively flaccid, empty of milk, and has limited contact with the liner wall. Further, the injected dip can easily break what little teat-to-liner contact there is and cause the milker unit to detach quickly and give the dip an exit path past the teat.

Further complicating automated teat dipping is that modern pulsation systems can be alternating pulsation systems having two liners in a single milker unit that are in a closed position while the other two liners in the same milker unit are in open positions, as opposed to simultaneous pulsation systems where all four liners are either open or closed. Without managing the pulsation during the dipping process in alternating pulsation systems, two of the four teats are disadvantaged for proper dip application.

Thus, there is a need for automated teat dip applicators and methods to ensure uniform dip coverage around and along a dairy animal teat.

SUMMARY OF THE INVENTION

The present invention is directed to an automated dipping system that applies dip to a dairy animal teat by injecting dip into the liner dome at the end of milking. Improved uniformity of dip coverage is possible with the present invention because prior to injection of teat dip into the liner dome, pulsation to the liner and teat cup assembly pulsation chamber is stopped in an "off position" (atmospheric pressure in the pulsation chamber). This allows vacuum in the liner to fully collapse the liner around the teat before teat dip is applied. The teat dip is distributed more uniformly by the vacuum in the liner to improve coverage before and while the milker unit is detached from the animal. Also, the dip helps "break" the liner seal around the teat and the milker unit will easily drop from the animal.

Coordinating the pulsation to cease in the "off position" right before the application of dip causes the liner to close around the barrel of the teat, holding the cluster in place. In addition, applying dip "breaks" the vacuum when the liners are collapsed around the teats. This in turn causes dip to be drawn down the shaft of the teat, promoting more complete coverage and using less dip in the process.

Commercially available detachers control the vacuum pulsation valve with a network communication connection between individual automated dip controls and detacher/pulsation control to coordinate the timing between the dipping and pulsation control. This coordination of functions can be done via hardwire or electromechanical control or built in as a separate function in the pulsation controller.

Dipping while the liner is closed around a teat improves dip coverage because the higher pressure outside of the liner (inside the pulsation chamber) presses the liner wall into the teat, which holds the cluster on the cow until the dip pressure in the liner starts to rise and equalize pressure with the pressure in the pulsation chamber. The closed liner allows the dip to pool around the top of the teat and reduces the amount of dip flowing past the teat without coating the teat.

A method of automatically applying a dip to a dairy animal teat in accordance with the present invention includes the steps of discontinuing pulsation to a pulsation chamber between a teat cup and a liner; maintaining vacuum in the liner; maintaining atmospheric pressure in the pulsation chamber; and applying teat dip to the dairy animal teat. The method can also include the step of allowing vacuum in the liner to spread dip along the dairy animal teat.

The step of discontinuing pulsation to the pulsation chamber takes place when the pulsator is in the "off position" (atmospheric pressure in the pulsation chamber) and can have a duration of between about 0.1 second and about ten (10) seconds before applying the dip, or a duration of between about 0.1 second and about three (3) seconds before applying the dip. In an alternate method, the step of discontinuing pulsation to the pulsation chamber takes place when the pulsator is in the "off position" (atmospheric pressure in the pulsation chamber) and can have a duration of between about three (3) seconds and about thirty (30) seconds before applying dip.

The step of applying dip can be performed by applying dip having a viscosity of between about 1 centipoise and about 20 centipoise, or a viscosity of between about 21 centipoise and about 40 centipoise.

The step of applying a dip to a dairy animal teat can include feeding dip through an opening in the liner and directing the dip toward flow diverters in the dome of the liner and to the dairy animal teat, or spraying the teat directly with dip.

The step of applying a dip to a dairy animal teat can also include the steps of injecting dip through an opening in the liner and directing the dip toward flow diverters in the dome of the liner and to the dairy animal teat to apply dip to a substantially annular surface of the dairy animal teat.

The step of pressurizing the pulsation chamber to a pressure above atmospheric pressure can also be used with the method.

BRIEF DESCRIPTION OF THE DRAWINGS

FIG. 1B is a perspective schematic view of an alternate embodiment of a dip applicator and backflushing system in accordance with the present invention;

FIG. 6B is a left side view of the valve block of FIG. 6A with solenoid valves removed;

FIG. 6C is a side cross sectional left side view of the valve block of FIG. 6A with solenoid valves removed;

FIG. 7C is a front cross sectional right view of a dosage valve in accordance with the present invention in a dip ready position;

FIG. 7D is a front cross sectional right view of a dosage valve in accordance with the present invention in a dipping position;

FIG. 9A is a cross sectional view of a dosing valve in accordance with the present invention in a milking position;

FIG. 9B is a cross sectional view of the dosing valve of FIG. 9A in a backflush position;

FIG. 11A is a perspective view of a backflush piston in accordance with the present invention;

FIG. 11B is a side view of the backflush piston of FIG. 11A;

FIG. 11C is a top view of the backflush piston of FIG. 11A;

FIG. 16D is a perspective view of the underside of the top plate;

FIG. 19A is a perspective view of a dip manifold in accordance with the present invention;

FIG. 19B is the dip manifold of FIG. 19A with the cover removed to show a diaphragm valve in accordance with the present invention;

FIG. 19C is the dip manifold of FIG. 19B with the diaphragm valve removed to show dip flow paths through the dip manifold;

FIG. 19D is the drawing of FIG. 19C with the flow paths removed;

FIG. 19H is a diaphragm valve for use in the dip manifold;

FIG. 22A is a side cross sectional view of a teat cup and liner with a dairy animal teat disposed therein, and the teat cup and liner define a vacuum chamber to which a partial vacuum is applied (the "on" position) in a method according to the present invention. There is also vacuum on the inside of the liner drawing milk out of the teat;

FIG. 22B is a side cross sectional view of FIG. 22A with atmospheric pressure entering the vacuum chamber to begin an "off position" for the pulsation system, before the liner collapses onto the teat;

FIG. 22C is a side cross sectional view of FIG. 22A with atmospheric pressure in the vacuum chamber and pulsation in the "off position" with the liner in massaging contact with the teat;

FIG. 22D is a side cross sectional view of FIG. 22A with the vacuum chamber exposed to atmospheric pressure and pulsation in the "off position", and teat dip being applied to the top of the animal teat in accordance with the present invention.

DETAILED DESCRIPTION OF THE DRAWINGS

Figure 1A:
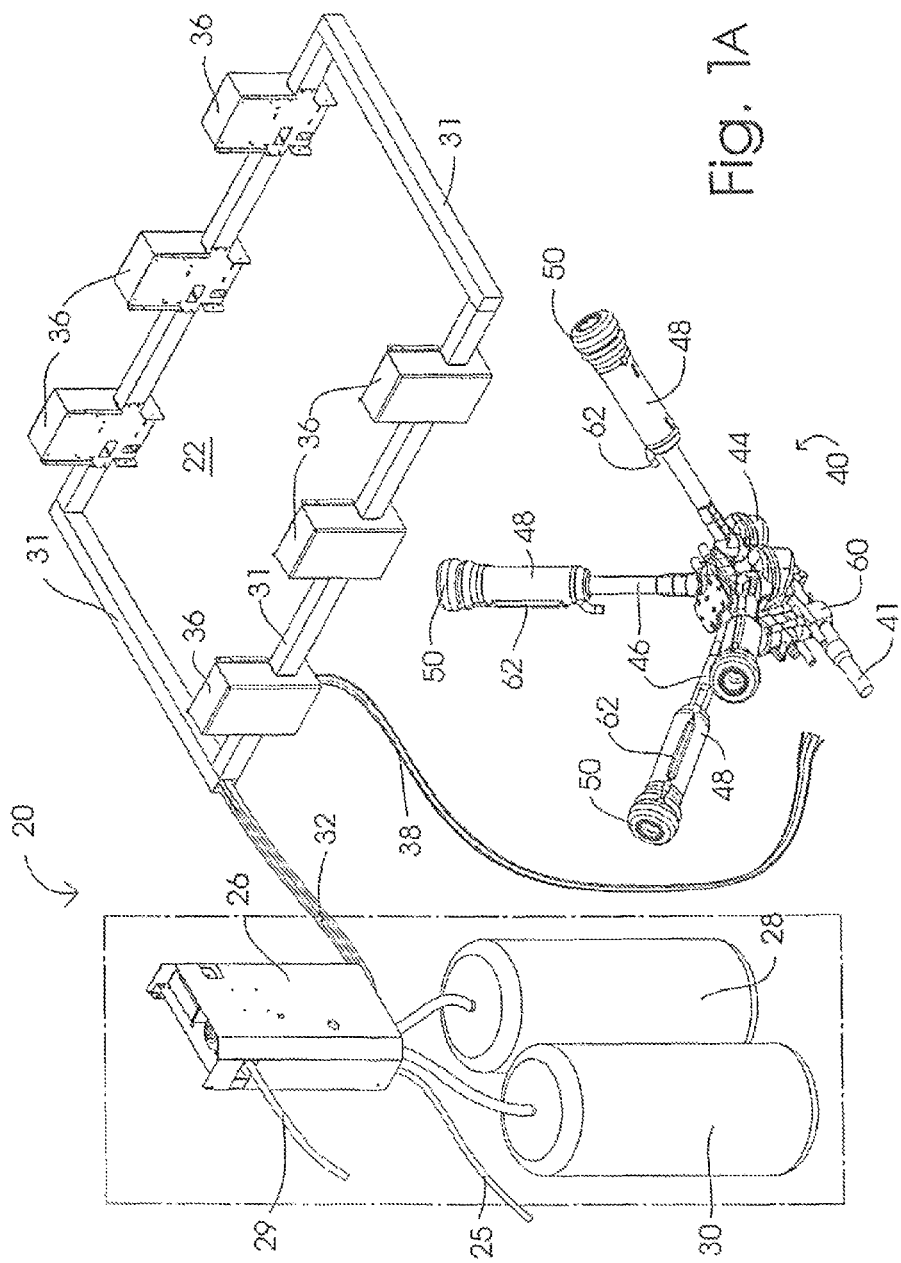
FIG. 1A is a perspective schematic view of a dairy harvesting facility including a milker unit backflushing and teat dip applicator system in accordance with the present invention.
Figure 2A:
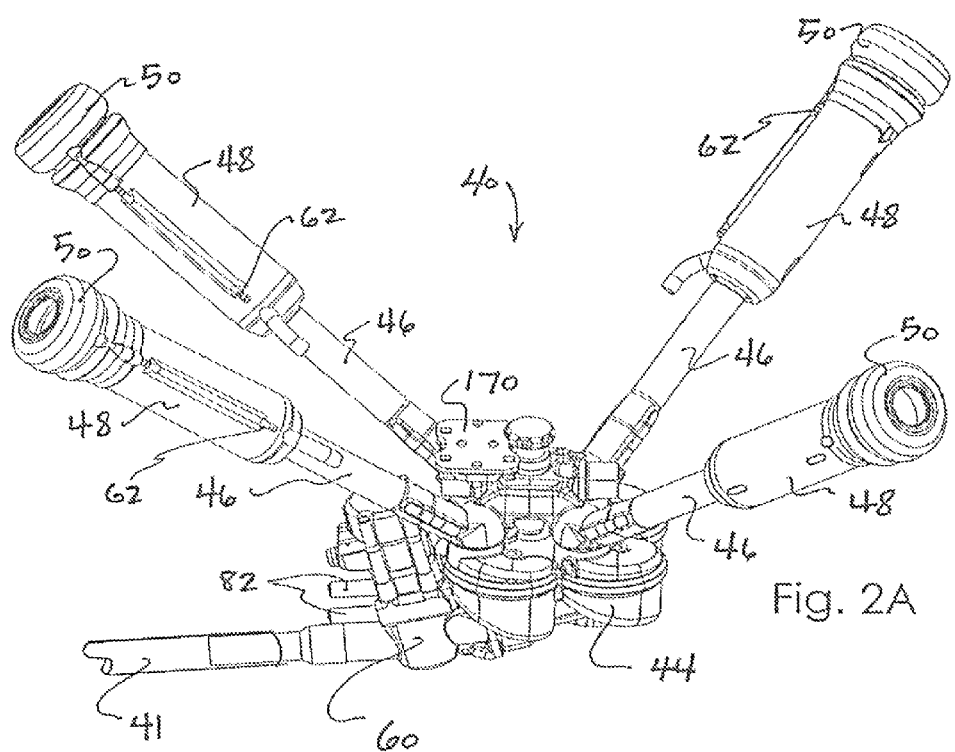
FIG. 2A is a perspective view of a milker unit and safety valve in accordance with the present invention.
Figure 2B:
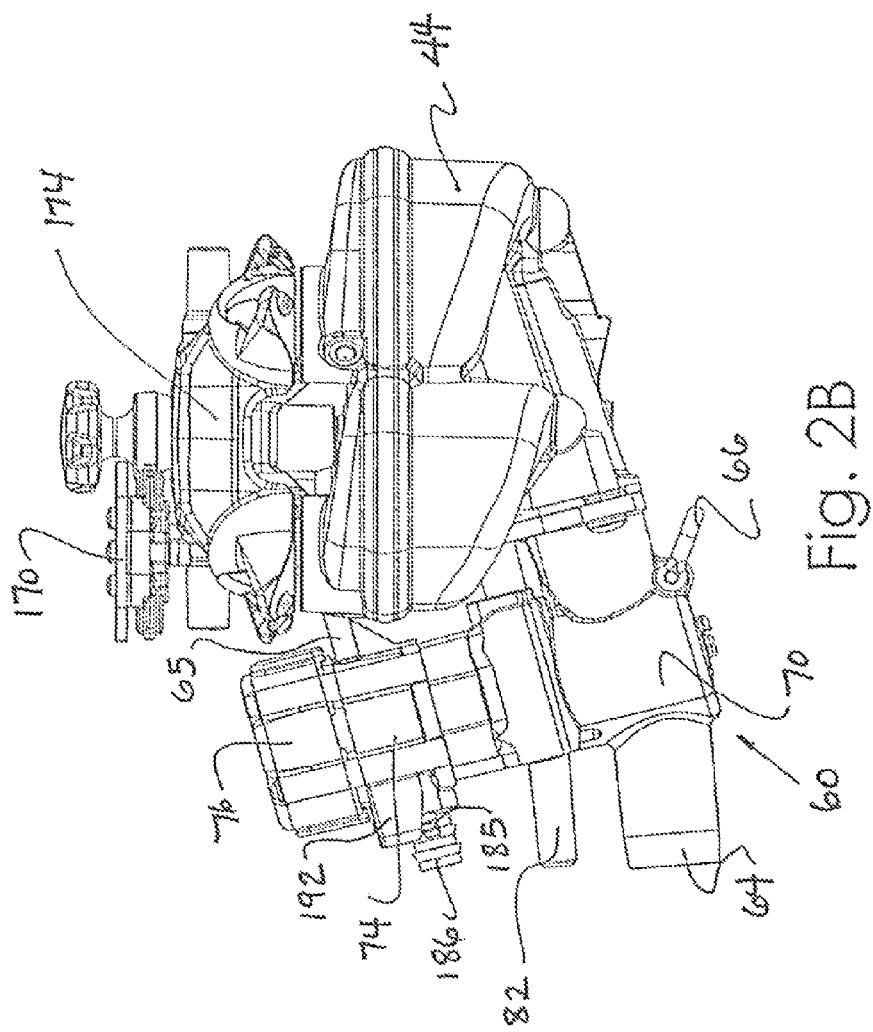
FIG. 2B is a side view of the milker unit and safety valve of FIG. 2A.
Figure 2C:
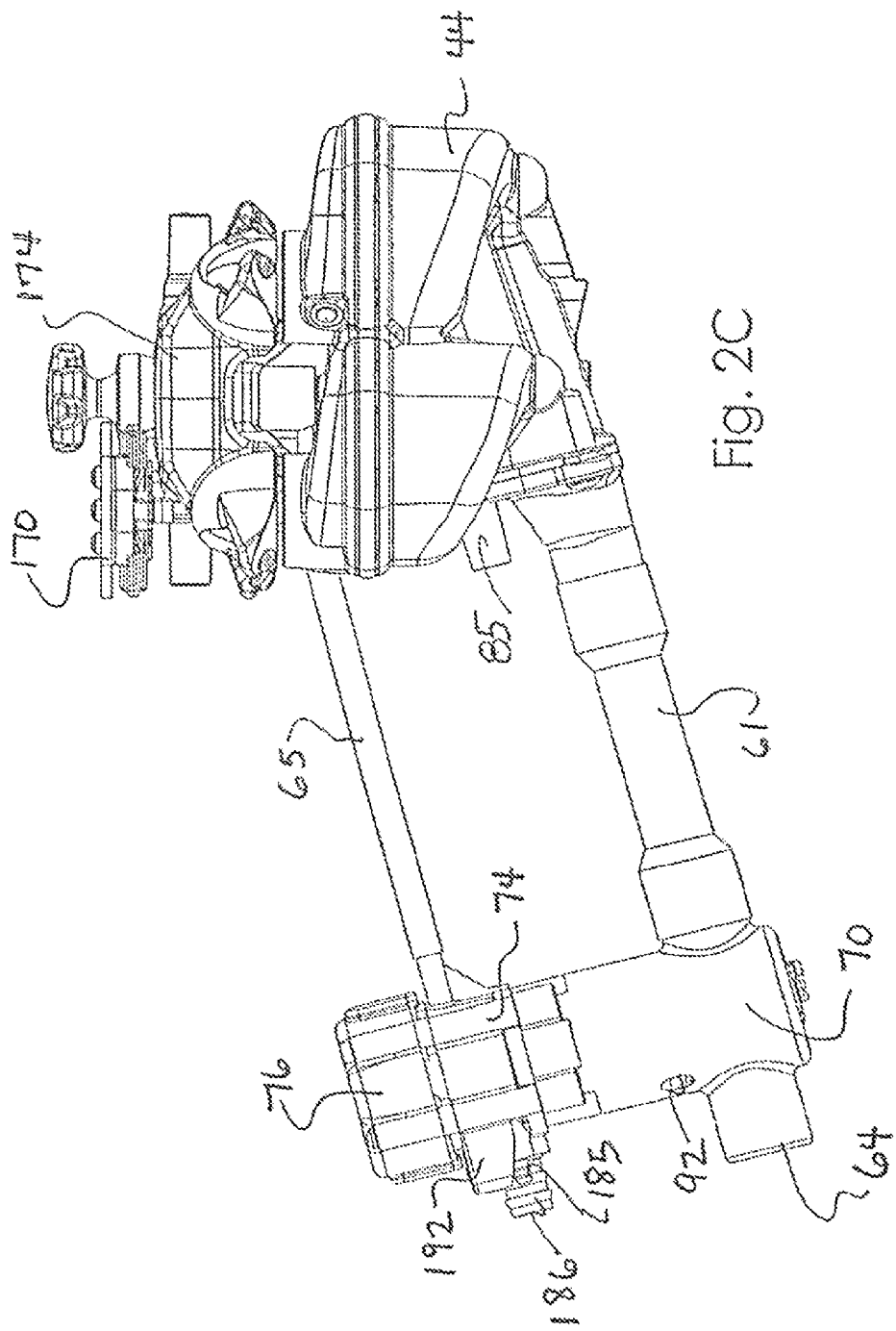
FIG. 2C is a side view of an alternate embodiment of a milker unit and safety valve arrangement in accordance with the present invention.
Figure 3:
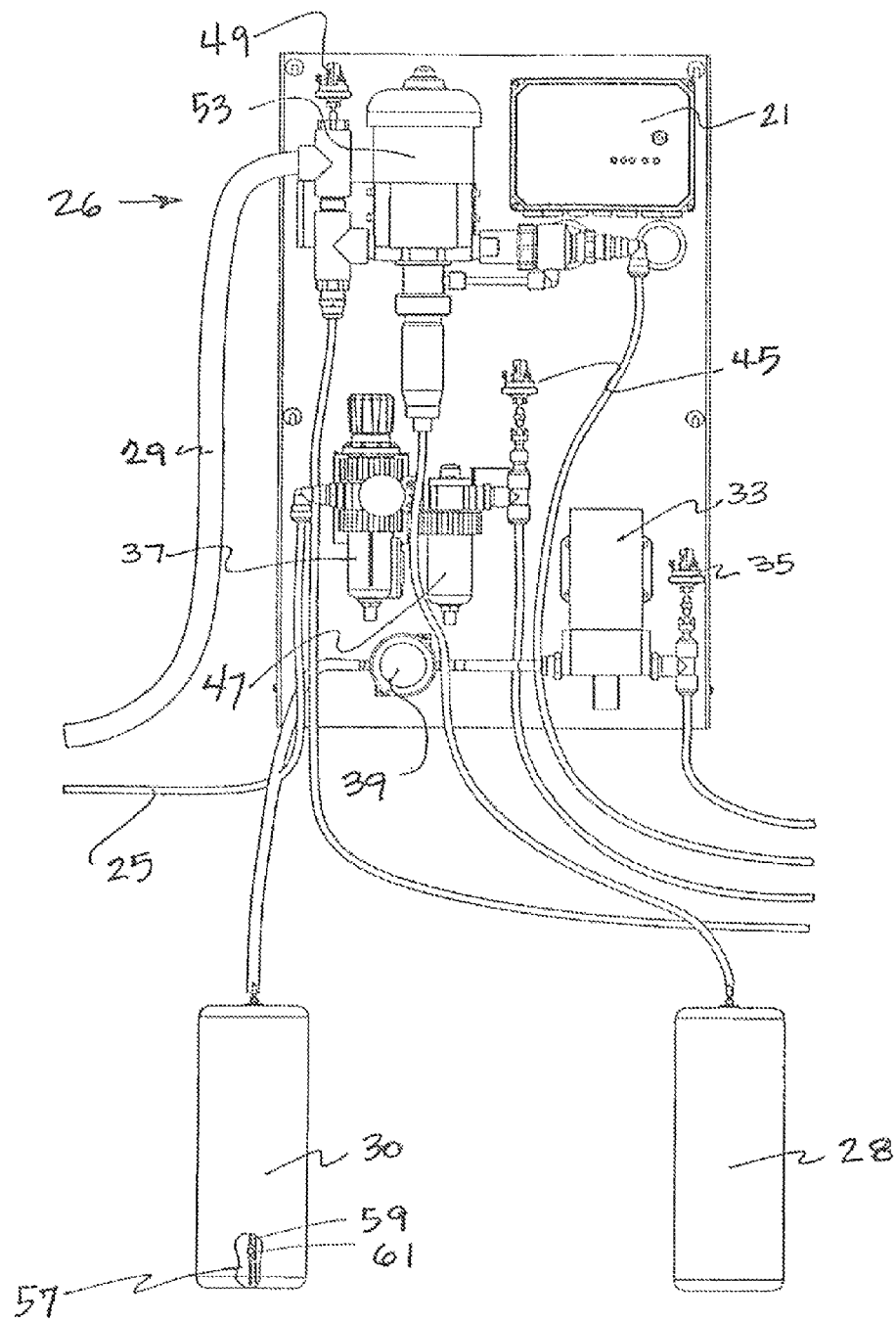
FIG. 3 is a front view of a main controller and supply tanks for a backflushing and teat dip applicator system in accordance with the present invention.
Figure 4A:
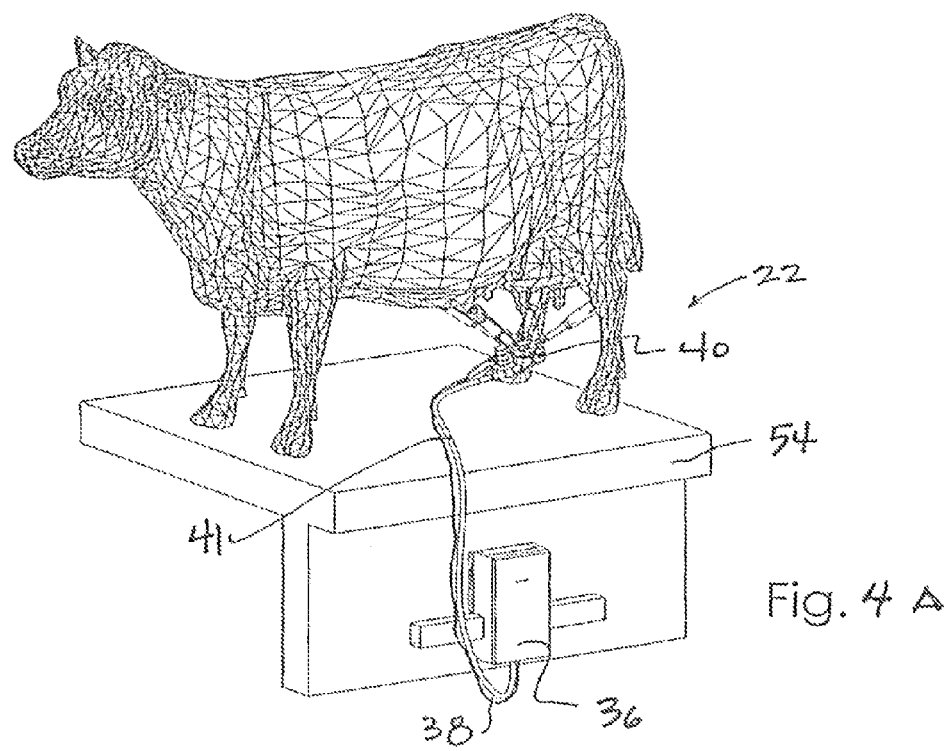
FIG. 4A is a perspective view of a stall control and a milker unit in the milking position, the milker unit having the backflushing and teat dip applicator unit of the present invention.
Figure 4B:
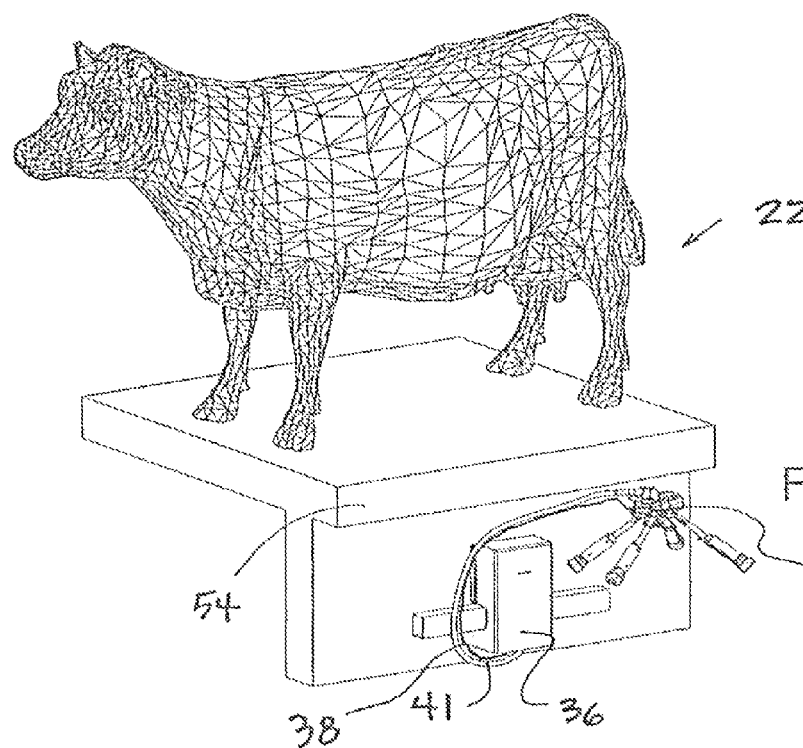
FIG. 4B is a perspective view of the milking stall and milker unit of FIG. 3A, with the milker unit in a backflushing position.
Figure 5A:
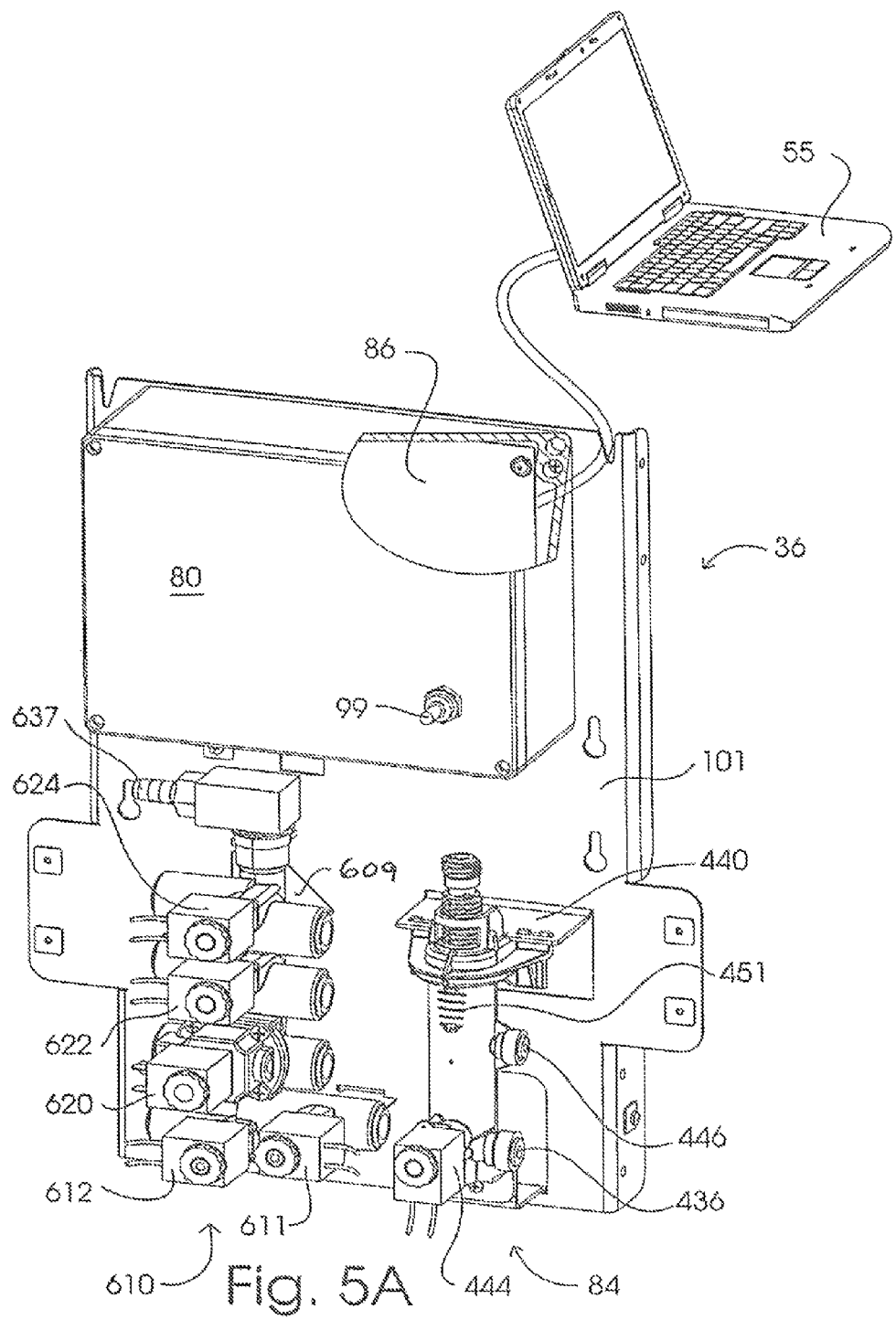
FIG. 5A is perspective view of a stall controller that can be used to control backflushing and teat dipping at an associated milking stall in accordance with the present invention.
Figure 5B:
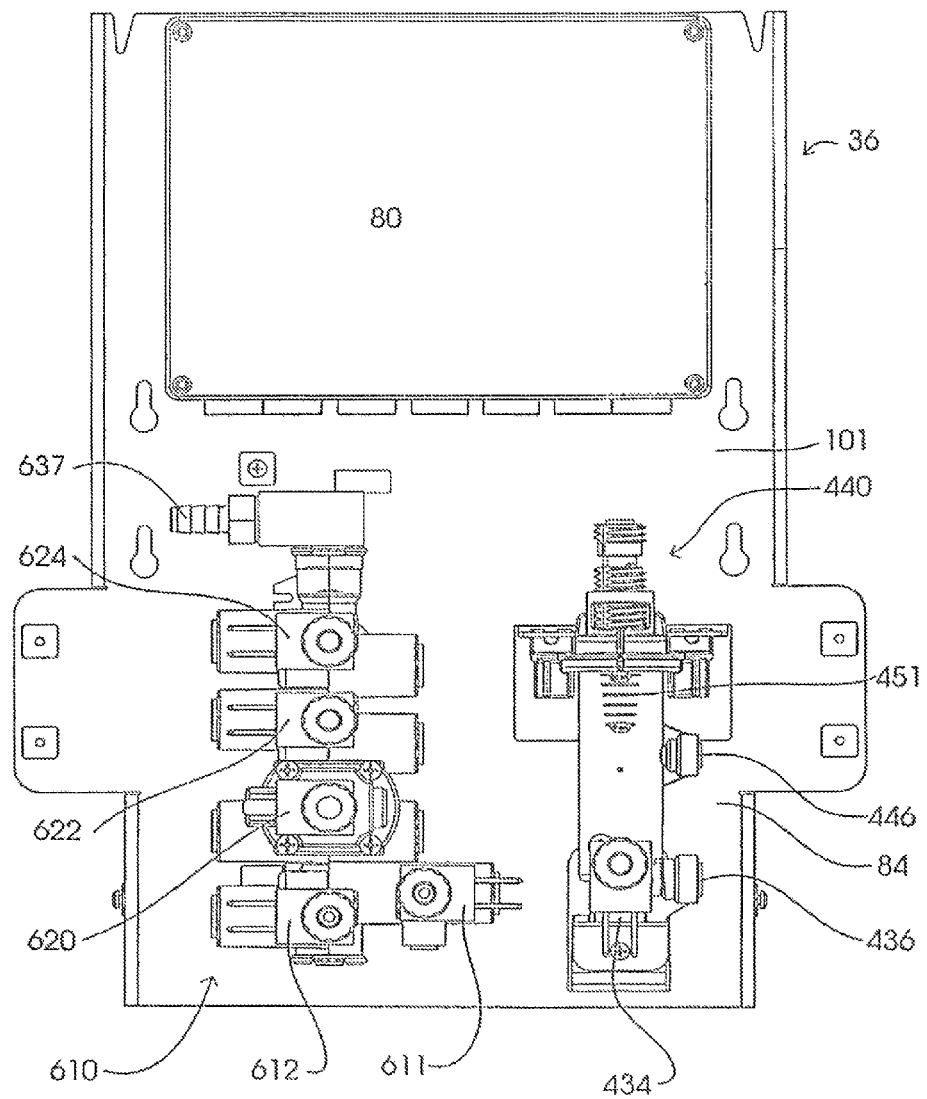
FIG. 5B is front view of the stall controller of FIG. 5A.
Figure 6A:
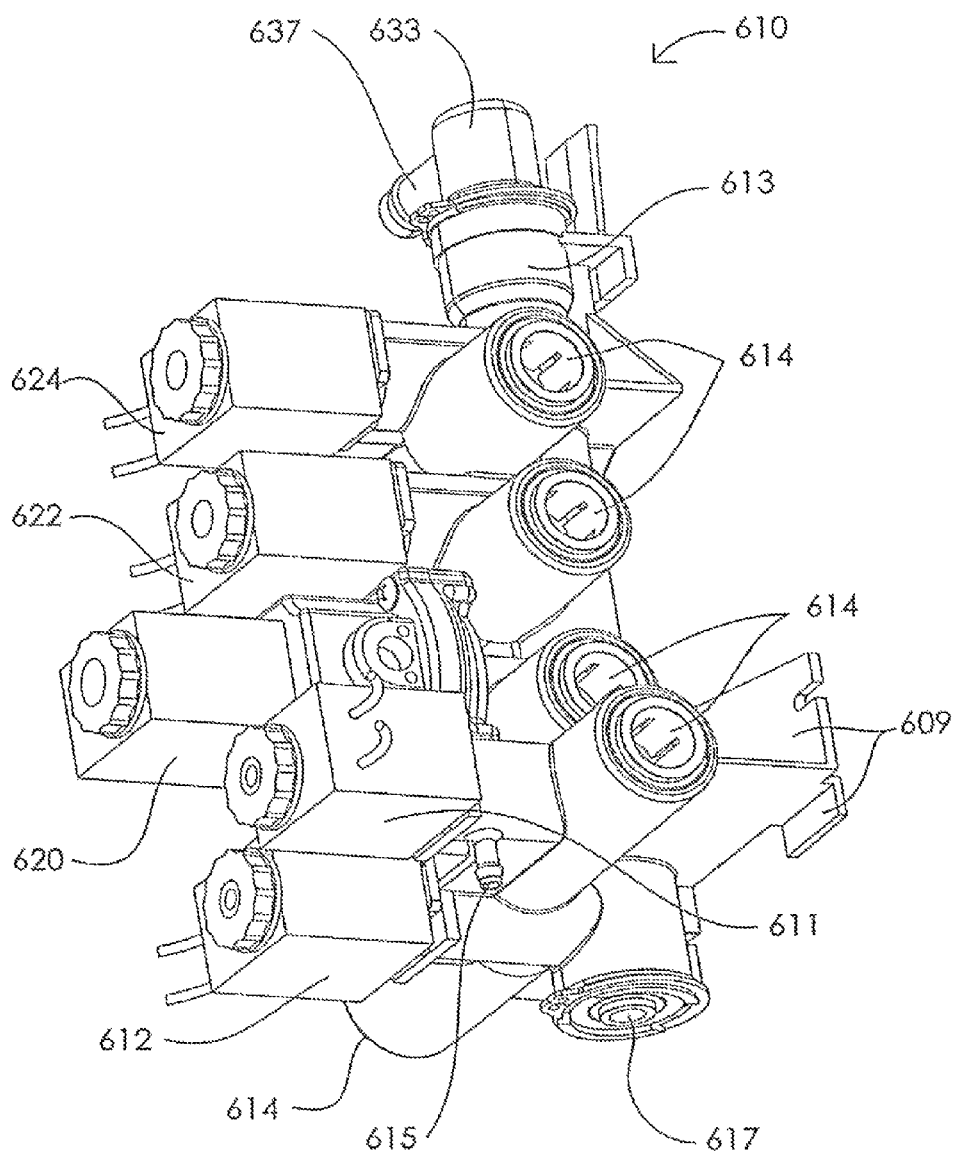
FIG. 6A is a perspective view of a valve block in accordance with the present invention.
Figure 6D:
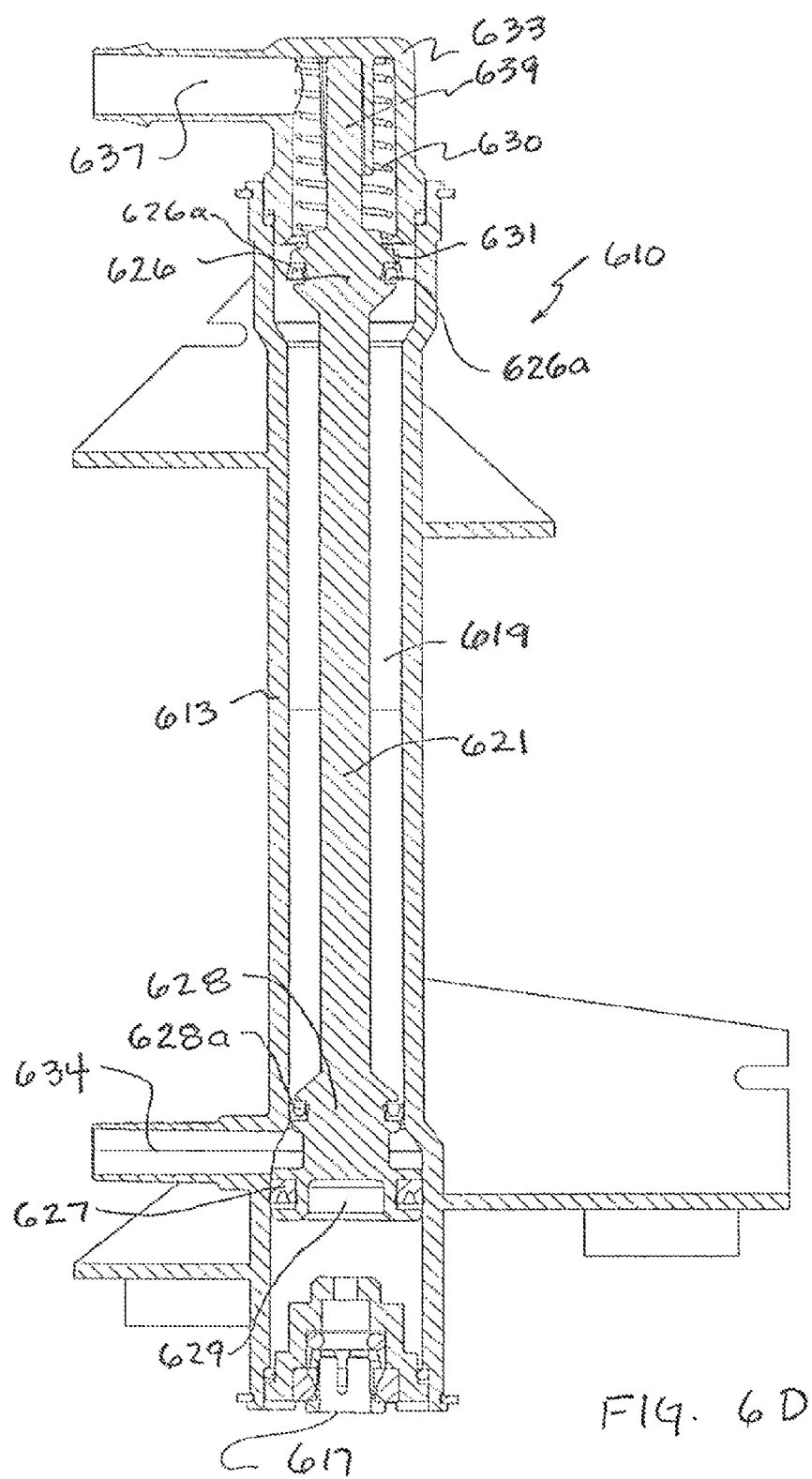
FIG. 6D is a side cross sectional front view of the valve block of FIG. 6A with solenoid valves removed.
Figure 7A:
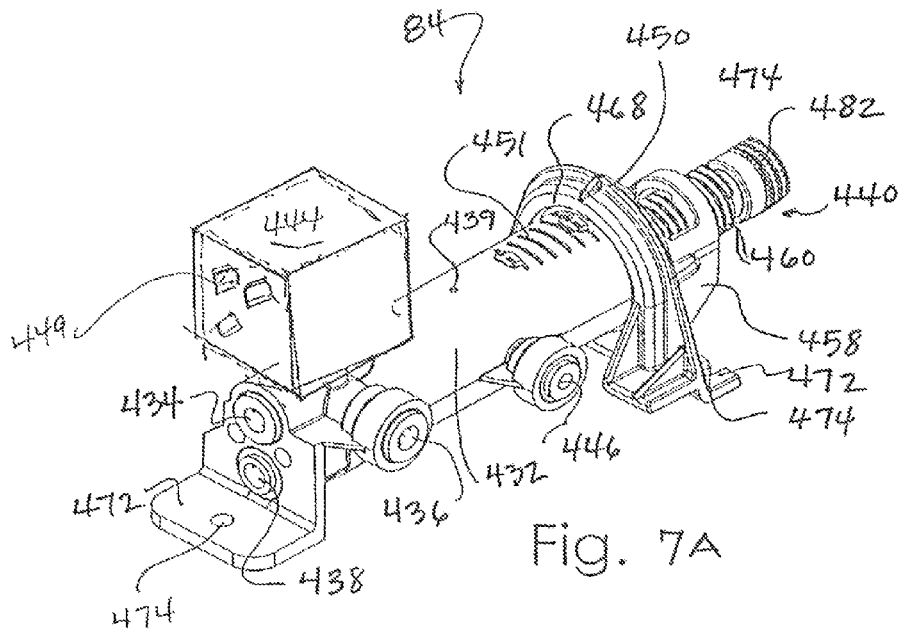
FIG. 7A is a perspective view from the lower right of a dosage valve in accordance with the present invention.
Figure 7B:
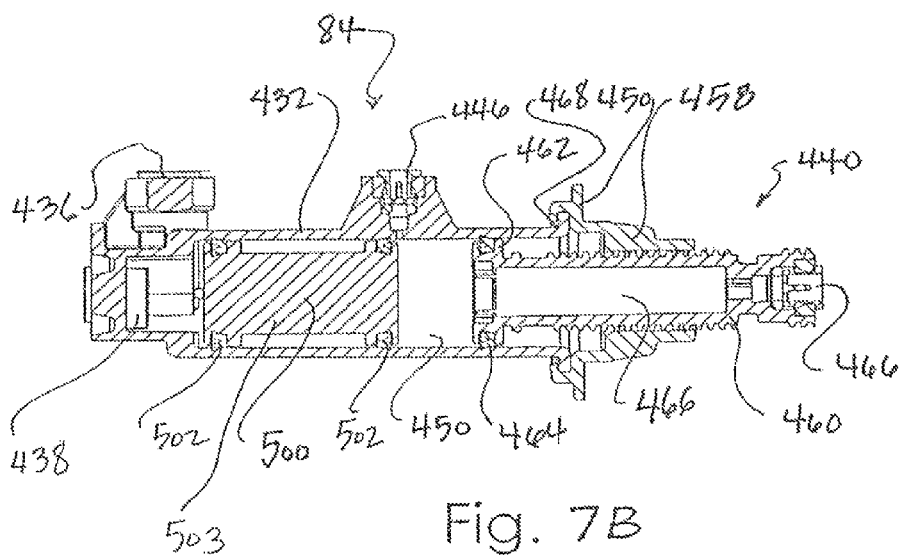
FIG. 7B is a side cross sectional right view of a dosage valve in accordance with the present invention.
Figure 7E:
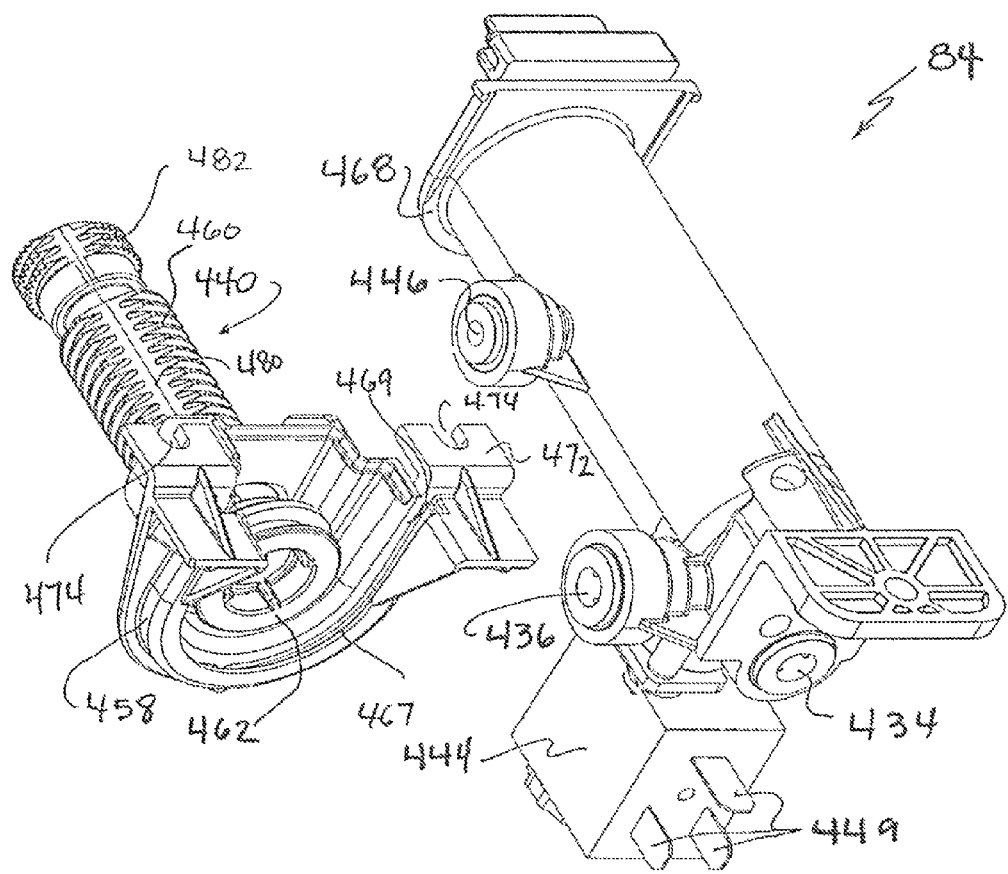
FIG. 7E is a disassembled perspective of a dosage valve in accordance with the present invention.
Figure 8A:
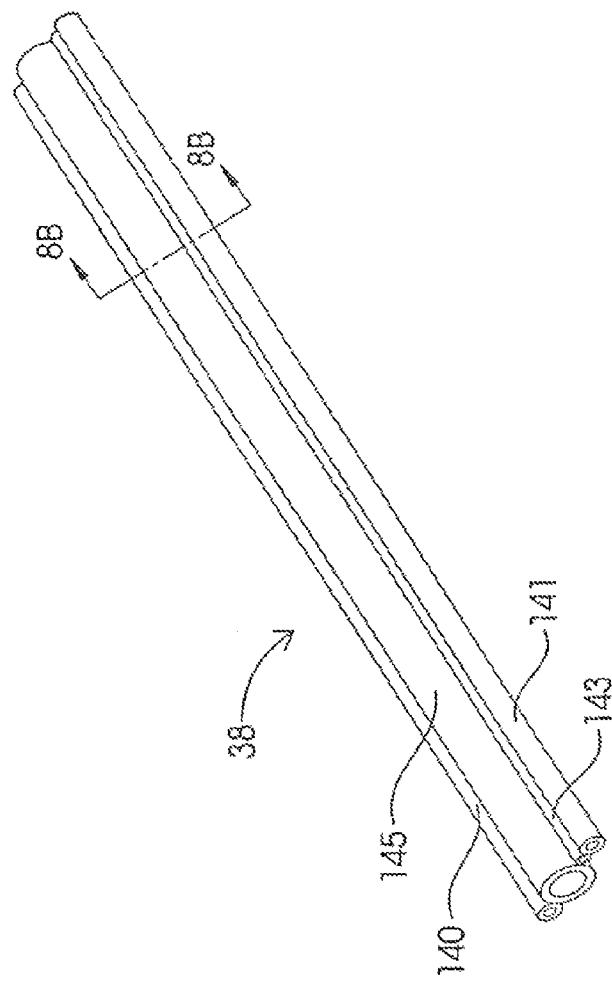
FIG. 8A is a perspective view of a hose combination for communicating multiple fluids between components of the present invention and computer that can program and reprogram the stall control.
Figure 8B:
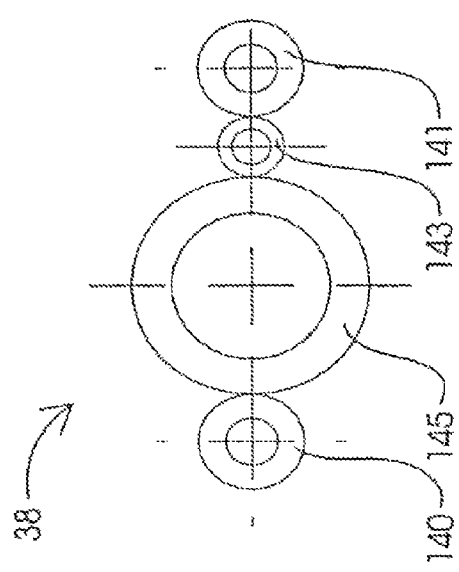
FIG. 8B is a cross sectional view of the hose combination of FIG. 8A.

FIGS. 1A, and 2A through 5B generally illustrate an automatic teat dip applicator and milker unit backflushing system 20 disposed in a dairy harvesting facility 22, in accordance with the present invention.

The teat dip applicator and milker unit backflushing system 20 is referred to herein as "the system 20" and preferably includes: a main control 26; a compressed air supply 25; a backflush chemical supply 28; a water supply 29; a teat dip supply 30; a conduit 31 for housing appropriate hoses and piping 32; stall controls 36 for each milking stall; a stall supply hose 38; a milker unit 40 for each stall, and a safety valve 60 for each milker unit 40. The main control 26 and other controls are connected to an appropriate electrical power supply (not illustrated).

The milker unit 40 (FIGS. 1A, 2A, 2B, and 2C) includes: a milker bowl collector 44; four short milk tubes 46; four teat cups 48; four teat cup liners 50 disposed in the teat cups 48; a milker unit safety valve 60 for controlling fluid flow for teat dipping and backflushing operations; and teat dip delivery channels 62 (FIG. 2A) for delivering teat dip to upper portions of an animal's teats. The teat cups 48 with liners 50 are attached to a dairy animal's teats and alternating vacuum (pulsation) through hoses (not illustrated) is applied to milk the animal. Milk flows from the liners 50, through the short milk tubes 46, into the bowl and claw collector 44, and through the long milk tube 41 to the main dairy milk lines.

The system 20 preferably combines teat dipping and backflushing processes, but the system 20 can be within the scope of the present invention by including only a milker unit backflushing feature without a teat dip applicator or vice versa. Having only a backflushing feature is useful for automatically backflushing each milker unit 40 after each milking or at least periodically to ensure optimum hygiene of the milker units 40. In a preferred embodiment, the teat dip applicator is a part of the same unit as the backflusher, but the teat dip applicator components can be added to the backflusher even after the safety valve 60 has been installed on a milker unit 40. The system 20 of the present invention can be used in dairy harvesting facilities of any configuration including rotary milking parlors.

FIG. 1B illustrates another teat dip and backflushing system that includes an applicator 831 that applies dip to a cow or other dairy animal teat. The applicator 831 includes a control panel 832 and a dip manifold 834. A teat cup shell 836, a liner 838, a first backflush valve 840, a short milk tube 842, a milker unit collection bowl 844, milk line 846, and a second backflush valve 848 are also provided to work as part of or in conjunction with the applicator 831.

The control panel 832 remotely controls operation of the teat dip application system 830. It can be automated with suitable manual overrides or it can be operated by manually engaging various control buttons in response to audible and/or visual signals reflecting the stage of a milking and backflush operation.

The control panel 832 controls the flow of air 837, water 839, teat dip 841, and any appropriate three-way valve ventilation that may be necessary. A vent 845 is also provided. The control panel 832 can remotely control valves elsewhere within the system 830 or it can incorporate valves and hose connections for controlling air, water, teat dip, and valve ventilation. The control panel 832 is in fluid communication with the dip manifold 834 via a manifold hose 850. The dip manifold 834 is illustrated as feeding a single teat dip applicator and milker unit combination, but the manifold 834 preferably serves a number of liners 838 and milker unit combinations. The dip manifold 834 is in fluid communication with each teat dip liner 838 via a dip hose 852.

The dip hose 852 preferably tracks along the short milk tube 842, the first backflush valve 840, and passes into the teat cup shell 836 where it is protected from damage. Alternatively, the dip hose 852 could travel an alternate route to the teat cup shell 836. The dip hose 852 can also be routed on the exterior of the teat cup shell 836, or be part of an integral duct (not illustrated) formed in the teat cup shell 836. The dip hose 852 forms part of a fluid conduit through which teat dips, air, and water pass.

Once a sufficient amount of dip is applied, the dip manifold 834 shuts off the flow of dip. Dip cannot be left inside the liner 838 because it may contaminate milk from the next cow. Backflushing of the liner 838 is therefore desirable. There are at least two options to backflush the liner 838. In one option, the second backflush valve 848 is opened to deliver a backflushing fluid 859 such as water or a suitable chemical into the milk line 846, through the milker unit 844, the short milk tube 842, the first backflush valve 840 (if present), and out of the liner 838. In a second option, the first backflushing valve 840 is used, and only the liner 838 is backflushed while the milk line 846 is isolated by the backflushing valve 840.

Automatic operation of the system 830 relies on an end-of-milking signal from a milk sensor (not illustrated) that activates the control panel 832 to shut off vacuum to the milker unit 844. The first backflush valve 840 is then closed to isolate the liner head nozzle 864 from the milker line 846 to protect the milk line 846 from being exposed to dip and backflushing fluid 859. Preferably, only the second backflush valve 848 is used, and it is activated by the control panel 832 to shut off the milk line 846 from the milker unit collection bowl 844.

The control panel 832 then operates a three-way valve to connect the control panel 832 to the manifold hose 850 and delivers dip into the manifold hose 850, manifold 834, dip hose 852, liner head chamber 862, and liner head opening 864. The amount and pressure of the dip 851 is controlled by the valves and the pressure of the source of dip.

Air is then forced through the manifold hose 850, manifold 852, dip hose 852, and liner head chamber 862 to force dip out of the liner head opening 864. As the milker unit 844 then begins detachment via a standard detacher mechanism (not illustrated), the liner head 860 mouth wipes dip down the teat sides and deposits an excess dip amount on the teat end.

Next, normal backflush cycles are used as described above to sanitize the liner between milkings and rinse out any teat dip residue. The system 830 is now ready to repeat the cycle.

Safety Valve Operation

As stated above, the safety valve 60 must move between a milking position (FIG. 9A) and a backflushing position (FIG. 9B) to prevent contamination of the milk supply by the teat dip or backflushing fluids. Due to pressure differentials on opposite sides of the safety valve 60, it is desirable to do more than simply seal off chemical, air, or other fluid lines from the milk supply. With the present invention, the pressure differential on each end of the safety valve 60 is avoided with vents exposed to atmospheric pressure to "bleed" off any pressure differential that may cause unwanted seepage past a seal. In this manner, pressures on each side of the safety valve 60 are isolated from one another and seepage of chemicals, air, and other fluids into the long milk tube and milk supply is prevented. Generally, seals are provided in pairs with a vent to atmosphere disposed between the seals of each pair. This arrangement provides a "block-bleed-block" function to ensure that fluid to that seeps past one seal cannot seep past the other seal.

Figure 9C:
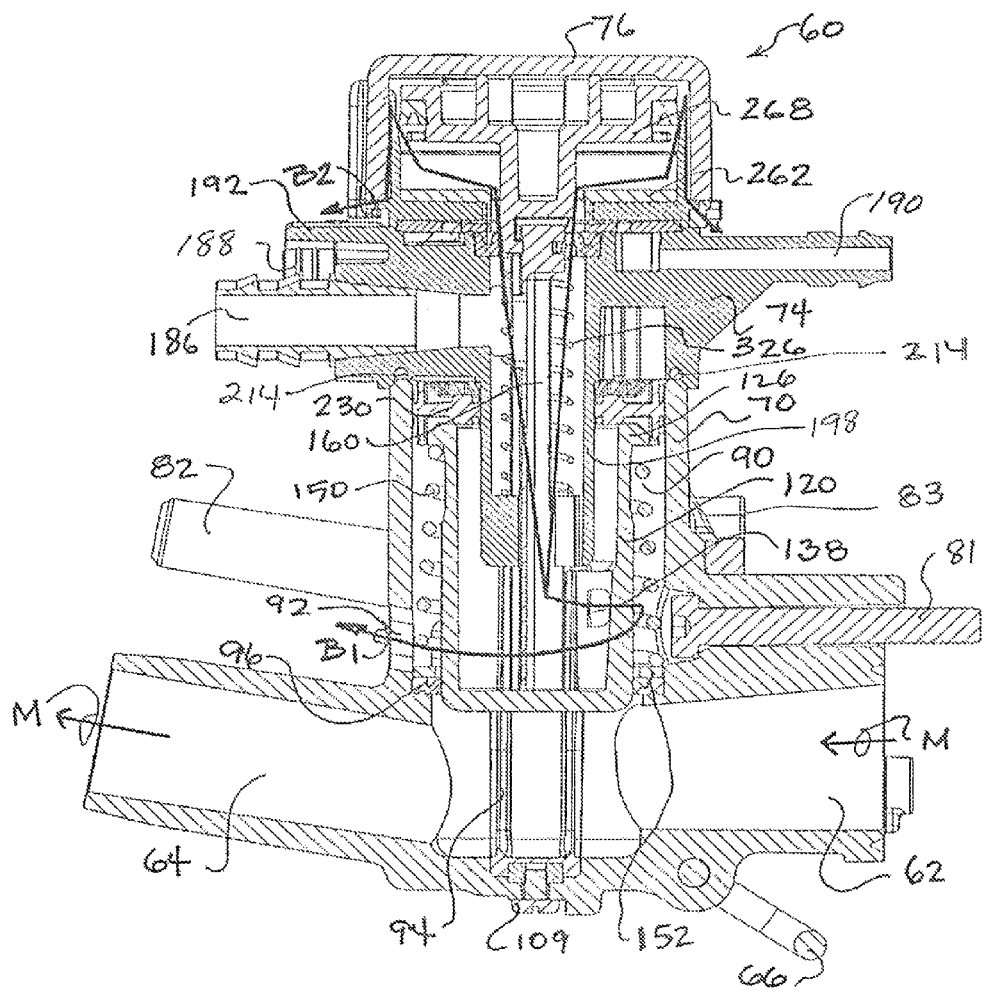
FIG. 9C is a side cross sectional view of the milker unit safety valve of FIG. 9A in the milking position and illustrating bleed paths.

As seen in FIG. 9C, to achieve the "block-bleed-block" function when the safety valve 60 is in the milking position (FIGS. 9A and 9C), a block is formed by the seal insert 94, and specifically by the upper ring-shaped part 96 of the seal insert 94. The upper ring-shaped part 96 seals an annular gap between the interior surface of the chamber 90 and a lower cylindrical portion of the backflush piston 120.

The bleed function in the milking position (FIGS. 9A and 9C) is performed by two different paths between the safety valve chamber 90 and the atmosphere outside of the safety valve 60 and the milker unit 40. It is only necessary to have one such "bleed" path, but the illustrated embodiment provides a bleed redundancy for added safety.

The first bleed path is illustrated in FIG. 9C and is designated as B1. This first bleed path B1 is a path from the chamber 90 through backflush piston holes 138, and through holes 92 in the lower housing 70. The second bleed path B2 is from the chamber 90 of lower housing 70 through a space between the central connector post 302 of the dip safety valve piston 268 and central opening 290 of the top plate 262, through the cylinder 272 of the top plate 262, past the outer annular seat 276 of the dip valve piston 268, up into an interior portion of the safety valve cap 76, and out cap vents 334. The second line of "block" function is performed by seals in the valve block 610 that controls the flow of backflushing fluids, air, water and teat dip into the safety valve 60. Also, the valve block 110 includes a block-bleed-block feature, as described above as a redundant safety feature.

Figure 9D:
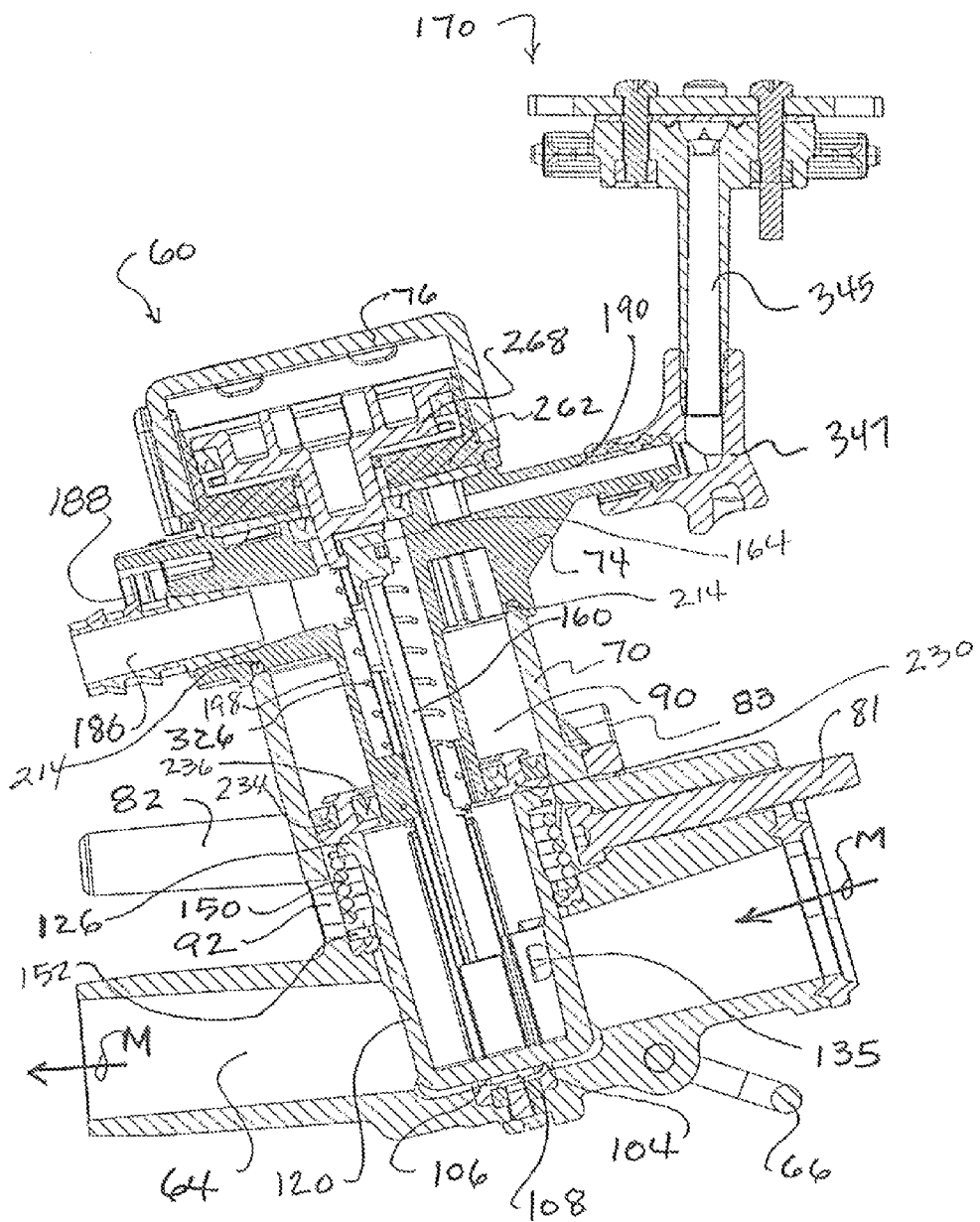
FIG. 9D is a partial side cross sectional view of the milker unit safety valve of FIG. 9A in a backflushing and dipping position in accordance with the present invention.
Figure 9E:
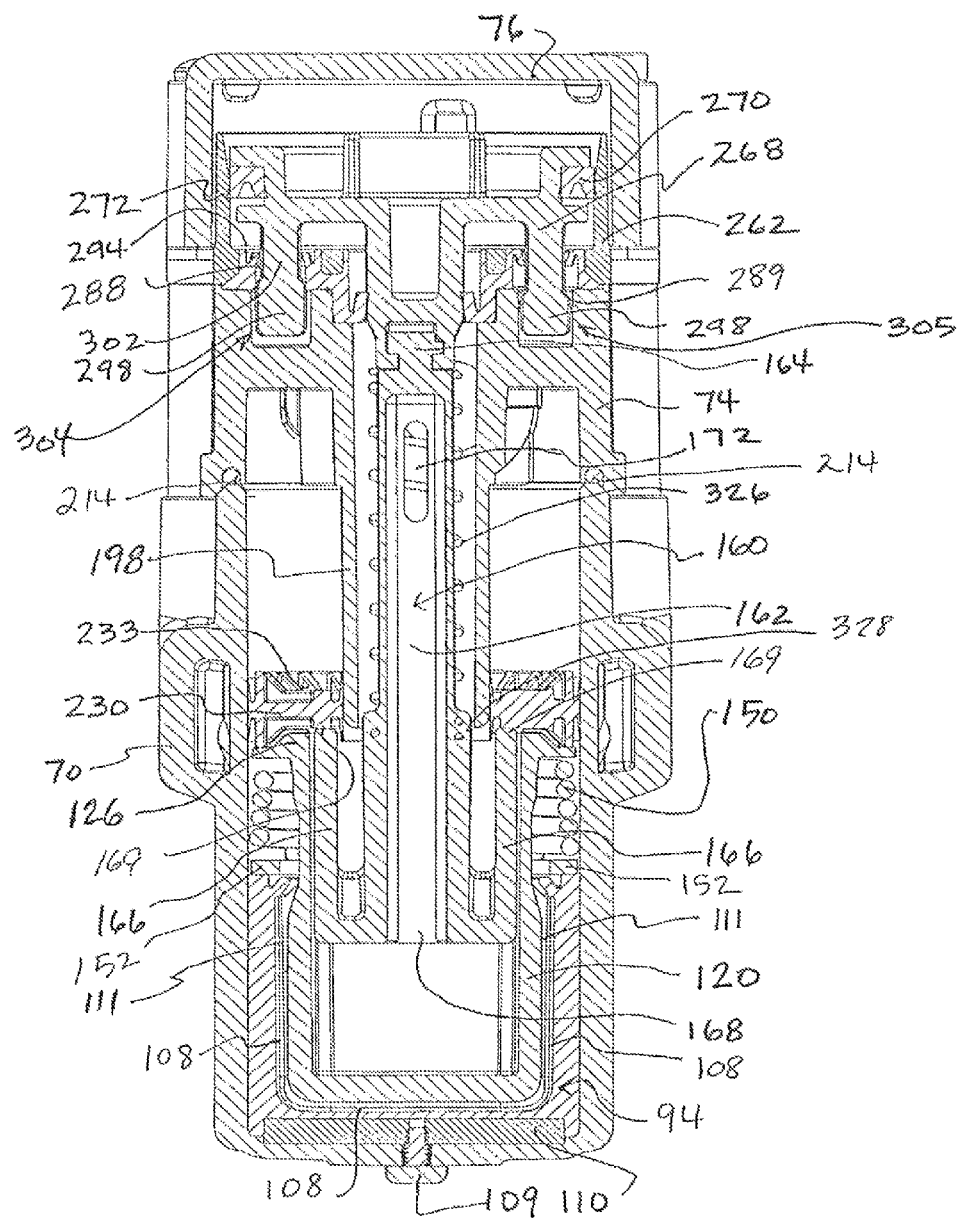
FIG. 9E is a side cross sectional view of the safety valve of FIG. 9A in a backflush and dipping position.

As seen in FIGS. 9B, 9D, and 9E, the safety valve 60 is in the backflushing position with the backflush piston 120 in its lowermost position with a lower surface of the backflush piston 120 engaging the u-shaped 98 portion of the seal insert 94. More specifically, the lower surface of the backflush piston 120 is in contact with the upstream flange 104 and the downstream flange 106 of the u-shaped 98 portion of the seal insert 94. This arrangement provides a double block between the safety valve 60, milk inlet 62, and milk outlet 64.

Between the upstream flange 104 and the downstream flange 106 is the web 108 of the seal insert 94. The web 108 is spaced apart from the lower surface of the backflush piston 120 to define part of a "bleed" path B3 (FIG. 9E) that bypasses the upper portion of the backflush valve 120 and the upper ring-shaped portion 96 of the seal insert 94 through the piston by-pass vents 134, and through the holes 92 in the lower housing 70. This block-bleed-block arrangement prevents backflushing fluid and teat dip from entering the milk supply because any seepage past either seal will drain through the gap 111, which is a bleed path. (FIG. 9E).

The teat dip block-bleed-block function is performed by the upstream dip valve pin 304 in connection with a dip opening 288 in the top plate 262, and the corresponding dip hole seal 324 of the top plate seal 264. A second block is formed by the downstream dip valve pin 305 in connection with a dip opening 288 in the top plate 262 and the corresponding dip hole seal 324 of the top plate seal 264.

Figure 9F:
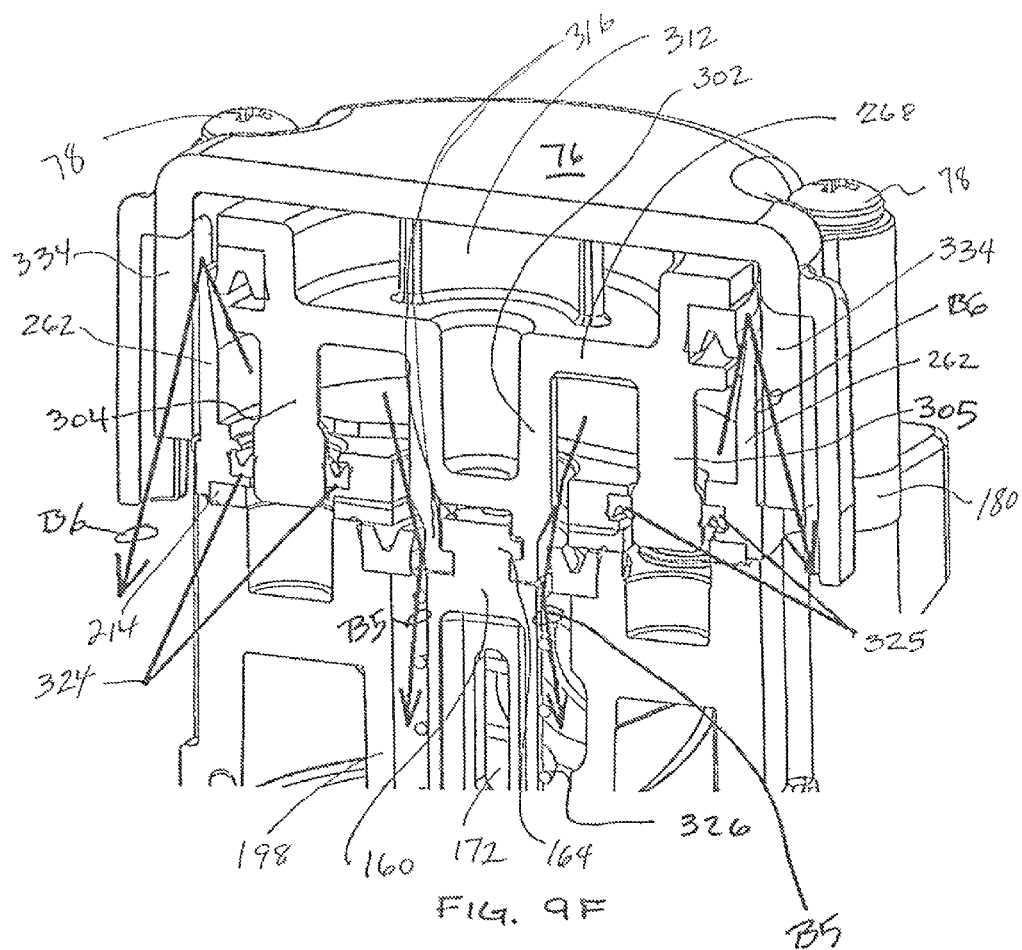
FIG. 9F is a cross sectional perspective view of the safety valve of FIG. 9A in a backflushing position and illustrating "bleed" paths in accordance with the present invention.
Figure 9H:
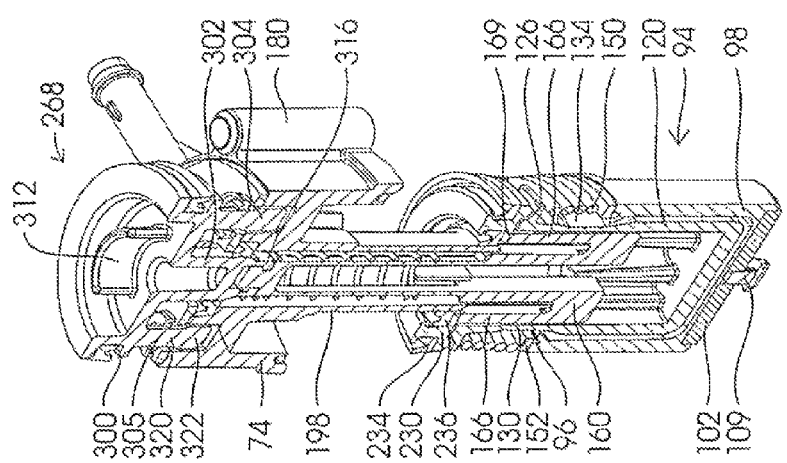
FIG. 9H is the safety valve of FIG. 9A in the backflushing position with the housing removed.
Figure 9G:
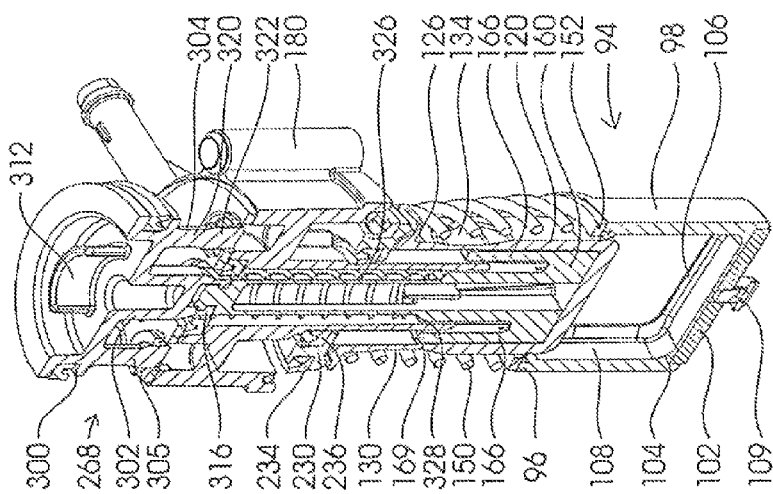
FIG. 9G is the safety valve of FIG. 9A in the milking position and with the housing removed.
Figure 10A:
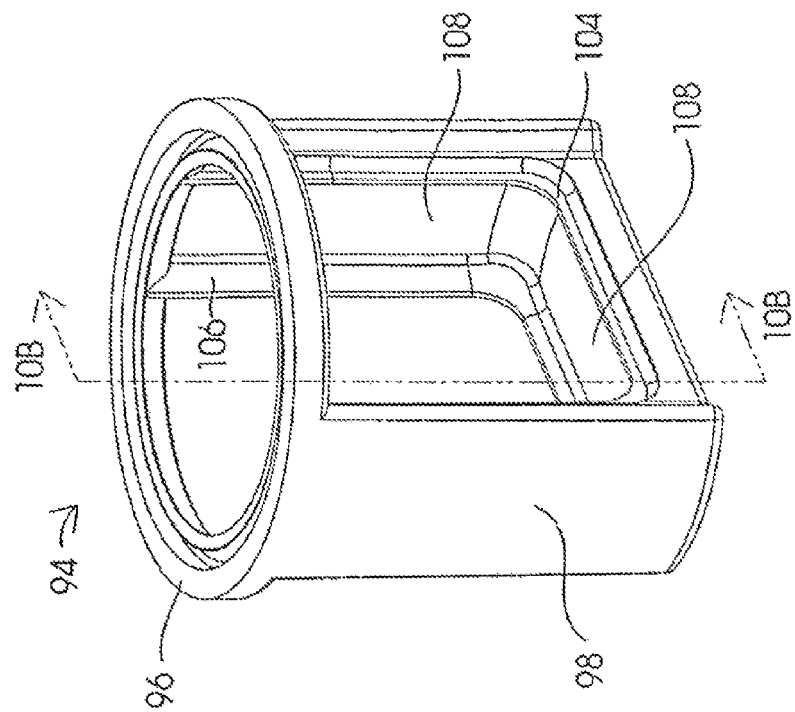
FIG. 10A is a perspective view of a seal insert in accordance with the present invention.
Figure 10B:
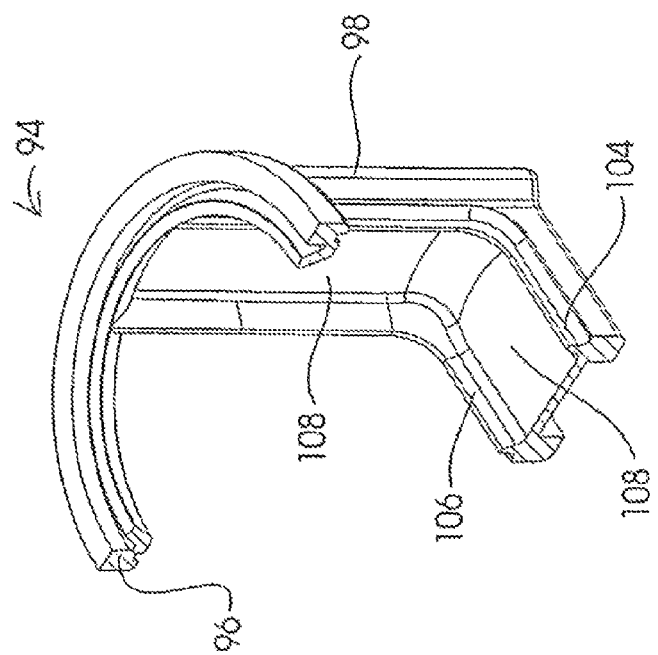
FIG. 10B is a cross sectional perspective view of the seal insert taken along 10B-10B in FIG. 10A.
Figure 12A:
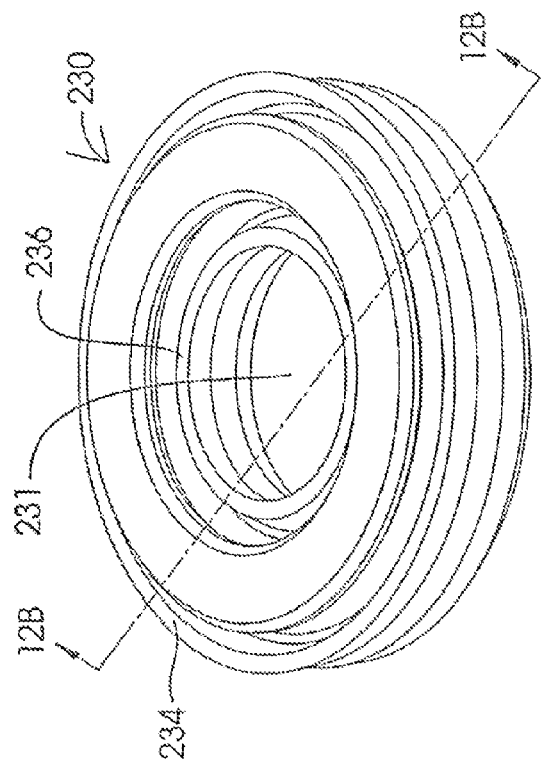
FIG. 12A is a perspective view of a backflush valve operation plate, in accordance with the present invention.
Figure 12B:
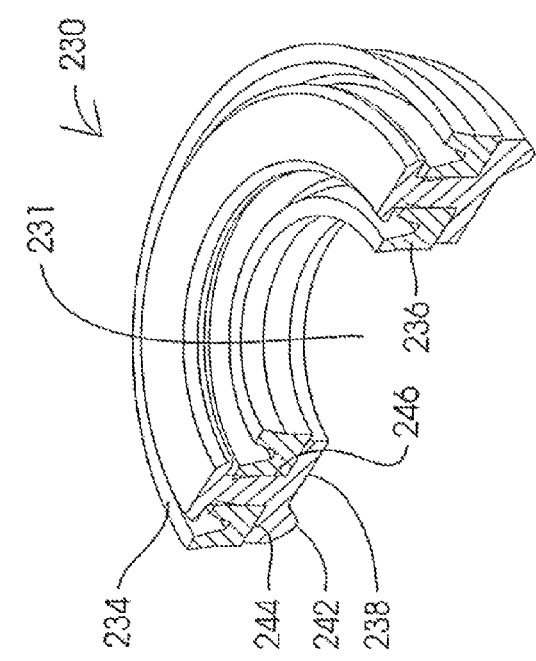
FIG. 12B is a cross section of the plate taken along line 12B-12B in FIG. 12A.
Figure 12C:
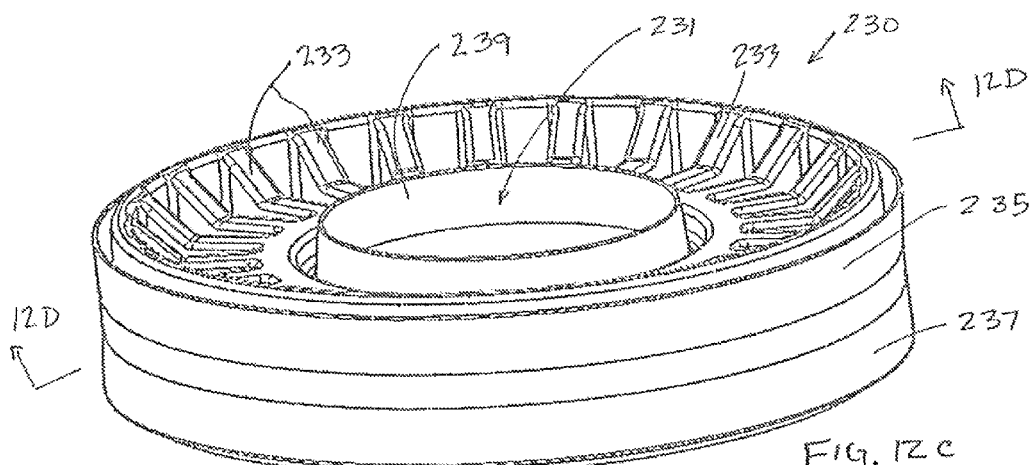
FIG. 12C is a perspective view of an alternate embodiment of a backflush operation plate in accordance with the present invention.
Figure 12D:
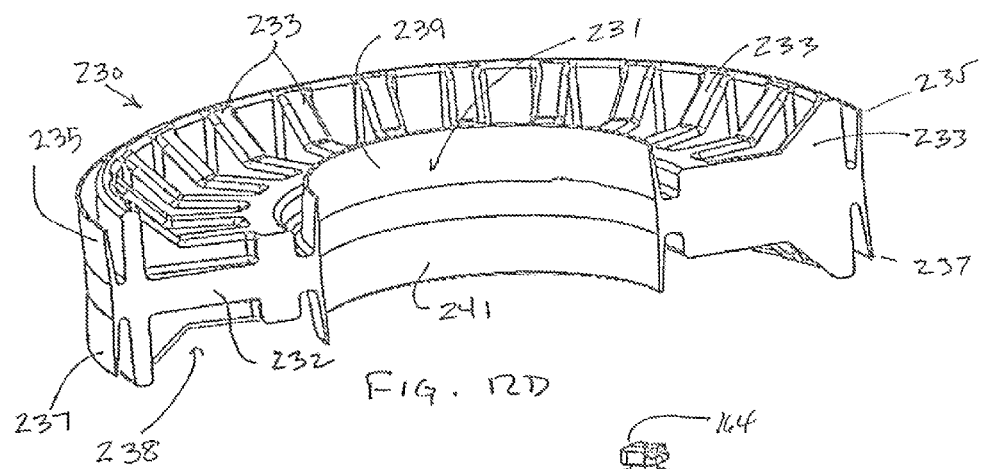
FIG. 12D is a cross section of the backflush operation plate taken along line 12D-12D in FIG. 12C.
Figure 13:
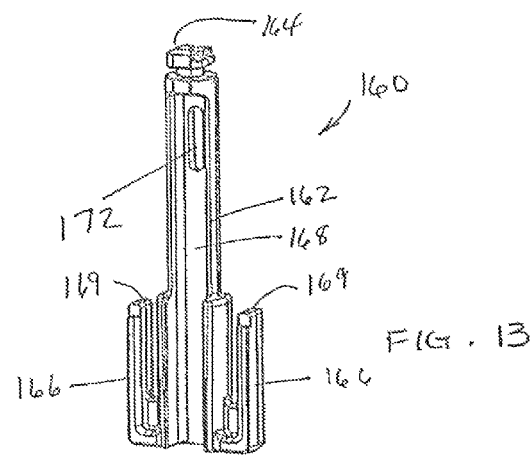
FIG. 13 is a perspective view of a safety valve piston connector in accordance with the present invention.

In this arrangement, there are at least two bleed paths. Bleed path B5 in FIG. 9F is defined by a space between the dip valve piston 268 and the interior portion of the top plate 262 cylindrical cup portion 272. B5 is further defined by a space between the dip piston central connector post 302 and the central opening 290 of the top plate 262, the lower housing chamber 90, and the three openings 220, 222, and 224.

Another bleed path B6 (FIG. 9F) is defined by the space between the dip valve piston 268 and the interior portion of the top plate cylindrical cup portion 272, upward into the cap 76 and out of the cap vent hoods 338.

Yet another bleed path is formed in the valve block housing 613 by the spool 621, so that differential pressure cannot pass the valves and into any of the feed lines to the safety valve 120.

When it is desired to apply teat dip, the dip safety valve 260 is operated by compressed gas such as air or other suitable fluid, mechanical device or electrical device to move the dip valve piston 268 downward against the force of the dip valve return spring 326 so that the dip valve pins 304 and 305 no longer seal the dip valve holes 288, 289.

Figure 14A:
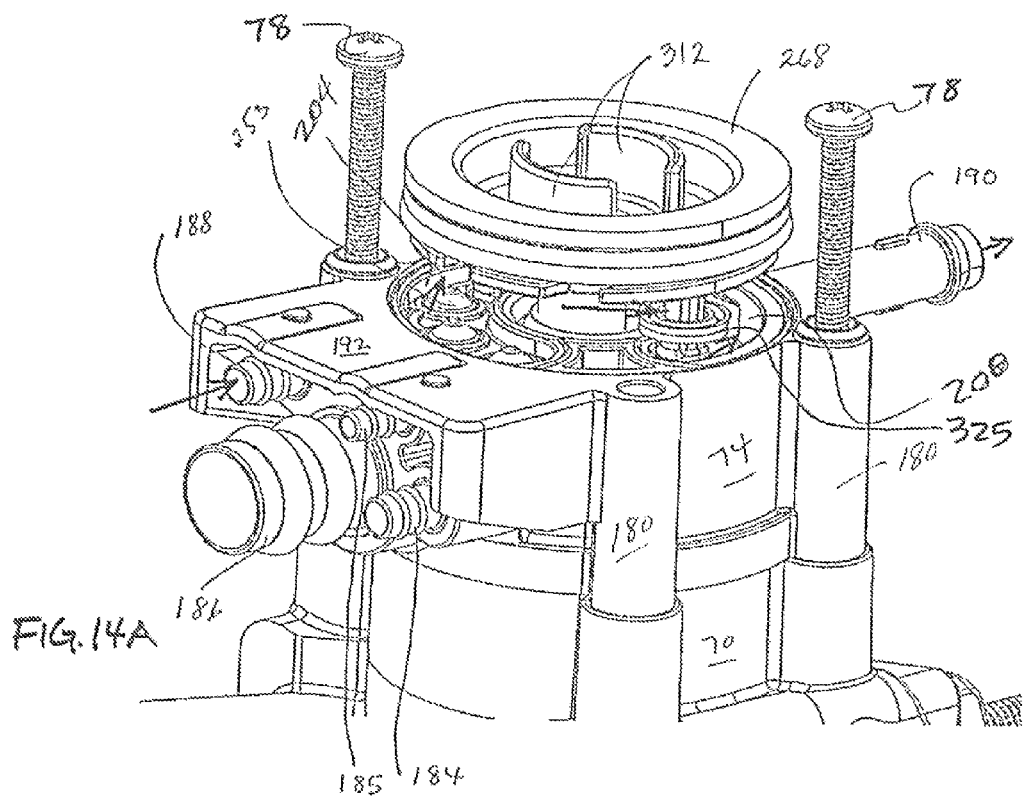
FIG. 14A is a partial perspective view of an upper housing and related components in accordance with the present invention.
Figure 14B:
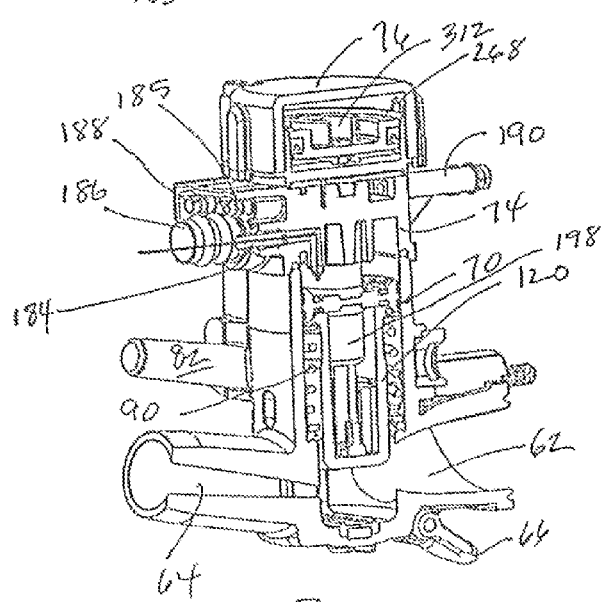
FIG. 14B is a cross sectional perspective view of the safety valve and illustrating an air conduit through which pressurized air operates the backflush piston and the dip piston, in accordance with the present invention.
Figure 14D:
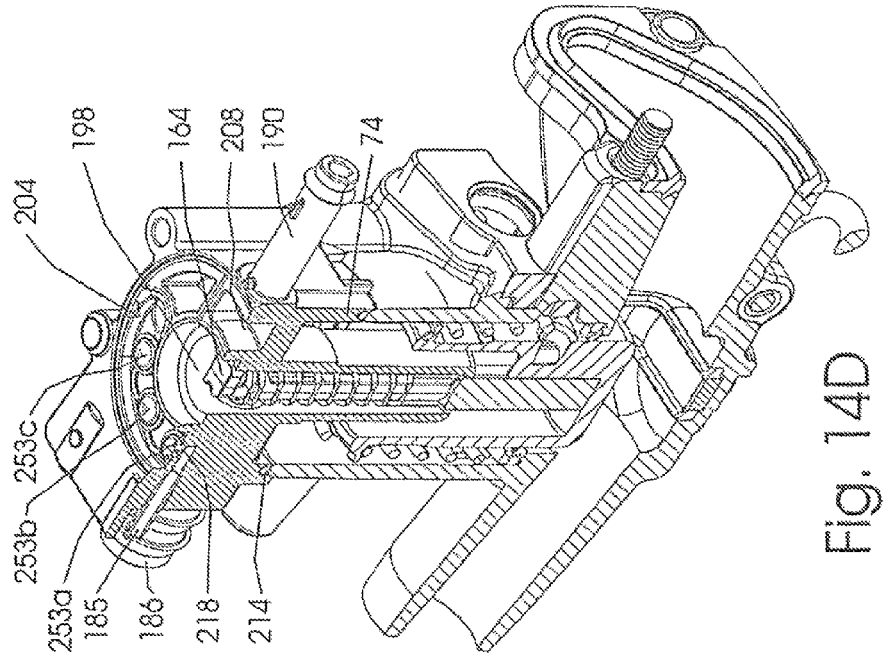
FIG. 14D is a partial cross sectional and perspective view of the safety valve, and illustrating an air inlet through with pressurized air enters the safety valve to purge cleaning fluids from the safety valve and related components.
Figure 14C:
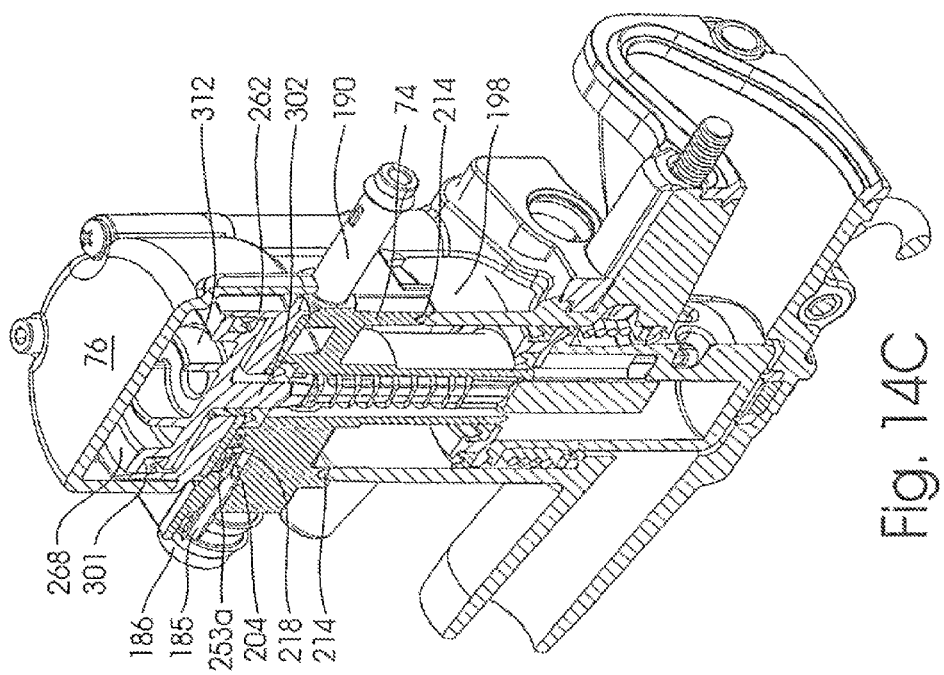
FIG. 14C is a partial cross sectional and perspective view of the safety valve, and illustrating an air inlet through with pressurized air enters the safety valve to purge cleaning fluids from the safety valve and related components.
Figure 14E:
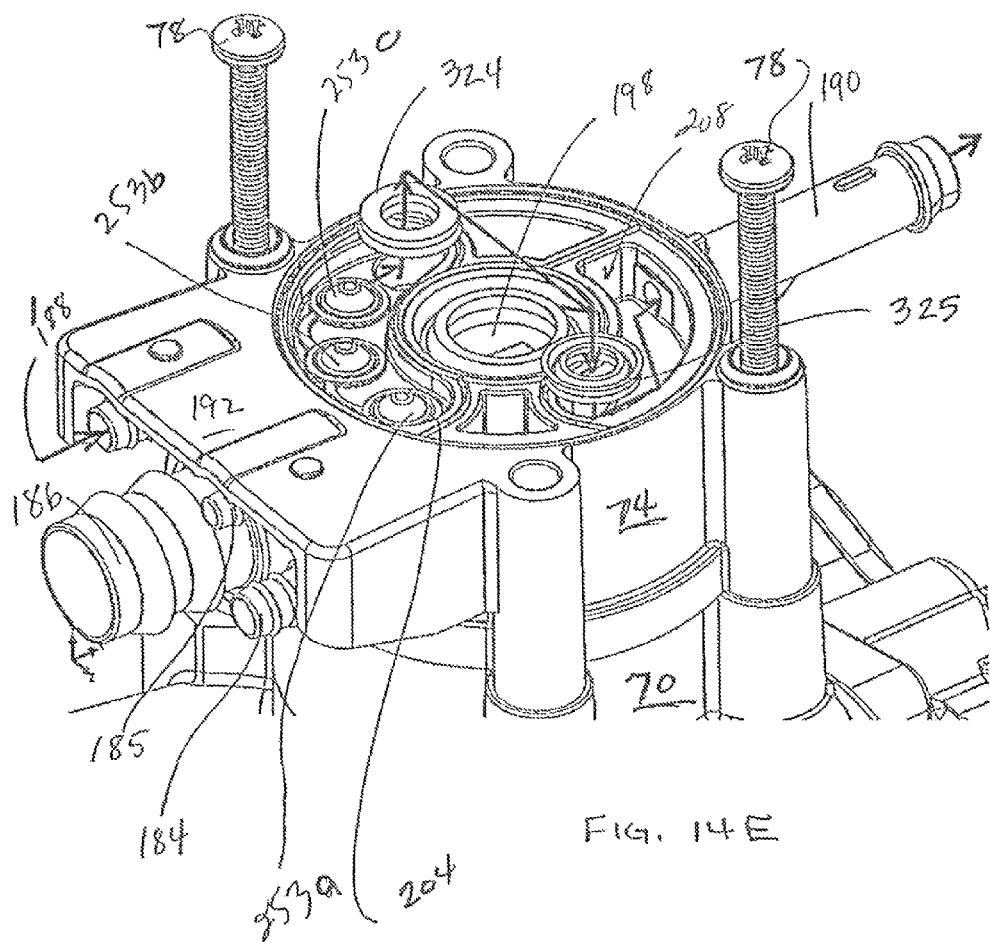
FIG. 14E is a partial perspective view of the upper housing and illustrating a dip flow path through the safety valve.
Figure 14F:
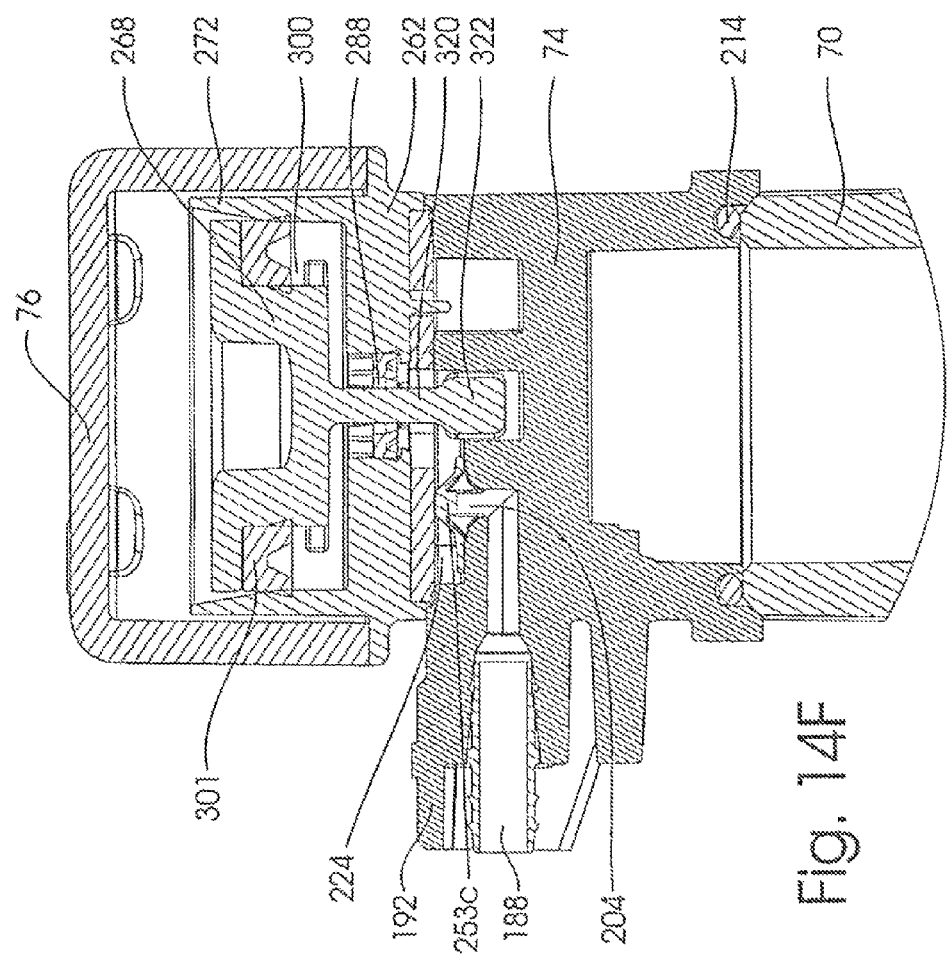
FIG. 14F is a cross sectional side view of the upper housing and some related components in a dip position.
Figure 15:
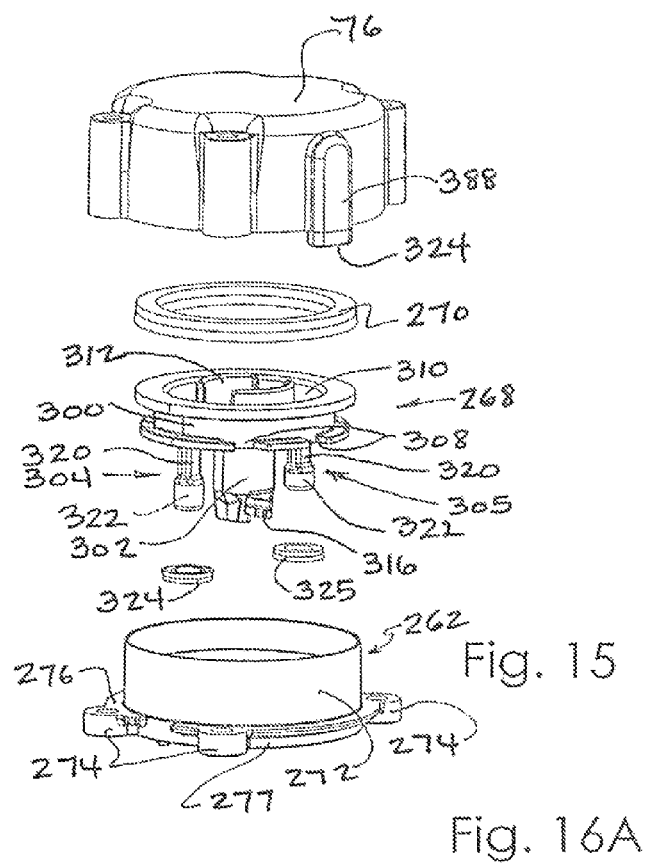
FIG. 15 is an exploded perspective view of a dip valve and top plate in accordance with the present invention.
Figure 16A:
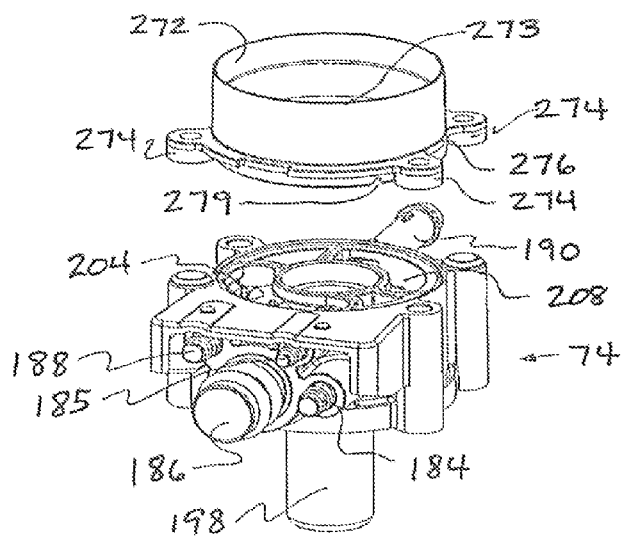
FIG. 16A is an exploded perspective view of a top plate, and dip inlet and outlet chambers in the upper housing, of the present invention.
Figure 16B:
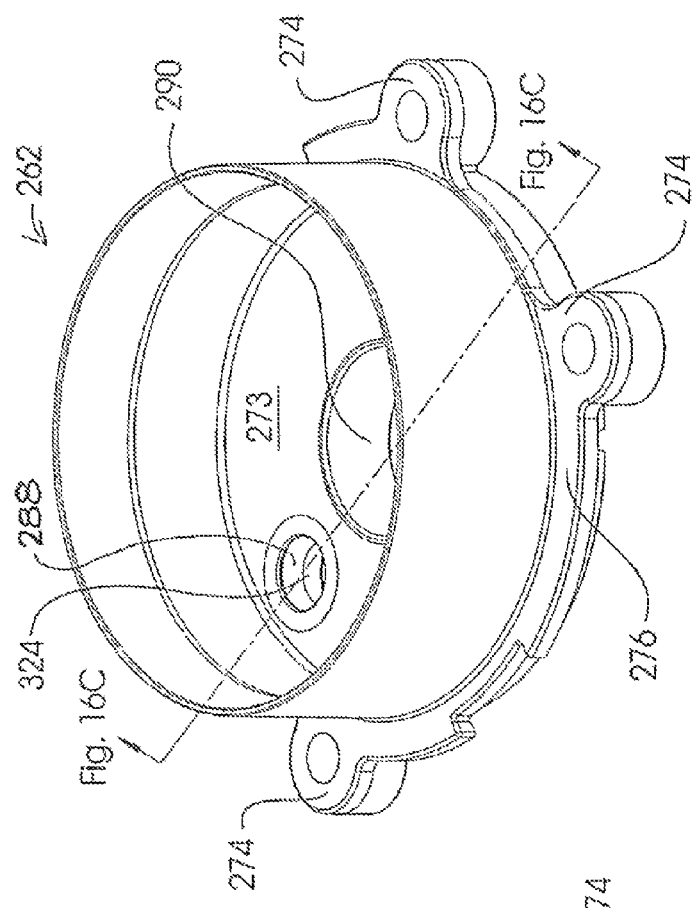
FIG. 16B is a perspective view of a top plate, in accordance with the present invention.
Figure 16C:
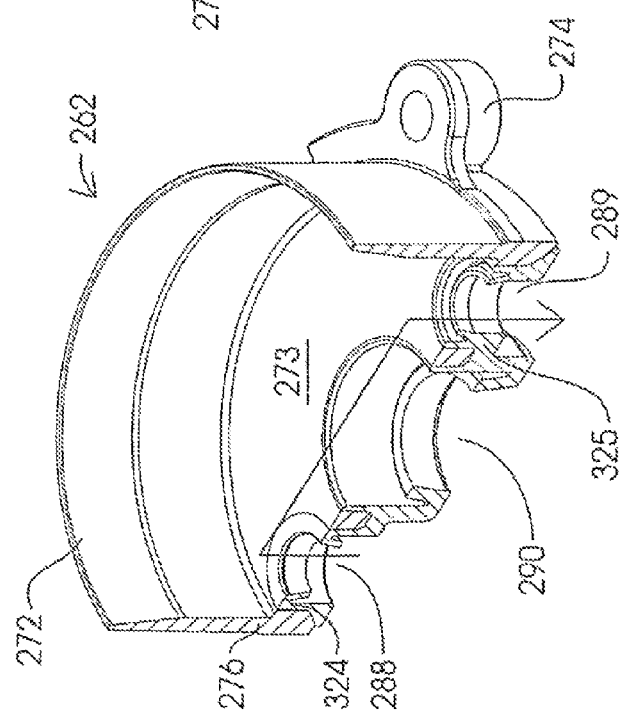
FIG. 16C is a cross sectional perspective view of the top plate of FIG. 16B.
Figure 17:
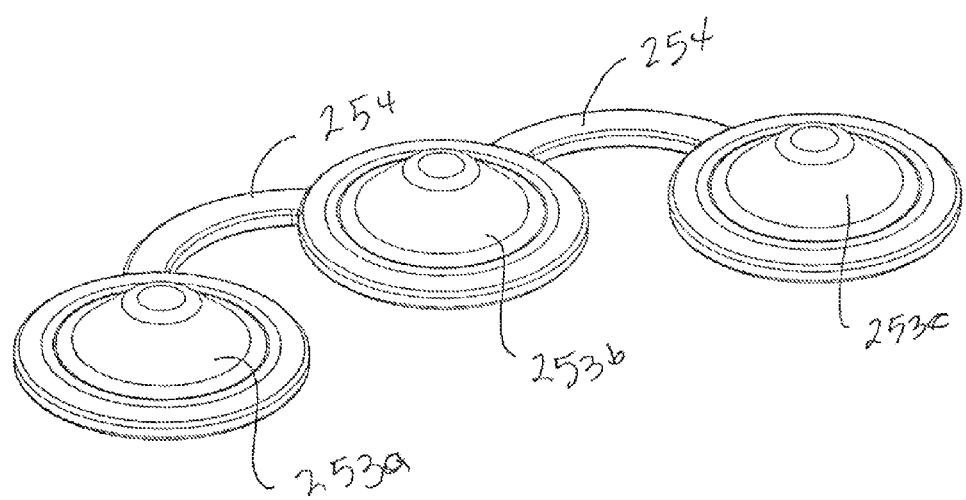
FIG. 17 is a perspective view of an umbrella valve for use in a safety valve in accordance with the present invention.
Figure 18:
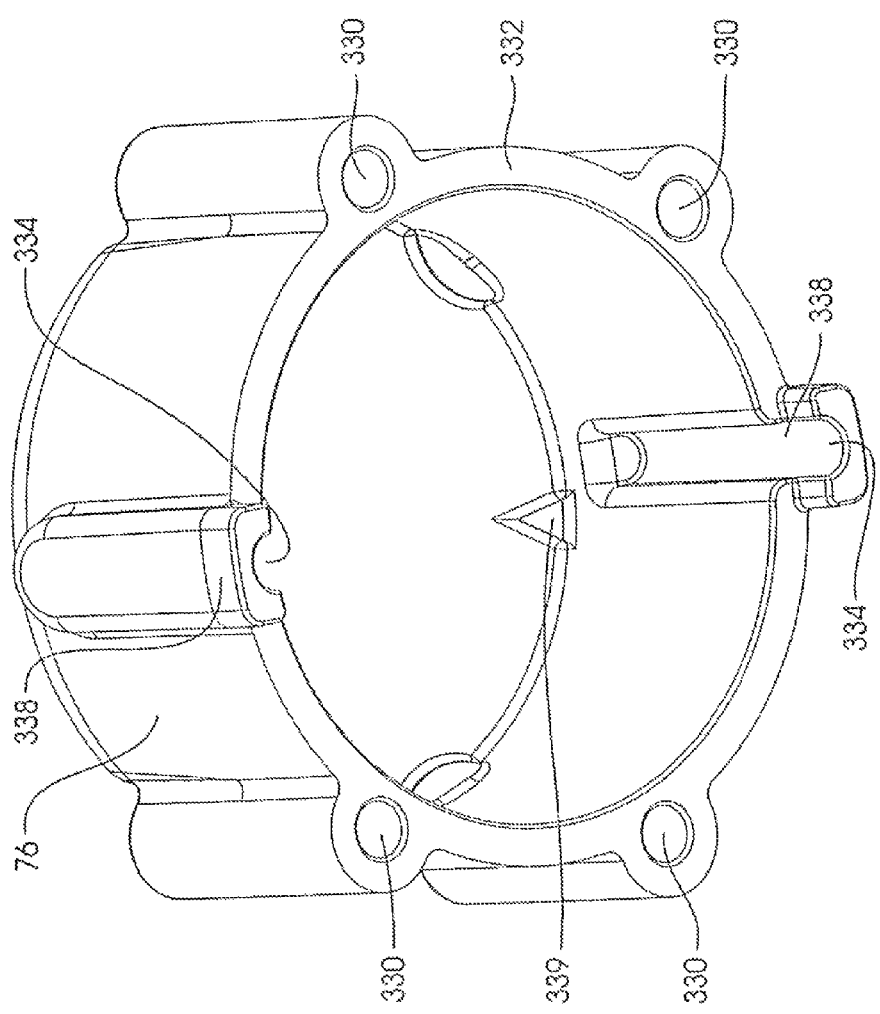
FIG. 18 is a perspective view of a safety valve cap in accordance with the present invention.
Figure 19E:
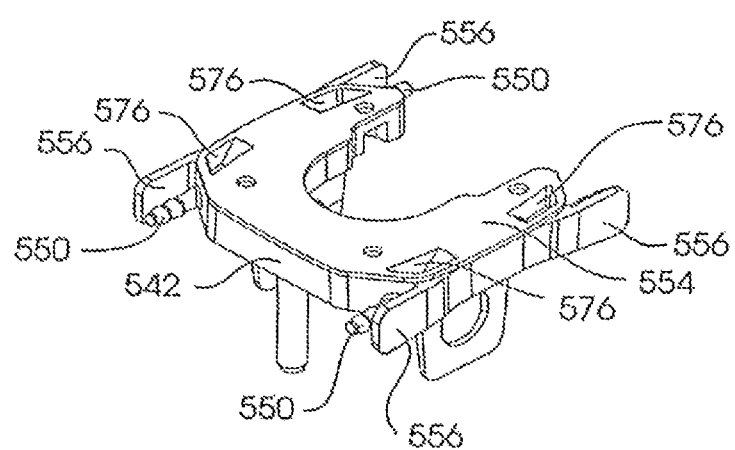
FIG. 19E is a perspective view of an alternate embodiment of a dip manifold in accordance with the present invention with a cover removed to illustrate a diaphragm valve.
Figure 19G:
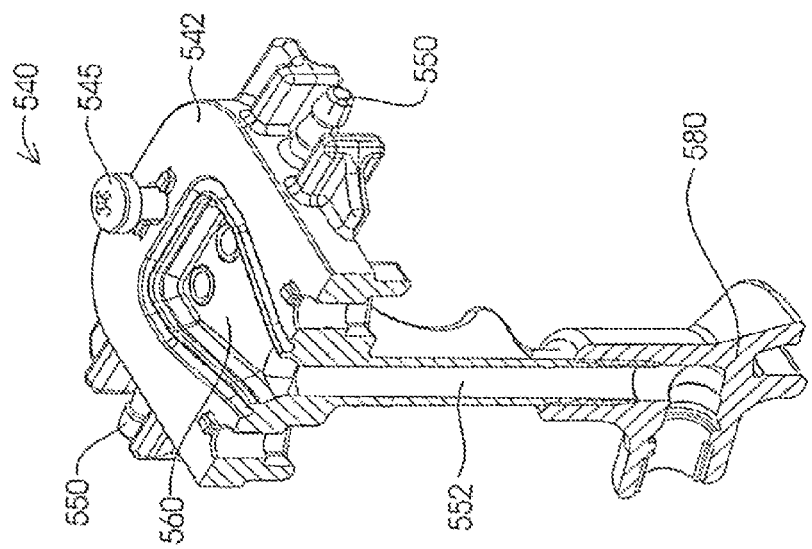
FIG. 19G is the dip manifold of FIG. 19F with the flow paths removed.
Figure 19F:
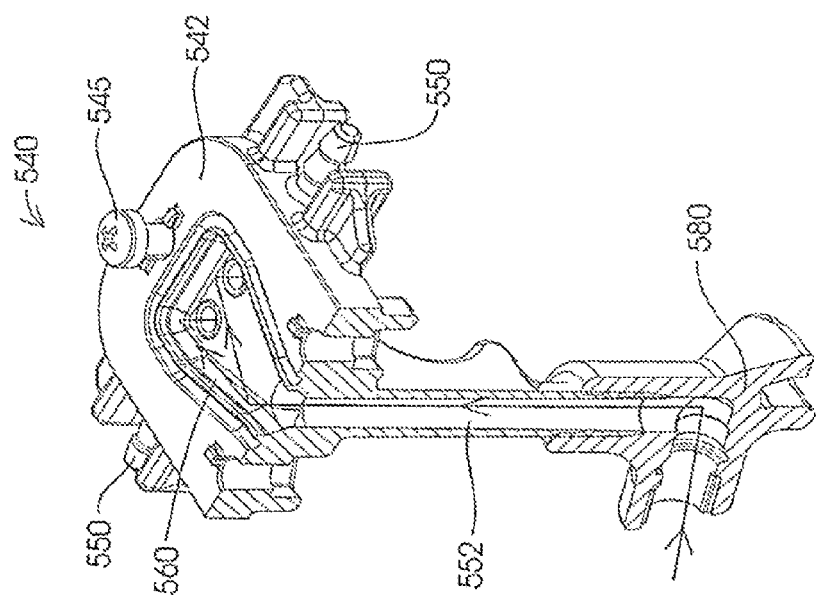
FIG. 19F is a cross section of the dip manifold with the diaphragm valve removed to illustrate dip flow paths.
Figure 20A:
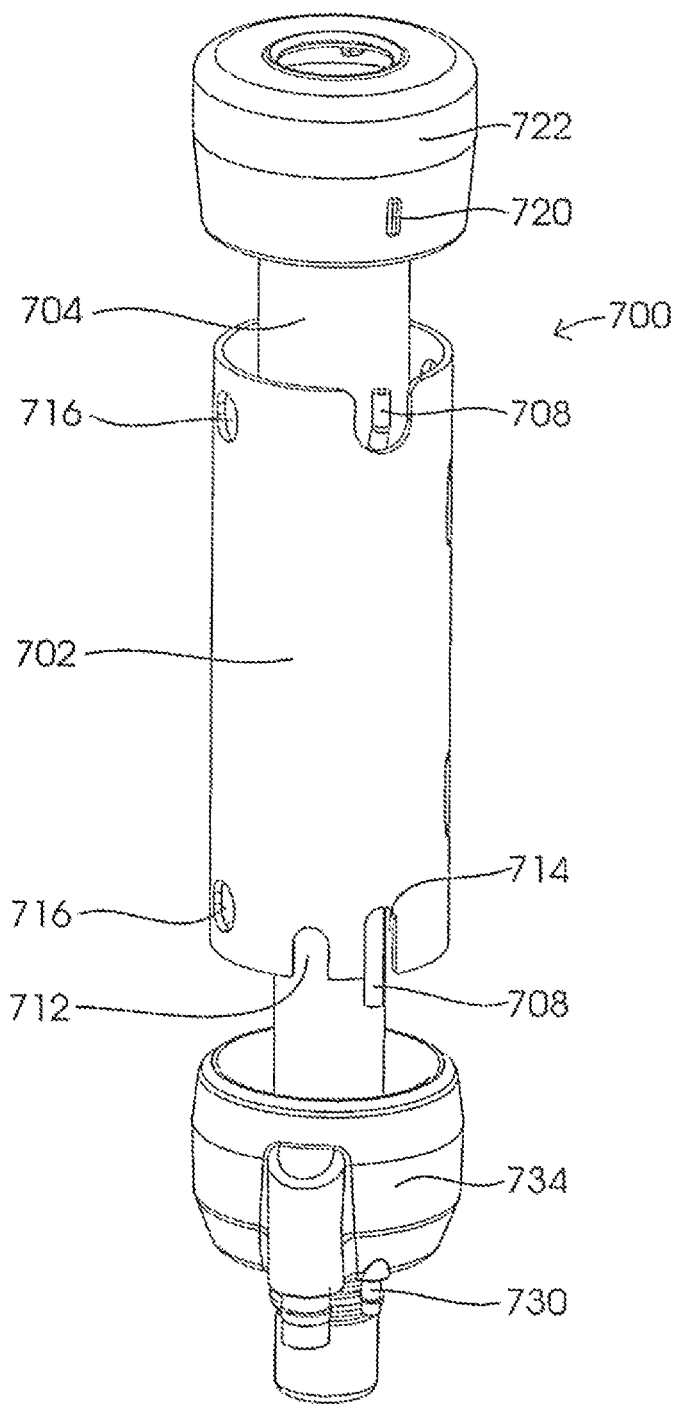
FIG. 20A is an exploded perspective view of a teat cup assembly with an internal dip channel for delivering dip, in accordance with the present invention.
Figure 20B:
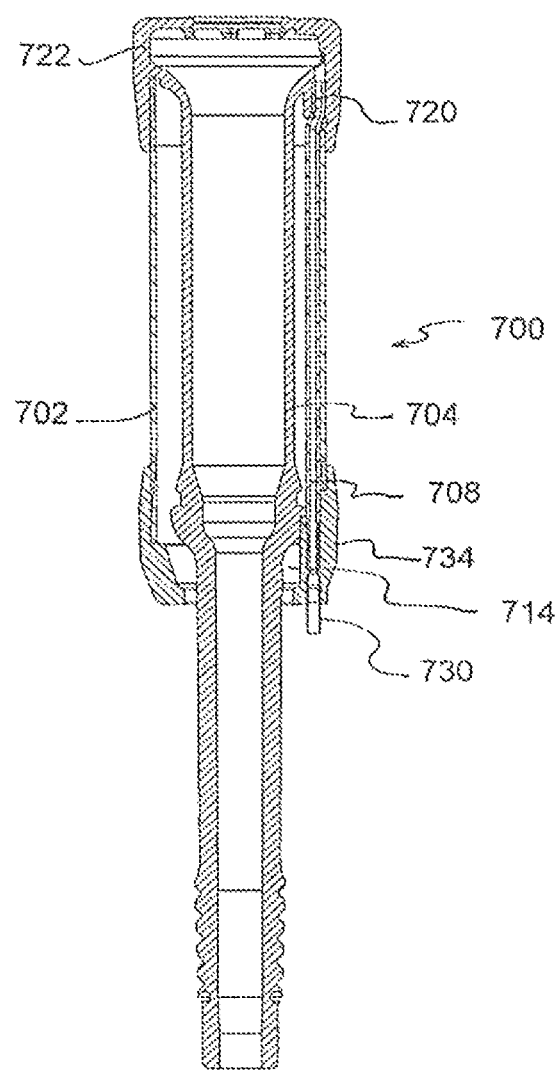
FIG. 20B is a cross sectional view of the teat cup assembly of FIG. 20A.
Figure 20D:
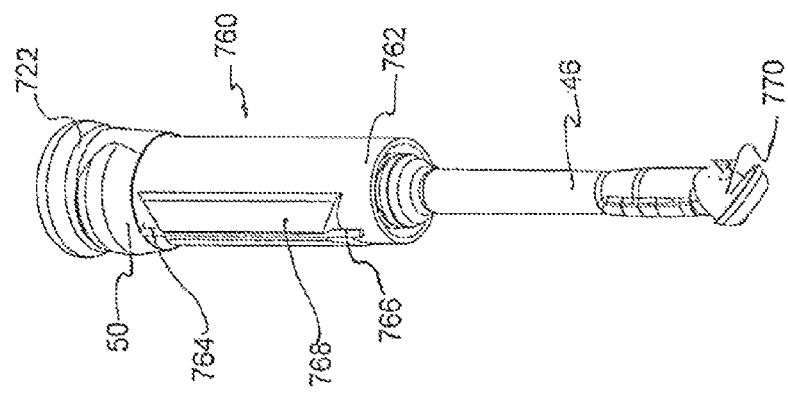
FIG. 20D is a perspective view of another alternate embodiment of a teat cup assembly and dip channel for delivering dip, in accordance with the present invention.
Figure 20C:
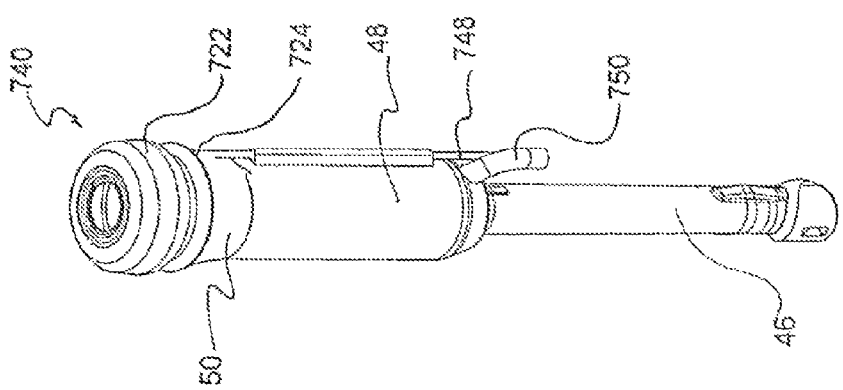
FIG. 20C is a side view of an alternate teat cup assembly with an external dip channel for delivering dip, in accordance with the present invention.

As seen in FIGS. 14A and 14E, teat dip is pushed through the dip inlet 188 in the upper housing 74. The dip flows under pressure through the dip inlet chamber 204, up through upstream dip hole 288, through the flow channel 238, through the downstream dip hole 289, through the dip outlet chamber 208, out through the dip outlet 190, through tube 345 joined to the dip outlet 190 with an elbow 580 and toward the dip manifold 170.

When backflushing fluid (such as wash chemicals, rinse chemicals, water, and/or air) are to be pumped from the safety valve 60 upstream into the milker unit 40, the following operation takes place. It should be understood that during a backflush operation, the milker unit 40 will not be upright as illustrated in most of the drawings. Instead, the milker unit 40 will be upside down or at some generally downward angle, and hanging from a detacher mechanism as in FIG. 4B. This position aids in draining backflush liquids from the milker unit 40 in addition to a final "air slug" that is pumped through the safety valve 60 and the milker unit 40.

Backflushing fluid enters the upper housing 74 backflush inlet 186, down through the central stem 168, down through the backflush piston 120, out of the holes 138 in the backflush piston 120 and "upstream" through the milk inlet 62 and into the milker unit 40. The safety valve components as described define a backflush fluid conduit extending through the safety valve 60 between the backflush fluid inlet 186 and the milk inlet 62.

When desired to clean and rinse the safety valve 60, there can be alternating pulses of air and water for any desired number of sequences after the backflushing piston 120 returns to the milking position. Preferably, there are more than one pulse of both air and water to provide agitation, and efficient and thorough cleaning. Water used in rinsing the safety valve 60 also lubricates the seals for less friction and resistance in moving the various pistons and valves. For this reason, it is also desirable to wash or rinse the safety valve 60 prior to start-up.

Also, it is preferred to clean the safety valve 60 with the backflush piston 120 in its milking position because some milk may enter the bleed area next to the backflush piston 120 when the backflush piston 120 is in the upper position. This will clean backflush chemicals, teat dips, and residual milk from the safety valve 60. This process is done automatically by blowing water and air through the safety valve 60 before attaching the milker unit 40 to another animal.

Below are Control Operation charts that illustrate a sequence of all the various elements that take place in a typical single cycle of the safety valve 60. Charts A, B, and C are each a portion of a complete backflush and dip application cycle. Chart A is a dipping and backflushing portion of the cycle, Chart B identifies additional steps in the backflush operation, and Chart C shows the steps of a dosing valve recharged in preparation for the next dipping procedure. (The abbreviation "BF" in the charts refers to backflush.) From the end of milking, closing off the milk line, ceasing pulsation with the pulsator in the "off position" (atmospheric pressure in the pulsation chamber), dipping a cow, backflushing the milker unit, and self-cleaning of the safety valve, to being ready for a next milking operation is about forty-five seconds to sixty-five seconds, in the preferred embodiment. Chart D describes steps in the system 20 operation and the function that each step serves.

CHART A

Control Operation

| | Typical Cycle | Milking The Cow | End of milking | Ceasing Pulsation in the off position | Delay | islolate unit | Dip cow | Cluster Off Cow |
|---|---|---|---|---|---|---|---|---|
| | Step | 1 | 2 | 3 | 4 | 5 | 6 | 7 |
| | Default Time (sec) | | | 1 | 1 | 0.1 | 10 | |
| | Range | | | 0-30 | 0-5 | 0-2 | 0-10 | |
| | Increment | | | 0.1 | 0.1 | 0.1 | 0.1 | |
| | Cycle | | | | | | | |
| | Detach Input | Milking | End of Milk-> | | | | | |
| Automated Dipping and Backflushing Output # | Output | | | | | | | |
| | Milker Unit Shutoff Valve | | | | | | | |
| | Water valve | | | | | | | |
| | BF Air Purge valve | | | | | | | |
| | Dip valve | | | | | | | |
| | BF Chemical Valve | | | | | | | |
| | Stall Control Safety valve | | | | | | | |
| | Running time | | | | start | 1.1 | 11.1 | |
| | program reference ... case | | | | | | | |
| Pulsation device | Pulsator Coil 1 | | | | | | | |
| | Pulsator Coil 2 | | | | | | | |

3 possible BF Options
+ ■ Backflush soution, iodine or water only.
Reattach routine - steps 13-19
 Cycles to be performed immediately upon input for reattach.
If AutoDip cycle has been initiated and program is on steps 1-12, advance program to Step 13 and stop after step 19.
If program is on step 13-19, continue and then stop after step 19
If program has already advanced to step 20 or beyond, continue to process all the way through step 25.

CHART B

| Rinse milk out of milker unit | | | | Apply backflush chemical | | | Disinfection time | repeat x 7 | | | repeat x 2 | |
|---|---|---|---|---|---|---|---|---|---|---|---|---|
| 8 | 9 | 10 | 11 | 12 | 13 | 14 | 15 | 16 | 17 | 18 | 19 | 20 |
| 3 | 1 | 3 | 1 | 0 | 3 | 1 | 20 | 2 | 1 | 1 | 1 | 0.5 |
| 0-10 | 0-10 | 0-10 | 0-10 | 0-10 | 0-10 | 0-10 | 0-60 | 0-10 | 0-10 | | 0-10 | 0-10 |
| 0.1 | 0.1 | 0.1 | 0.1 | 0.01 | 0.1 | 0.1 | 1 | 0.1 | 0.1 | | 0.1 | 0.1 |
| | | | | | | | Kill time | Rinsing | | | | |

CHART B-continued
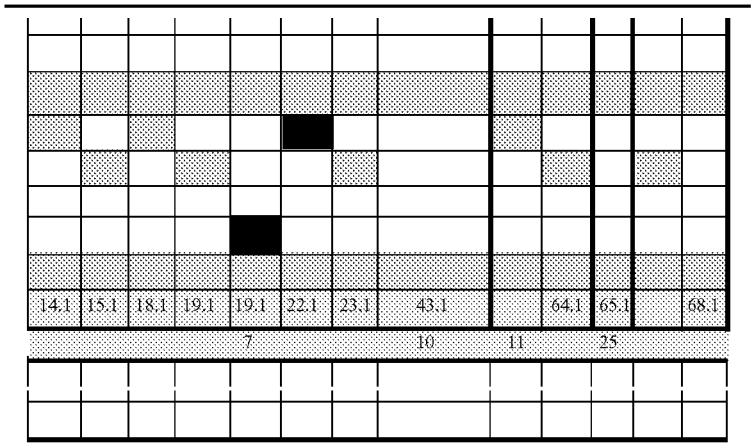
CHART C
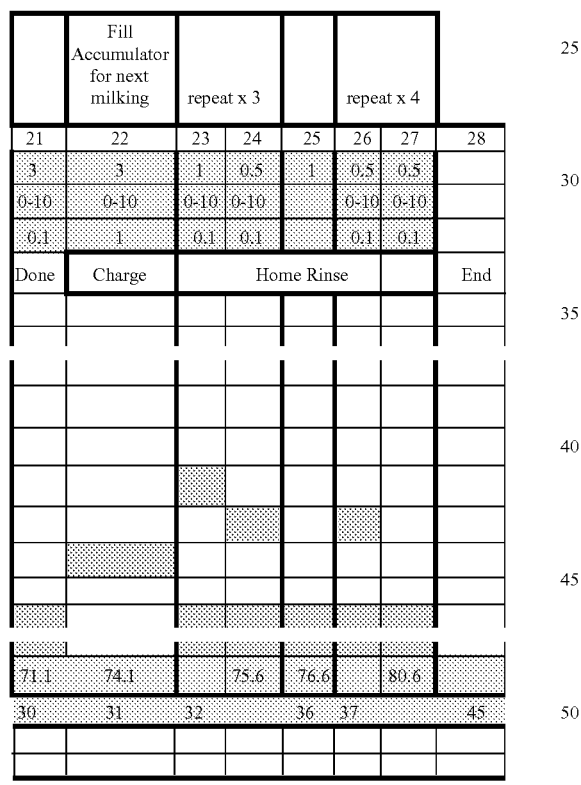
CHART D
| Steps | Change | Function |
|---|---|---|
| 1 | idle | Milking |
| 2 | | Low Milk Flow Sensed |
| 3 | Cease Pulsation in the OFF position (atmospheric pressure in the pulsation chamber) | Delay for pulsation to stop before dipping |
| 4 | Detach signal + delay | Output from Metatron or other detacher initiates delay before dipping. |

CHART D-continued

| 5 | Move safety valve | Moves safety or backflush valve into place and creates path for dip to be able to flow to liners. |
| --- | --- | --- |
| 6 | Dip | Air pressure to stall control: 1) moving stall control safety valve into place. 2) pushes dip out of accumulator to liner. |
| 7 | Cluster is removed | Cluster is removed from the cow |
| 8-11 | Rinse | Perform rinsing of claw before introducing backflush solution. |
| 12-14 | Backflush chemical | Push backflush solution into claw and distribute onto all surfaces. |
| 15 | Delay/kill time | Pause to allow chemicals to kill bacteria. |
| 16-20 | Rinse | Perform several rinse cycles to purge all chemicals from claw |
| 21-22 | Blow dry | Pulse air several times to remove all remaining rinse water from milker unit. |
| 22 | Backflush complete | Return safety valves to home position. |
| 22 | Charge chemical | Resupply accumulator with dip by turning on dip valve. |
| 23-27 | Home rinse | Pulse rinse water through safety valve cap to clean out any residue or foreign materials. |
| 27 | Home rinse purge | Pulse air through cap to purge any remaining water. |
| 25 | Done | Ready to milk again. All safety valves are in position. |
| Return to step 1 | | |

| Outputs | Power | Function |
| --- | --- | --- |
| Air valve | | Operates isolation valve |
| Water valve | | Rinse water |
| Air valve | | Provides air to push and agitate BF solution; purges line at end of cycles |
| Dip valve | | Provides dip to unit |
| Chemical valve | | Used to provide alternate BF solution when dip is not mixed with water for BF solution |
| Safety valve | | Isolates water and BF supply lines from isolation valve |
| Pulsator Coil 1 | | Applies vacuum to the pulse chamber when turned ON |
| Pulsator Coil 2 | | Applies vacuum to the pulse chamber when turned ON |

Note: In Chart A above, Step 1 shows that pulsator coils 1 and 2 are operated in alternating phases. The durations of the phases are usually equal, and are not necessarily of varying length, as depicted in the chart.

Figure 22E:
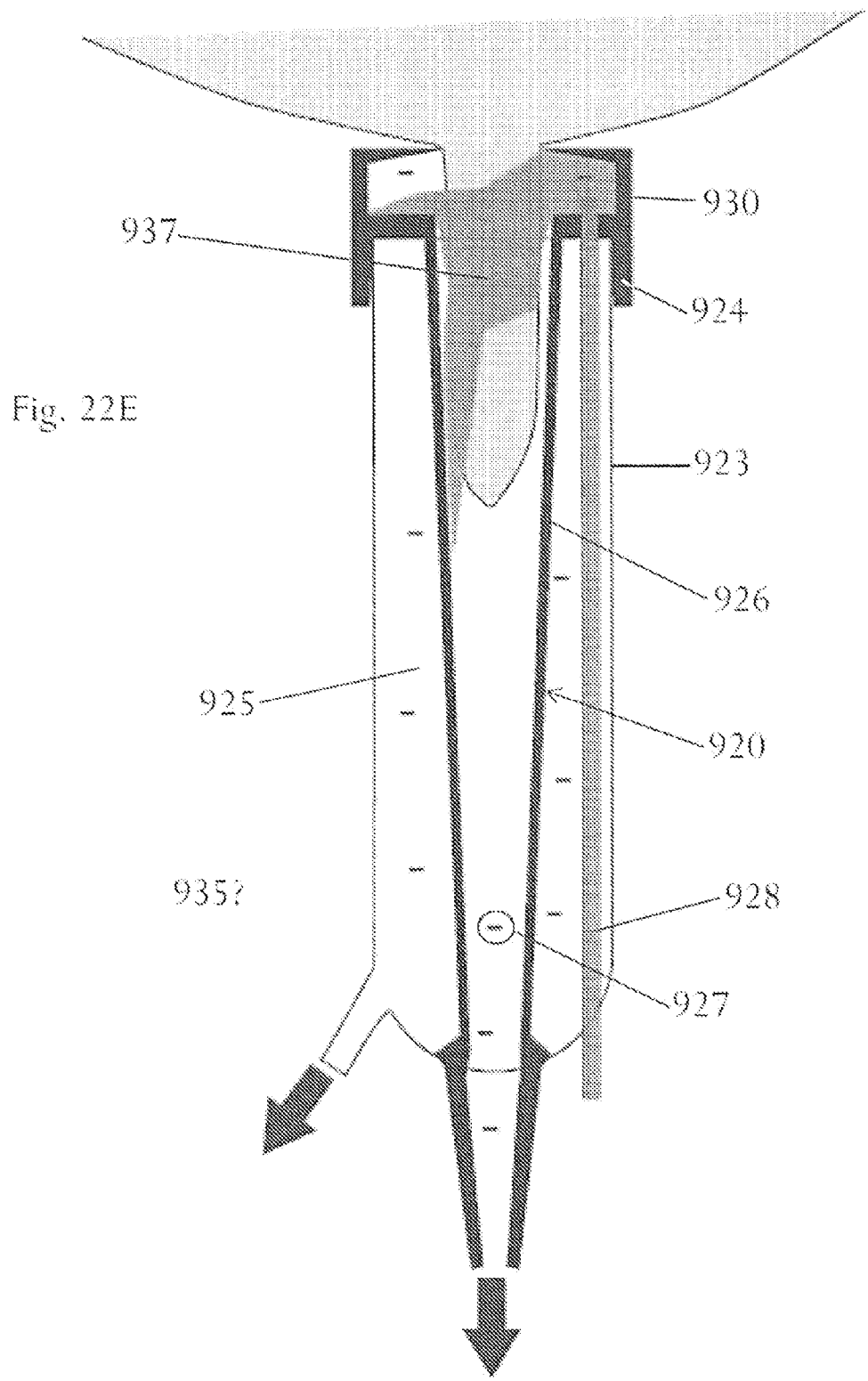
FIG. 22E is a side cross sectional view of a teat cup and liner similar to the arrangement of FIG. 22A, but with the vacuum chamber exposed to vacuum in the pulsation "on" position and teat dip at least partially bypassing the animal teat.

As is apparent from the Charts A and D, pulsation is stopped at the end of milking with the pulsator in the "off position" (atmospheric pressure in the pulsation chamber), and teat dip is applied and the teat liner and cup are still attached to a teat. Teat application coverage and uniformity are improved for the reasons stated above. As seen in FIGS. 22A through 22D, and described in more detail below, the position of the liner with pulsation opened (FIG. 22A) and with pulsation off (FIGS. 22B to 22D) will positively affect teat dip coverage. In this method and arrangement, improved dip application is also achieved because dip does not break the seal with a teat as quickly, and the milk lines and teat cup are not removed prematurely, which could result in dip bypassing the teat altogether (FIG. 22E).

Shell Liners

Figure 21A:
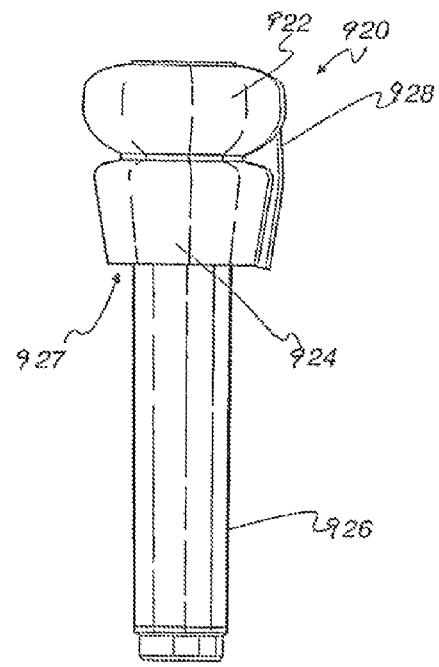
FIG. 21A is a side elevational view of a milker liner in accordance with the present invention.
Figure 21B:
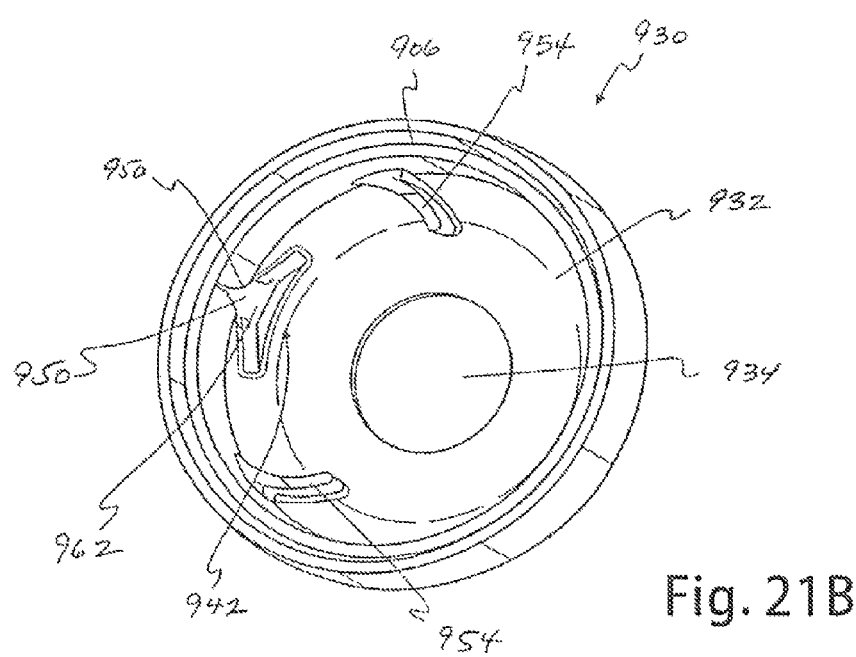
FIG. 21B is a perspective view of a milker liner dome chamber in accordance with the present invention.
Figure 21C:
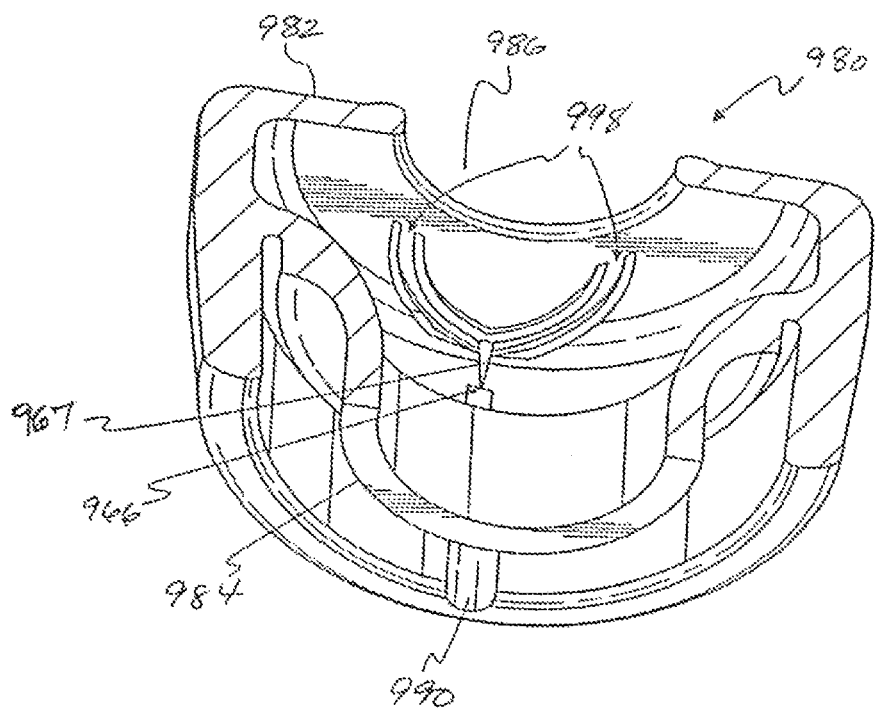
FIG. 21C is a partial perspective cross sectional view of a milker unit liner in accordance with the present invention.

As stated earlier, preferred shell liners for use in the present invention are disclosed in U.S. application Ser. No. 12/215,706, which is incorporated herein by reference. FIGS. 21A, 21B, and 21C depict representative examples of a shell liner 920, from that application.

In FIG. 21A, there is depicted a milker unit liner 920 in accordance with the present invention. The liner 920 includes a dome 930, a skirt 924, a barrel 926, and a delivery channel 928. The skirt 924 extends downward from the dome 930 and is spaced away from the barrel 926 to define a recess 927.

The liner 920 is sized and shaped to fit into a conventional outer shell or "teat cup" (not illustrated) so that the top of the teat cup fits in the recess 927 between the skirt 924 and the barrel 926, but other shell types and alignment aids can be used. This relationship secures the liner 920 to the teat cup and forms a seal for the vacuum. The liner barrel 926 may have any cross-sectional shape including round, triangular, and square, or any other shape. Alternatively, a liner can comprise a separate dome and barrel that are connected to each other directly or indirectly using a teat cup or the other suitable device. The present invention is directed to a dome 922 having an inner surface to which flow diverters are joined regardless of the type, size, or shape of barrel. The liner 920 can be made of rubber, silicone, or other suitable materials.

The delivery channel 928 can be formed integrally with the other liner components or attached after the liner 920 is formed. The delivery channel 928 may be any of the design types described above, or it can be a separate component so long as it is attached to the liner 920 to act as a conduit for teat dip or cleaning fluids being introduced into the dome 930 from the safety valve 60.

FIG. 21B illustrates an embodiment of a liner dome 930 in accordance with the present invention, and that is removed from the other liner components and inverted to show an inner surface 932. This dome 930 includes a teat opening 934, and an annular recess 936 for mating with the top of a teat cup (not illustrated).

The liner dome 930 further includes a teat dip distribution structure having an inlet 966 (not depicted in FIG. 21B, but see FIG. 21C), a first flow diverter which is illustrated in this embodiment as a flow bifurcating vane 942, and a second flow diverter which is illustrated as a pair of ridges 944. The inlet 966 is preferably an opening that is the same diameter as the delivery channel 928, but it can be any size or shape to obtain satisfactory flow characteristics or simply provide ease of manufacturing. The inlet 966 could also include a nozzle in the form of a slit, for example, that is either molded into the dome 930 during manufacture or cut into the dome 930 after molding. A slit shape acts as a one-way valve to inhibit the flow of milk, teat dip 967 (FIG. 21C), cleaning fluid, and debris from flowing in the wrong direction through the inlet 966.

The inlet 966 can also be a simple opening in the dome 930, and a delivery tube may be used in combination with the inlet 966 so that the delivery tube defines the flow characteristics or a valve and the inlet 966 simply provides an opening through which teat dip passes into the dome 930. Regardless of its shape or size, the inlet 966 is preferably joined to the dome 922 by being formed integrally in the liner dome 922, but the inlet 966 can be joined to the dome 922 in any other suitable manner.

The inlet 966 is connected via the delivery channel 928 to a teat dip source and/or a backflushing source (not illustrated). In this manner, teat dip 967 (FIG. 21C) is provided through the inlet 966 under pressure from a pump, air pressure or other suitable device.

If left to flow directly toward a teat, most of the dip would be applied to the side of the teat closest to the inlet 966, with some flow possibly reaching other sides of the teat if the dosage quantity is high enough. It is unlikely in practice that dip would reach all teat sides and even less likely that teat dip application would be uniform as preferred.

To redirect the inward and radial flow, the flow bifurcating vane 942 is disposed adjacent to the inlet 966 and in a flow path defined by the inlet 966. The flow bifurcating vane 942 is shaped to split and redirect the upward flow from the inlet 966 into a substantially annular flow path or pattern around the periphery of the dome inner surface 902. As depicted, the flow bifurcating vane 942 splits the flow substantially evenly in each direction to define a pair of flow paths, but if other inlets are used or other conditions warrant, the flow could be split in other proportions or simply redirected in a desired flow path.

The inlet 966 preferably defines two ramped and arcuate surfaces 920 on which the teat dip flows as it is being redirected. In this embodiment, a raised central portion 922 is used to confine the flow so that teat dip is not flowing directly toward the teat. In alternate embodiments, it is possible to permit some of the flow to be applied directly to the teat without being substantially redirected. In such embodiments, the central portion 922 may include openings, slots or ramps through or over which teat dip can flow. It is even permissible for some of the dip to flow over the bifurcating vane 912 and directly toward the teat. Further, the arcuate surfaces 950 can be shaped so that teat dip flow is not directed around the periphery, but instead through a flow pattern or radius that is smaller than the dome chamber 902's periphery.

The flow ridges 954 preferably have arcuate shapes and contact surfaces that are joined to the inner surface 902 of the dome 930 and arranged in the flow path. The flow ridges 954 are shaped and sized to redirect the peripheral teat dip flow inward toward a cow's teat. In a preferred embodiment, the flow ridges 954 have a height dimension that redirects all the teat dip flowing from the flow bifurcating vane 942. In alternate embodiments, the height of the flow ridges 954 could be reduced to permit some of the flow to by-pass the flow ridges 954 and flow to the part of the inner surface 902 opposite the flow bifurcating vane 912 or to other flow diverters (as described below). Further, the flow ridges 914 are depicted as being symmetrical, but they could be different sizes, shapes, positions, or orientations to provide asymmetric flow, if desired.

Most types of teat dip that would be flowing through the dome 930 have an inherent surface tension that helps establish a desired flow characteristic by remaining adjacent to the dome 930 surface and to the cow's teat so that the dip will cover areas of the teat that are not in the direct flow path defined by the flow diverters. Preferably, teat dips used in the present invention have a viscosity of between about one centipoise and about 40 centipoise.

The flow diverters of the present invention are joined to the inner surface of the dome by being molded integrally with the dome, or they may be joined to the inner surface of the dome with glue or any other suitable means.

FIG. 21C is an alternate embodiment of the present invention illustrating a cross-section of an upper portion of a liner 980 having a dome 982, a barrel 984, and a teat opening 986. A teat delivery channel 990 is formed integrally with the dome 992. A hose, pipe, or tube (not illustrated) can be joined to the delivery channel 990 as a conduit between a source of teat dip and the delivery tube 990, as described above. The delivery channel 990 has at its upper end an inlet 966 that may be the same diameter of the delivery channel 990 or in the form of a nozzle or slit that is either molded into the liner 980 or cut after the liner 980 is molded. Other types of dip applicators can be used in the invention, but a dome with flow diverters is preferred.

Figure 21D:
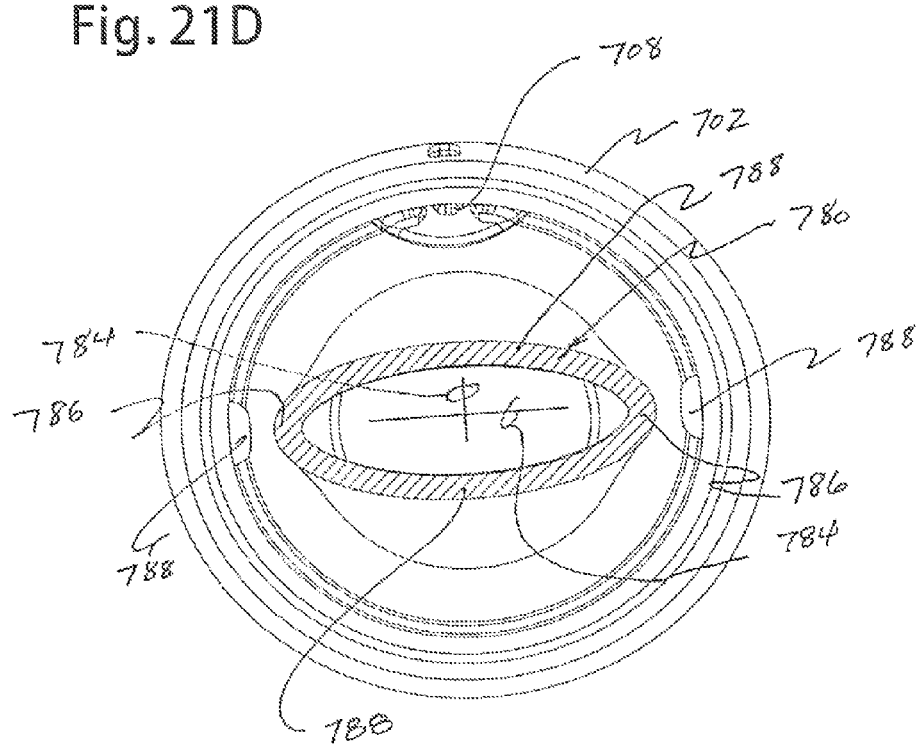
FIG. 21D is a cross section of a liner and a teat cup of the present invention.

Illustrated in FIG. 21D, is a cross section of a shell 702 with an internal dip delivery channel 708 and with the liner barrel 780 collapsed. Without special precautions, a liner barrel can collapse, make contact with the dip delivery channel 708, and cause premature wear and failure of the liner. With the dip channel 708 on the inside, a triangular, square or manipulated round liner is preferred to control the shape orientation of the collapsed barrel, so the liner 704 will not collapse and contact the internal dip channel 708.

The liner barrel 780 in FIG. 21D is formed, machined or molded with slight variations in wall thickness, such as a relatively thin wall at portions 786 and relatively thick at portions 788, to control collapse of the liner barrel 780 into an oval shape around a longitudinal axis 784 that is perpendicular to a transverse axis 786 on which the dip delivery channel 708 is disposed. This arrangement ensures that the liner barrel 780 does not contact the dip delivery channel 708. Attachment nubs 788 are shown in the head of the liner to secure it to the shell 702.

Preferably, the difference in wall thickness for the two portions 786, 788 is only from about 0.005 inches to about 0.010 inches, and is created by increasing thickness at portion 788. An elliptically machined mold can be used to create this difference.

To illustrate a method for improving teat coverage with dip by controlling pulsation, depicted in FIGS. 22A through 22D, there is a teat cup 923 and a liner 920 that define a vacuum chamber 925 therebetween. A vacuum 927 is applied inside the liner 920 to draw milk 929 from an animal teat into the liner 920 and out a milk tube 931. In FIG. 22A, a vacuum 933 is applied in the vacuum chamber 925 and the liner 920 barrel 926 makes contact with the animal teat, but the barrel 926 applies little or no pressure to the teat because the vacuum chamber vacuum 933 is offset by the vacuum 927 in the liner 920. FIG. 22A illustrates a pulsation "on position" for a pulsation system used to milk dairy animals.

FIG. 22B illustrates the liner vacuum 927 and atmospheric pressure 935 being allowed into the vacuum chamber 925. This illustrates the pulsation system at the beginning of the "off position", and little or no milk is drawn from the animal. At the beginning of the "off position", the liner barrel 926 is not yet in massaging contact with the teat.

FIG. 22C illustrates the pulsation system in the "off position" (atmospheric pressure in the pulsation chamber), and with the liner barrel 926 collapsed inwardly and into massaging contact with the animal teat.

FIG. 22D illustrates the pulsation system in the "off position" (atmospheric pressure in the pulsation chamber) with the liner barrel 926 collapsed around the teat and teat dip 937 being delivered to the inside of the liner 920 via a delivery tube 928. Applying dip when the pulsator is in the "off position" (atmospheric pressure in the pulsation chamber) helps ensure that the liner 920 is in contact with the teat before applying teat dip and avoiding dip bypassing the teat. As a result, the teat dip 937 substantially uniformly and completely coats the teat before aiding in breaking vacuum in the liner 920 and detaching the milker unit from the teat.

Finally, FIG. 22E is a pulsation system in an "on" position, with the dip 937 being applied. The dip and/or the vacuum in the pulsation chamber has prematurely broken a seal that had developed between the liner barrel 926 and the teat. In this view, the teat dip 937 is drawn downward by the vacuum 927 in the liner 920, and at least a portion of it bypasses the teat 937 before the teat cup 923 and liner 920 are detached from the teat. This results in poor coverage.

The present invention can have many benefits, including but not limited to, one or more of the following: automate the dipping process to increase operator efficiency and reduce operator fatigue; provide safe, individual disinfection of the teats to reduce pathogenic organisms on the teat; prevent transfer of infection from animal to animal, and thus improvement of udder health of the entire herd; reduce or minimize chemical consumption (as opposed to spray or other automated dipping systems); improve uniformity of teat dip application; prevent chemical contamination of the milk and of the downstream milk system lines; reduce water consumption during backflushing of the milker unit; and be retrofitted to nearly any available milking unit.

The above detailed description is provided for understanding the embodiments described and, unless otherwise stated, is not intended to limit the following claims.

The invention claimed is:

1. A method of automatically applying a dip to a dairy animal teat, the method comprising the steps of:
    discontinuing pulsation to a pulsation chamber between a teat cup and a liner;
    maintaining atmospheric pressure in the pulsation chamber;
    maintaining vacuum in the liner; and
    applying teat dip to an upper portion of the dairy animal teat.

2. The method of claim 1, and further comprising the step of:
    allowing the vacuum in the liner to at least partially spread dip along the dairy animal teat.

3. The method of claim 1, wherein the step of discontinuing pulsation to the pulsation chamber has a duration of between about 0.1 second and about 10 seconds before applying the teat dip.

4. The method of claim 1, wherein the step of discontinuing pulsation to the pulsation chamber has a duration of between about 0.1 seconds and about 3 seconds before applying the teat dip.

5. The method of claim 1, wherein the step of discontinuing pulsation to the pulsation chamber has a duration of between about 3 seconds and about 30 seconds before applying the teat dip.

6. The method of claim 1, wherein the step of applying dip comprises the step of applying dip having a viscosity of between about 1 centipoise and about 20 centipoise.

7. The method of claim 1, wherein the step of applying dip comprises the step of applying dip having a viscosity of between about 21 centipoise and about 40 centipoise.

* * * * *